United States Patent
Katoh et al.

(10) Patent No.: US 8,146,706 B2
(45) Date of Patent: Apr. 3, 2012

(54) AIR DUCT FOR VEHICLE AIR CONDITIONING AND AIR CONDITIONER FOR VEHICLE

(75) Inventors: Naoki Katoh, Nagoya (JP); Minoru Hashimoto, Okazaki (JP); Masashi Watanabe, Kariya (JP); Tatsuya Toyama, Obu (JP); Shigeyoshi Nagaya, Handa (JP)

(73) Assignee: Denso Corporation, Kariya (JP)

( * ) Notice: Subject to any disclaimer, the term of this patent is extended or adjusted under 35 U.S.C. 154(b) by 935 days.

(21) Appl. No.: 11/890,452

(22) Filed: Aug. 6, 2007

(65) Prior Publication Data

US 2008/0032618 A1 Feb. 7, 2008

(30) Foreign Application Priority Data

Aug. 7, 2006 (JP) ................................ 2006-214422
Jun. 21, 2007 (JP) ................................ 2007-163783

(51) Int. Cl.
*E04F 17/04* (2006.01)
*F16L 9/18* (2006.01)
*B60K 37/00* (2006.01)

(52) U.S. Cl. ......... 181/224; 454/143; 138/115; 296/208
(58) Field of Classification Search ................. 454/143; 181/46, 50
See application file for complete search history.

(56) References Cited

U.S. PATENT DOCUMENTS

| | | | |
|---|---|---|---|
| 3,568,791 A | 3/1971 | Luxton | |
| 4,872,398 A * | 10/1989 | Shen | ............................ 454/346 |
| 5,531,484 A | 7/1996 | Kawano | |
| 6,773,340 B2 | 8/2004 | Nakagawa et al. | |

FOREIGN PATENT DOCUMENTS

| | | |
|---|---|---|
| DE | 178815 C | 8/1905 |
| DE | 2 200 796 T5 | 7/1973 |
| DE | 31 13 914 A1 | 10/1982 |
| DE | 197 22 866 A1 | 11/1998 |
| DE | 10 292 792 T5 | 4/2004 |
| DE | 103 31 085 B3 | 8/2004 |
| JP | Y2-6-14013 | 4/1994 |
| JP | 06-348280 | 12/1994 |

(Continued)

OTHER PUBLICATIONS

Office Action dated Mar. 27, 2009 in Chinese Application No. 2007 101 39970.

(Continued)

*Primary Examiner* — Steven B McAllister
*Assistant Examiner* — Helena Kosanovic
(74) *Attorney, Agent, or Firm* — Harness, Dickey & Pierce, PLC

(57) ABSTRACT

An air duct for vehicle air conditioning, includes a duct body defining a passage, and a passage dividing wall for dividing an interior of the duct body into a first passage and a second passage. In the air duct, the width of the duct body in an arrangement direction of the first and second passages in a bending section is larger than the width of the duct body in upstream-side and downstream side straight sections adjacent to the bending section, so as to increase a passage length difference (L1–L2) between the first passage and the second passage. Accordingly, the air duct has a structure capable of reducing the duct width while obtaining a desired passage length difference between the first passage and the second passage.

35 Claims, 30 Drawing Sheets

FOREIGN PATENT DOCUMENTS

| | | |
|---|---|---|
| JP | 07-018755 | 1/1995 |
| JP | 08-042499 | 2/1996 |
| JP | 2001-277836 | 10/2001 |
| JP | 2003-194018 | 7/2003 |
| JP | 2004-196180 | 7/2004 |
| WO | WO 2006/033190 | 3/2006 |

OTHER PUBLICATIONS

Office Action mailed Sep. 16, 2010 from GPTO in the corresponding German Patent Application No. 07037192.8 with English translation.

"Noise Attenuation Chapter of Technology and Law for Environmental Pollution Prevention" edited by the editing committee of Technology and Law for Environmental Pollution Prevention, supervised by Environmental Location Bureau, Ministry of International Trade and Industry, published by Corporation Aggregate Industrial Environmental Management Association, and sold by Maruzen Co., Ltd., partial translation.

* cited by examiner

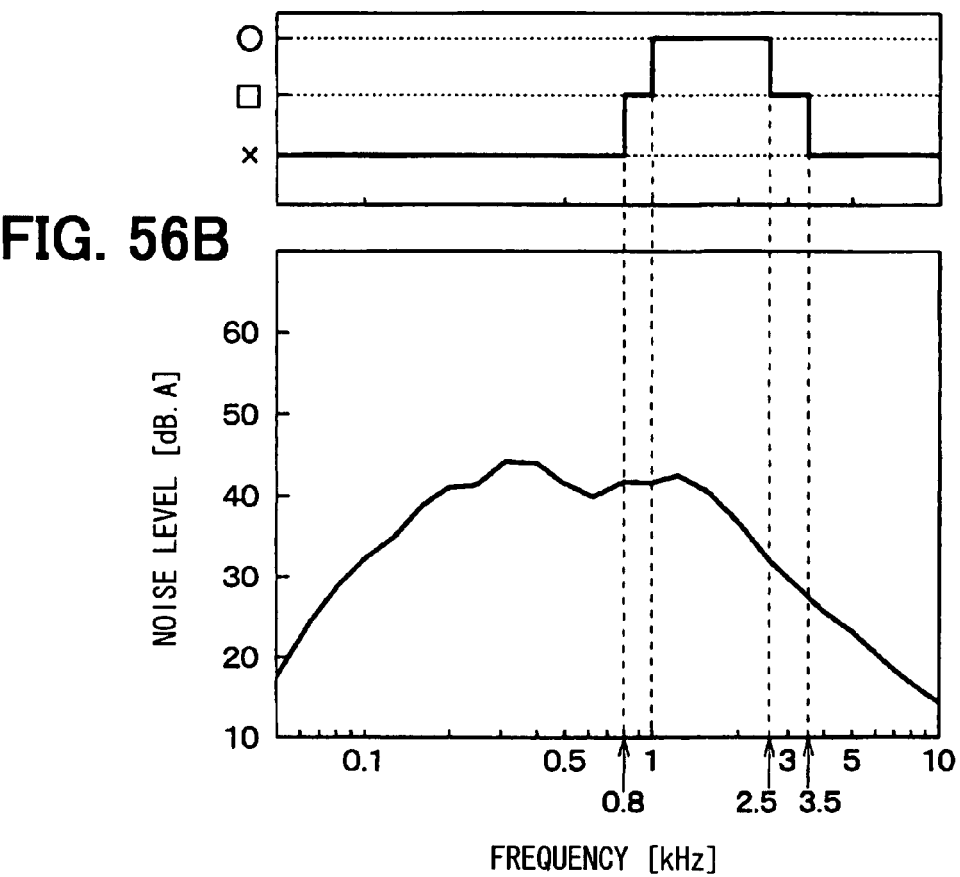

AIR DUCT FOR VEHICLE AIR CONDITIONING AND AIR CONDITIONER FOR VEHICLE

CROSS REFERENCE TO RELATED APPLICATION

This application is based on Japanese Patent Applications No. 2006-214422 filed on Aug. 7, 2006, and No. 2007-163783 filed on Jun. 21, 2007, the contents of which are incorporated herein by reference in its entirety.

FIELD OF THE INVENTION

The present invention relates to an air duct for vehicle air conditioning, which guides conditioned air to an outlet port exposed to the interior of a vehicle compartment, and an air conditioner for a vehicle provided with such an air duct.

BACKGROUND OF THE INVENTION

A general air conditioner for a vehicle includes, for example, a compressor, a condenser, an evaporator, etc. constituting a refrigerant cycle. The vehicle air conditioner also includes an air conditioning body unit for air-conditioning a vehicle compartment, a blower unit including a blower, a vehicle air-conditioning air duct for guiding air from the air conditioning body unit to the vehicle compartment, and an outlet port for discharging the conditioned air from the air duct into the vehicle compartment.

An air duct for vehicle air conditioning is disclosed in Japanese Laid-open Patent Publication No. 2001-277836. As the air duct, an air guide plate is installed to divide an air flow passage into inner and outer peripheral sides at a corner of the air flow passage. In accordance with the installation of such an air guide plate, an air flow biased toward the outside of a bending section at the corner is corrected.

In an air conditioner for a vehicle, air flows through a blower unit, an air conditioning body unit, an air duct for vehicle air conditioning, and an outlet port in a sequential order. As a result, noise generated due to a sound of the blower and a flow of air in the air conditioning body unit is propagated through the vehicle air-conditioning air duct, so that the noise is emitted to the vehicle compartment. In conventional cases, for example, a measure has been taken against noise in a manner of that a sound-absorbing materials is installed in the air conditioning body unit or the air duct for vehicle air conditioning.

Meanwhile, in fields other than vehicle air conditioners, an interference type sound attenuator is used as a measure against noise, as described in "Noise Attenuation Chapter of Technology and Law for Environmental Pollution Prevention" (edited by the editing committee of Technology and Law for Environmental Pollution Prevention, supervised by Environmental Location Bureau, Ministry of International Trade and Industry, published by Corporation Aggregate Industrial Environmental Management Association, and sold by Maruzen Co., Ltd.). A schematic diagram of such an interference type sound attenuator is shown in FIG. 55. The sound attenuator shown in FIG. 55 includes a bypass passage 502 for traveling a sound while bypassing the sound from a rectilinear main passage 501. The length difference between the bypass passage 502 and the main passage 501 from a branch point 503 to a junction point 504, i.e., a passage length difference "L10–L20", is set to correspond to an integer-number multiple of the half wavelength of the waveform of the sound, in order to attenuate the sound by using a sound wave having a phase opposite to the phase of the sound to interfere with the sound in a junction portion.

Japanese Laid-open Patent Publication No. 2004-196180 also discloses a duct, which has a function of the above-mentioned interference type sound attenuator, and is used as an air inlet passage of an engine. In Japanese Laid-open Patent Publication No. 2004-196180, however, there is no disclosure as to a specific application example of an interference type sound attenuator to an air duct for vehicle air conditioning.

Japanese Laid-open Patent Publication No. 2003-194018 discloses a flow guide blade-inserted elbow for use in a cavitation tunnel or a wind tunnel. Although this elbow does not function as an interference type sound attenuator, it causes a flow of fluid to be constant by virtue of flow guide blades installed in the duct.

Recently, air conditioning capable of maintaining the vehicle compartment in a silent state has been required in accordance with an improvement in vehicle quietness. As mentioned above, noise emitted from an air conditioning body unit to the vehicle compartment is mainly generated in a wide region at the upstream side of an air flow, rather than at an outlet port. For example, such noise is generated while the blower operates or while air passes through an evaporator, etc. Thus, when a noise attenuating function is provided to an air duct for vehicle air conditioning connected to an outlet port, as a measure against noise, the measure is effective for all noise generated in a region arranged upstream of an air flow rather than the outlet port.

Accordingly, the inventors of the present application examined the provision of an interference type noise attenuating function to an air duct for vehicle air conditioning.

First of all, an effective noise reduction is achieved when a noise target range to be attenuated ranges from a frequency of 0.8 kHz to 3.5 kHz in an air duct for vehicle air conditioning having an interference type noise attenuating function. In particular, the inventors found, from the results of examination, that noise having a frequency ranging from 1 kHz to 2.5 kHz can be very effectively attenuated.

The above-mentioned examination results are shown in FIGS. 56A and 56B. FIG. 56B shows the frequency characteristics of an actual vehicle blowing noise. FIG. 56A shows the results of an examination about how a person senses noise having frequency characteristics identical to those of the actual vehicle blowing noise shown in FIG. 56B and noise obtained after sampling noise having a ⅓ octave analysis frequency from the former noise, lowering the sampled noise to 3 dB.A, and equalizing the resultant noise to the former noise, when the two noises are compared to each other. In FIG. 56A, "O" represents that a person definitely senses quietness, "☐" represents that a person indefinitely senses quietness to a certain degree, and "X" represents that a person senses no difference between the two noises. As shown in FIG. 56A, the person can sense quietness in the frequency band ranging from 0.8 kHz to 3.5 kHz after listening to and comparing the two noises in accordance with a level reduction of one noise as compared to the other noise. Also, the person can sense quietness more clearly in the frequency band ranging from 1 kHz to 2.5 kHz.

On the other hand, the conventional measure against noise in a vehicle air conditioner, using a sound-absorbing materials, etc., is effective to noise of a high frequency band higher than 2 kHz. In this case, however, there is a problem in that the effect decreases on noise reduction of a low frequency band of 2 kHz or less.

It is required to achieve a noise reduction effect for noise of a frequency band of 0.8 kHz to 2 kHz, more preferably, 1 kHz to 2 kHz, in which an interference type noise attenuating function is provided to an air duct for vehicle air conditioning.

Meanwhile, since sound waves have directionality, it is difficult for sound waves to travel in a direction normal to an original travel direction. As described in "Noise Attenuation Chapter of Technology and Law for Environmental Pollution Prevention", it is impossible to obtain a desired noise reduction effect using interference because a sound mainly flows through the main passage 501 shown in the configuration in FIG. 55, in which the bypass passage 502 is branched from the rectilinear main passage 501 in a normal direction. In this case, even if a noise reduction effect is obtained, it is small. As a measure against such a problem, the main passage 501 may be squeezed, i.e., may have a reduced cross-sectional area, at a portion arranged downstream of the branch point thereof, such that the sounds flowing through the main passage 501 and the bypass passage 502 are equalized in energy level. In this case, however, there is a problem in that an air flow resistance increases due to the reduced passage cross-sectional area.

When a bypass passage is provided at a rectilinear section of the air duct for vehicle air conditioning, as shown in FIG. 55, there is a problem in that the air duct is excessively enlarged due to an increase in the region where bypass passages are formed.

Therefore, it is undesirable to provide a passage branching configuration at the rectilinear portion of an air duct for vehicle air conditioning, which constitutes a passage for conditioned air as shown in FIG. 55.

Furthermore, in the duct disclosed in Japanese Laid-open Patent Publication No. 2004-196180, the flow directions of air and sound are opposite to each other. This duct has an inlet port enlarged in size to suck air. Such a shape of the duct is peculiar, as compared to air ducts for vehicle air conditioning. Thus, there is a problem in that the duct having such a shape cannot be used for an air duct for vehicle air conditioning.

SUMMARY OF THE INVENTION

The present invention has been made in view of the above-mentioned problems, and it is an object of the present invention to provide an air duct for vehicle air conditioning having an interference type noise attenuating function.

It is another object of the present invention to provide a vehicle air conditioner having an air duct, which can effectively reduce noise transmitted to a vehicle compartment.

According to a first aspect of the present invention, an air duct is for use in a vehicle air conditioning, for guiding conditioned air to a vehicle compartment outlet port (141, 142, 143, 144), and the conditioned air is generated as air is blown into an air conditioning case (121) by a blower (111) and is heat-exchanged by a heat exchanger (122, 123) in the air conditioning case. The air duct includes an upstream-side duct section (4) into which the conditioned air from the air conditioning case (121) flows, a downstream-side duct section (5) for introducing the conditioned air into the vehicle compartment outlet port (141, 142, 143, 144), and a bending section (3) located between the upstream-side duct section (4) and the downstream-side duct section (5) for bending a flow direction of the conditioned air passing through the upstream-side duct section (4) and for guiding the conditioned air from the upstream-side duct section (4) to the downstream-side duct section (5). The bending section (3) includes a first passage (6) and a second passage (7) for branching the conditioned air flowing from the upstream-side duct section (4) toward a bending outer periphery side and a bending inner periphery side to guide the conditioned air along the bending outer periphery side and the bending inner periphery side. Furthermore, a dimension (W3) of the bending section (3), corresponding to a sum of cross-sectional widths (W6, W7) of the first passage and the second passage (6, 7) in an arrangement direction of the first and second passages (6, 7) and a distance (W2) between the first passage and the second passage (6, 7), is larger than at least one of a cross-sectional width (W4) of the upstream-side duct section (4) and a cross-sectional width (W5) of the downstream-side duct section (5).

Because the bending section (3) is branched into the first passage (6) of the outer periphery side and the second passage (7) of the inner periphery side, the passage lengths of the first passage and the second passage can be different from each other. The passage length difference between the first passage and the second passage can be increased as the sum (W3) of the cross-sectional width (W6) of the first passage (6), the cross-sectional width (W7) of the second passage (7), and the distance (W2) between the first passage and the second passage is larger than one or both of the cross-sectional width (W4) of the upstream-side duct section (4) and the cross-sectional width (W5) of the downstream-side duct section (5).

As a result, in accordance with the above first aspect the present invention, it is possible to obtain a desired passage length difference between the first passage and the second passage while allowing the air duct for vehicle air conditioning to have a size adapted to be installable in a vehicle. Accordingly, it is possible to provide an air duct for vehicle air conditioning, having an interference type noise attenuating function.

For example, in the air duct, the first and second passages (6, 7) of the bending section (3) may be constituted by separate tubes.

According to a second aspect of the present invention, an air duct, for use in a vehicle air conditioning, for guiding a conditioned air to a vehicle compartment outlet port (141, 142, 143, 144), includes an upstream-side duct section (4) into which the conditioned air from an air conditioning case (121) flows, a downstream-side duct section (5) for introducing the conditioned air into the vehicle compartment outlet port (141, 142, 143, 144), and a bending section (3) located between the upstream-side duct section (4) and the downstream-side duct section (5) for bending a flow direction of the conditioned air passing through the upstream-side duct section (4) and for guiding the conditioned air from the upstream-side duct section (4) to the downstream-side duct section (5). A passage dividing wall (2) is provided in the bending section (3) and divides a passage of the bending section into a first passage (6) arranged at a bending outer periphery side and a second passage (7) arranged at a bending inner periphery side, and a width dimension (W3) of the bending section (3) corresponding to a sum of cross-sectional widths (W6, W7) of the first passage and the second passage (6, 7) in an arrangement direction of the first and second passages (6, 7) and a cross-sectional width (W2) of the passage dividing wall (2) is larger than one or both of a cross-sectional width (W4) of the upstream-side duct section (4) and a cross-sectional width (W5) of the downstream-side duct section (5).

Because the bending section (3) is branched into the first passage (6) on the outer periphery side and the second passage (7) on the inner periphery side, the passage lengths of the first passage and the second passage can be different from each other. The passage length difference between the first passage and the second passage can be increased as the sum (W3) of the cross-sectional width (W6) of the first passage (6), the cross-sectional width (W7) of the second passage (7), and the cross-sectional width (W2) of the passage dividing wall (2) is larger than one or both of the cross-sectional width (W4) of the upstream-side duct section (4) and the cross-sectional width (W5) of the downstream-side duct section (5).

As a result, in accordance with the present invention, it is possible to obtain a desired passage length difference between the first passage and the second passage while allowing the air duct for vehicle air conditioning to have a size adapted to be installable in a vehicle. Accordingly, it is possible to provide an air duct for vehicle air conditioning having an interference type noise attenuating function.

For example, the passage dividing wall (2) may include a first-passage-side wall surface (2a) facing the first passage (6) and having a shape conforming to an outer-periphery-side outer wall surface (3a) of the bending section (3), and a second-passage-side wall surface (2b) facing the second passage (7) and conforming to an inner-periphery-side inner wall surface (3b) of the bending section (3), to allow each of the first and second passages (6, 7) to have a passage cross-sectional area substantially constant in a flow direction of the conditioned air.

Alternatively, the passage dividing wall (2) may include a first-passage-side wall surface (2a) facing the first passage (6) and having a planar shape in an overall region or in a partial region of the first-passage-side wall surface (2a), and a second-passage-side wall surface (2b) facing the second passage (7) and having a planar shape in an overall region or in a partial region of the second-passage-side wall surface (2b).

For example, the passage dividing wall (2) may be configured such that a ratio (S1/S2) of an outer-periphery-side length (S1), in the flow direction of the conditioned air, of the first-passage-side wall surface (2a) facing the first passage (6) to an inner-periphery-side length (S2), in the flow direction of the conditioned air, of the second-passage-side wall surface (2b) facing the second passage (7) is about in a range of 1.1 to 2.0.

Alternatively, the passage dividing wall (2) may have a width in an arrangement direction of the first and second passages (6, 7), the width increasing gradually from an upstream end (2c) in the air flow direction toward a middle portion (2d) in the air flow direction, and decreasing gradually from the middle portion (2d) toward a downstream end (2e) in the air flow direction, to allow the passage dividing wall (2) to have a substantially-crescent shape linearly symmetrical to a virtual line (2f) passing the middle portion (2d).

According to a third aspect of the present invention, an air duct, for use in a vehicle air conditioning, for guiding conditioned air to a vehicle compartment outlet port (141, 142, 143, 144), includes an upstream-side duct section (4) into which the conditioned air from an air conditioning case (121) flows, a downstream-side duct section (5) for introducing the conditioned air into the vehicle compartment outlet port (141, 142, 143, 144), and a bending section (3) located between the upstream-side duct section (4) and the downstream-side duct section (5), for bending a flow direction of the conditioned air passing through the upstream-side duct section (4) and for guiding the conditioned air from the upstream-side duct section (4) to the downstream-side duct section (5). The bending section (3) includes a first passage (6) and a second passage (7) for branching the conditioned air flowing from the upstream-side duct section (4) toward a bending outer periphery side and a bending inner periphery side. Also, the bending section (3) includes an outer-periphery-side inner wall surface (3a) enlarged toward the bending outer periphery beyond an outer reference line (23a), on cross-sections of the upstream-side duct section (4), the downstream-side duct section (5) and the bending section (3) parallel to the flow direction of the conditioned air. The outer reference line (23a) is a virtual curved line connecting an outer-periphery-side inner wall surface (4a) of the upstream-side duct section (4) and an outer-periphery-side inner wall surface (5a) of the downstream-side duct section (5) by an arc, to which a virtual straight line (31) extending from a downstream end (10a1) of the upstream-side duct section (4) connected to the outer-periphery-side inner wall surface (3a) of the bending section (3), in parallel to the flow direction of the conditioned air introduced from the upstream-side duct section (4) into the bending section (3), and a virtual straight line (32) extending from an upstream end (10b1) of the downstream-side duct section (5) connected to the outer-periphery-side inner wall surface (3a) of the bending section (3), in parallel to the flow direction of the conditioned air introduced from the bending section (3) into the downstream-side duct section (5), are tangent.

Accordingly, it is possible to increase the passage length difference between the first passage and the second passage generated when the bending section (3) is branched into the first passage (6) of the outer periphery side and the second passage (7) of the inner periphery side.

As a result, it is possible to obtain a desired passage difference between the first passage and the second passage while allowing the air duct for vehicle air conditioning to have a size adapted to be installable in a vehicle. Accordingly, it is possible to provide an air duct for vehicle air conditioning having an interference type noise attenuating function.

According to a fourth aspect of the present invention, the bending section (3) and the upstream-side duct section (4) are configured such that the outer-periphery-side inner wall surface (3a) of the bending section (3) is concave toward an inside of a duct body at a connection portion (10a) connected to the upstream-side duct section (4), to allow the flow direction of the conditioned air introduced into the first passage (6) to form an acute angle with respect to the flow direction of the conditioned air directed from the upstream-side duct section (4) to the bending section (3).

Accordingly, it is possible to increase the passage lengths of the first passage and the second passage (6, 7), as compared to a case in which the flow direction of the conditioned air introduced into the first passage (6) is directed from the upstream-side duct section (4) to the bending section (3). Also, it is possible to obtain a desired passage difference between the first passage and the second passage while allowing the air duct for vehicle air conditioning to have a size adapted to be installable in a vehicle.

According to a fifth aspect of the present invention, the bending section (3) and the downstream-side duct section (5) are configured such that the outer-periphery-side inner wall surface (3a) of the bending section (3) is concave toward an inside of the duct at a connection portion (10b) connected to the downstream-side duct section (5), to allow the conditioned air flowing through the first passage (6) and the conditioned air flowing through the second passage (7) to be joined while flowing in intersecting directions.

In a configuration, in which the conditioned air flowing in the first passage (6) and the conditioned air flowing in the second passage (7) are joined while flowing in parallel, only parts of sound waves from the first passage (6) and sound waves from the second passage (7), i.e., only parts of adjacent sound waves, interfere with each other. The sound waves spaced apart from each other cannot interfere with each other. As a result, the noise reduction effect by interference is relatively small.

On the contrary, in the configuration, in which the conditioned air flowing in the first passage (6) and the conditioned air flowing in the second passage (7) are joined while flowing in intersecting directions, sound waves from the first passage (6) and sound waves from the second passage (7) can interfere with each other. Accordingly, it is possible to obtain a large noise reduction effect.

According to a sixth aspect of the present invention, an air duct, for use in a vehicle air conditioning, for guiding a conditioned air to a vehicle compartment outlet port (141, 142, 143, 144), includes: an upstream-side duct section (4) into which the conditioned air from an air conditioning case (121) flows; a downstream-side duct section (5) for introducing the conditioned air into the vehicle compartment outlet port (141, 142, 143, 144); and a bending section (3) located between the upstream-side duct section (4) and the downstream-side duct section (5), for bending a flow direction of the conditioned air passing through the upstream-side duct section (4) and for guiding the conditioned air from the upstream-side duct section (4) to the downstream-side duct section (5). The bending section (3) includes a first passage (6) and a second passage (7) for branching the conditioned air received from the upstream-side duct section (4) toward a bending outer periphery side and a bending inner periphery side. Also, the bending section (3) includes an inner-periphery-side inner wall surface (3b) enlarged toward the bending inner periphery beyond an inner reference line (23b), on cross-sections of the upstream-side duct section (4), the downstream-side duct section (5) and the bending section (3) parallel to the flow direction of the conditioned air. The inner reference line (23b) is a virtual curved line connecting an inner-periphery-side inner wall surface (4b) of the upstream-side duct section (4) and an inner-periphery-side inner wall surface (5b) of the downstream-side duct section (5) by an arc, to which a virtual straight line (33) extending from a downstream end (10a2) of the upstream-side duct section (4) connected to the inner-periphery-side inner wall surface (3b) of the bending section (3), in parallel to the flow direction of the conditioned air introduced from the upstream-side duct section (4) into the bending section (3), and a virtual straight line (34) extending from an upstream end (10b2) of the downstream-side duct section (5) connected to the inner-periphery-side inner wall surface (3b) of the bending section (3), in parallel to the flow direction of the conditioned air introduced from the bending section (3) into the downstream-side duct section (5), are tangent.

According to a seventh aspect of the present invention, the inner-periphery-side inner wall surface (3b) of the bending section (3) may include a planar shape in an overall region or in a partial region.

According to an eighth aspect of the present invention, the inner-periphery-side inner wall surface (3b) of the bending section (3) may include, in an overall region or in a partial region, a curved shape gentler than the outer-periphery-side inner wall surface (3a).

In any one of the sixth to eighth aspects of the present invention, it is possible to increase the passage length difference between the first passage and the second passage generated when the bending section is branched into the first passage of the outer periphery side and the second passage of the inner periphery side. As a result, it is possible to obtain a desired passage length difference between the first passage and the second passage while allowing the air duct for vehicle air conditioning to have a size adapted to be installable in a vehicle. Accordingly, it is possible to provide an air duct for vehicle air conditioning having an interference type noise attenuating function.

According to a ninth aspect of the present invention, an air duct, for use in a vehicle air conditioning, for guiding a conditioned air to a vehicle compartment outlet port (141, 142, 143, 144), includes an upstream-side duct section (4) into which the conditioned air from an air conditioning case (121) flows, a downstream-side duct section (5) for introducing the conditioned air into the vehicle compartment outlet port (141, 142, 143, 144), and a bending section (3) located between the upstream-side duct section (4) and the downstream-side duct section (5), for bending a flow direction of the conditioned air passing through the upstream-side duct section (4) and for guiding the conditioned air from the upstream-side duct section (4) to the downstream-side duct section (5). A passage dividing wall (2) is provided in the bending section (3) and divides a passage of the bending section into a first passage (6) arranged at a bending outer periphery side and a second passage (7) arranged at a bending inner periphery side. Also, the passage dividing wall (2) is configured such that a ratio (S1/S2) of an outer-periphery-side length (S1), in the flow direction of the conditioned air, of a first-passage-side wall surface (2a) facing the first passage (6) to an inner-periphery-side length (S2), in the flow direction of the conditioned air, of a second-passage-side wall surface (2b) facing the second passage (7) is about in a range of 1.1 to 2.0.

Accordingly, it is possible to increase the passage length difference between the first passage and the second passage to a desired value, i.e., a length capable of reducing noise of a low frequency band of 0.8 kHz to 2 kHz by interference, while allowing the air duct for vehicle air conditioning to have a size adapted to be installable in a vehicle. It is also possible to provide an air duct for vehicle air conditioning having an interference type noise attenuating function.

For example, the upstream-side duct section (4) may include, in an overall region or in a partial region, a substantially-straight shape to allow the flow direction of the conditioned air to be substantially constant. Alternatively, the downstream-side duct section (5) may include, in an overall region or in a partial region, a substantially-straight shape to allow the flow direction of the conditioned air to be substantially constant.

According to a tenth aspect of the present invention, an air duct, for use in a vehicle air conditioning, for guiding a conditioned air to a vehicle compartment outlet port (141, 142, 143, 144), includes an upstream-side duct section (4) extending in a substantially-straight shape and for introducing the conditioned air from the air conditioning case (121), a downstream-side duct section (5) extending in a substantially-straight shape and for discharging the conditioned air in a direction different from a flow direction of the conditioned air passing through the upstream-side duct section (4), a bending section (3) connecting the upstream-side duct section (4) and the downstream-side duct section (5); and a dividing member (2) arranged in the bending section (3) for dividing an interior of the bending section (3) into a first passage (6) arranged at a bending inner periphery side and a second passage (7) arranged at a bending outer periphery side. The bending section (3) is formed to have one of a shape, in which an outer intersection line (3a) extends outside an outer reference line (23a), and a shape in which an inner intersection line (3b) extends inside an inner reference line (23b), on a reference cross-section including an upstream air flow direction of the conditioned air flowing in the upstream-side duct section (4) and a downstream air flow direction of the conditioned air flowing in the downstream-side duct section (5). Here, the outer reference line (23a) is a line connecting an outer-periphery-side inner wall surface (4a) of the upstream-side duct section (4) and an outer-periphery-side inner wall surface (5a) of the downstream-side duct section (5) via an arc to which the upstream air flow direction and the downstream air flow direction are tangent (31, 32), the inner reference line (23b) is a line connecting an inner-periphery-side inner wall surface (4b) of the upstream-side duct section (4) and an inner-periphery-side inner wall surface (5b) of the downstream-side duct section (5) via an arc to which the upstream air flow direction and the downstream air flow direction are tangent (33, 34), the outer intersection line (3a) is a line of intersection between an outer-periphery-side inner wall surface of the bending section (3) and the reference cross-section, and the inner intersection line (3b) is a line of intersection between an inner-periphery-side inner wall surface of the bending section (3) and the reference cross-section. The dividing member (2) includes a wall surface (2a) arranged at a side of the first passage (6) and formed to conform to the outer-periphery-side inner wall surface of the bending section (3), and a wall surface (2b) arranged at a side of the second passage (7) and formed to conform to the inner-periphery-side inner wall surface of the bending section (3).

Accordingly, it is possible to increase the passage length difference between the first passage and the second passage generated when the bending section is branched into the first passage of the outer periphery side and the second passage of the inner periphery side. As a result, it is possible to obtain a desired passage difference between the first passage and the second passage while allowing the air duct for vehicle air conditioning to have a size adapted to be installable in a vehicle. Thus, it is possible to provide an air duct for vehicle air conditioning, having an interference type noise attenuating function.

For example, the length of the upstream-side duct section in the flow direction of conditioned air may be about 85 mm or more, in order to, at least, reduce a noise having a frequency of 2 kHz. Alternatively, the length of the upstream-side duct section may be 121 mm or more in order to, at least, reduce a noise having a frequency of 1.4 kHz to 2 kHz. In order to, at least, reduce a noise having a frequency of 0.8 kHz to 2 kHz, the length of the upstream-side duct section may be about 212 mm or more.

Alternatively, the length of the downstream-side duct section in the flow direction of conditioned air may be about 42 mm or more, in order to, at least, reduce a noise having a frequency of 2 kHz. Alternatively, the length of the downstream-side duct section may be about 60 mm or more, in order to, at least, reduce a noise having a frequency of 1.4 kHz to 2 kHz. In order to, at least, reduce a noise having a frequency of 0.8 kHz to 2 kHz, the length of the downstream-side duct section may be about 106 mm or more.

In a duct, in which the bending section does not include the first passage and the second passage, different from the present invention, an unsteady flow may be locally generated when conditioned air passes through the bending section of the duct, if the length of the downstream-side duct section in the flow direction of the conditioned air is 500 mm or less, as in Comparative Example 2 of FIG. 12. In accordance with the present invention, however, it is possible to suppress generation of an unsteady flow in the bending section, and to reduce a wind roar occurring at grilles due to pulsations caused by a local high flow velocity or an unbalanced flow velocity distribution. Accordingly, the length of the downstream-side duct section in the flow direction of the conditioned air is more effective when it is about 500 mm or less.

The bending section may be arranged just before the vehicle compartment outlet port in the flow direction of the conditioned air, and has a bending angle of about in a range of 45° to 180°, in order to reduce noise emitted from the vehicle compartment outlet port into the vehicle compartment and a suppression of an unsteady flow of conditioned air discharged from the vehicle compartment outlet port.

According to an eleventh aspect of the present invention, the bending section (3) may be configured such that difference (L1–L2) between passage lengths of the first passage and the second passage (6, 7) extending through centers of passage cross-sections of the first and second passages (6, 7) is about in a range of 0.085 m to 0.215 m. Accordingly, it is possible to obtain a noise reduction effect by interference to noise having a frequency of 800 Hz to 2 kHz.

For example, a ratio between cross-sections of the first passage and the second passage taken at the cross-section of the bending section is set in a manner that, when one cross-section is set to 1, the other cross-section is set in a range from 0.7 to 1.3, in order to substantially equalize the energy levels of sound waves out of phase with each other, and thus to enhance the noise reduction effect by interference.

According to a twelfth aspect of the present invention, an air conditioner for a vehicle includes an air conditioning case (121) for accommodating a heat exchanger (122, 123) adapted to heat-exchange with air to be conditioned, an air duct for vehicle air conditioning (131, 132, 133, 134) according to any one of aspects described above of the present invention, vehicle compartment outlet ports (141, 142, 143, 144) for blowing out conditioned air flowing from the air ducts (131, 132, 133, 134) into a vehicle compartment, and a blower (111) for blowing the conditioned air from the air conditioning case (121) toward the vehicle compartment outlet ports (141, 142, 143, 144) via the air ducts (131, 132, 133, 134). Accordingly, the air conditioner can effectively reduce noise transmitted to the vehicle compartment.

In any one of the above-described aspects of the present invention, the passage dividing wall (2) may be formed by individually forming the upper and the lower wall portions (11a, 11b) of the duct body (1), joining concave portions of the upper and lower wall portions (11a, 11b), and coupling the upper wall portion and the lower wall portion (11a, 11b). Also, a lining material may be attached to inner wall surfaces of the upstream-side duct section (4), inner wall surfaces of the downstream-side duct section (5), an inner-periphery-side inner wall surface (3b) of the bending section (3), and surfaces of the passage dividing wall (2), respectively.

Alternatively, sound-absorbing materials may be attached to inner wall surfaces of the upstream-side duct section (4), inner wall surfaces of the downstream-side duct section (5), an inner-periphery-side inner wall surface (3b) of the bending section (3), and surfaces of the passage dividing wall (2), respectively. Alternatively, convex or concave structures may be provided at surfaces of the passage dividing wall (2), and concave or convex structures corresponding to the convex or concave structures provided at the surfaces of the passage dividing wall (2) may be formed at outer-periphery-side and inner-periphery-side inner wall surfaces (3a, 3b) of the bending section (3).

Furthermore, in the above aspects of the present invention, the first passage (6) of the bending section (3) may be divided into a plurality of passages, and the second passage (7) of the bending section (3) may be partially divided into a plurality of passages.

BRIEF DESCRIPTION OF THE DRAWINGS

The above and other objects and features of the present invention will become apparent from the following description of preferred embodiment, given in conjunction with the accompanying drawings, in which:

FIGS. 56A and 56B are graphs illustrating the results of examination for a frequency band of air conditioning noise, which is a target to be solved in the present invention.

DESCRIPTION OF THE EMBODIMENTS

Various embodiments of the present invention will now be described in detail with reference to the accompanying drawings.
(First Embodiment)

In this embodiment, as an example, the present invention is applied to a side face duct among air ducts for vehicle air conditioning, which are connecting an air conditioning body unit to outlet ports provided at an instrument panel.

Figure 1:
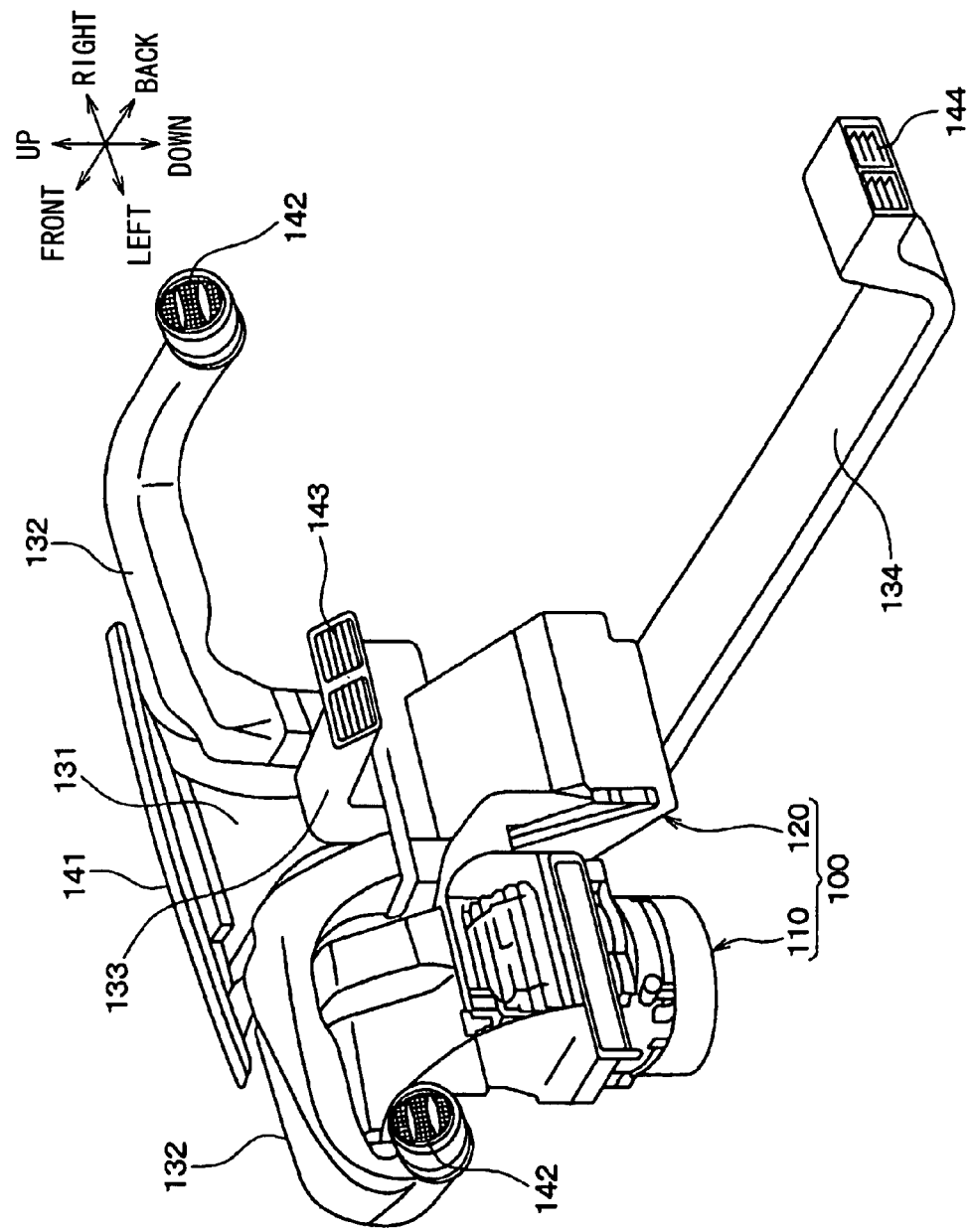
FIG. 1 is a perspective view illustrating the appearance of an interior air conditioning unit of a vehicle air conditioner according to a first embodiment of the present invention.
Figure 2:
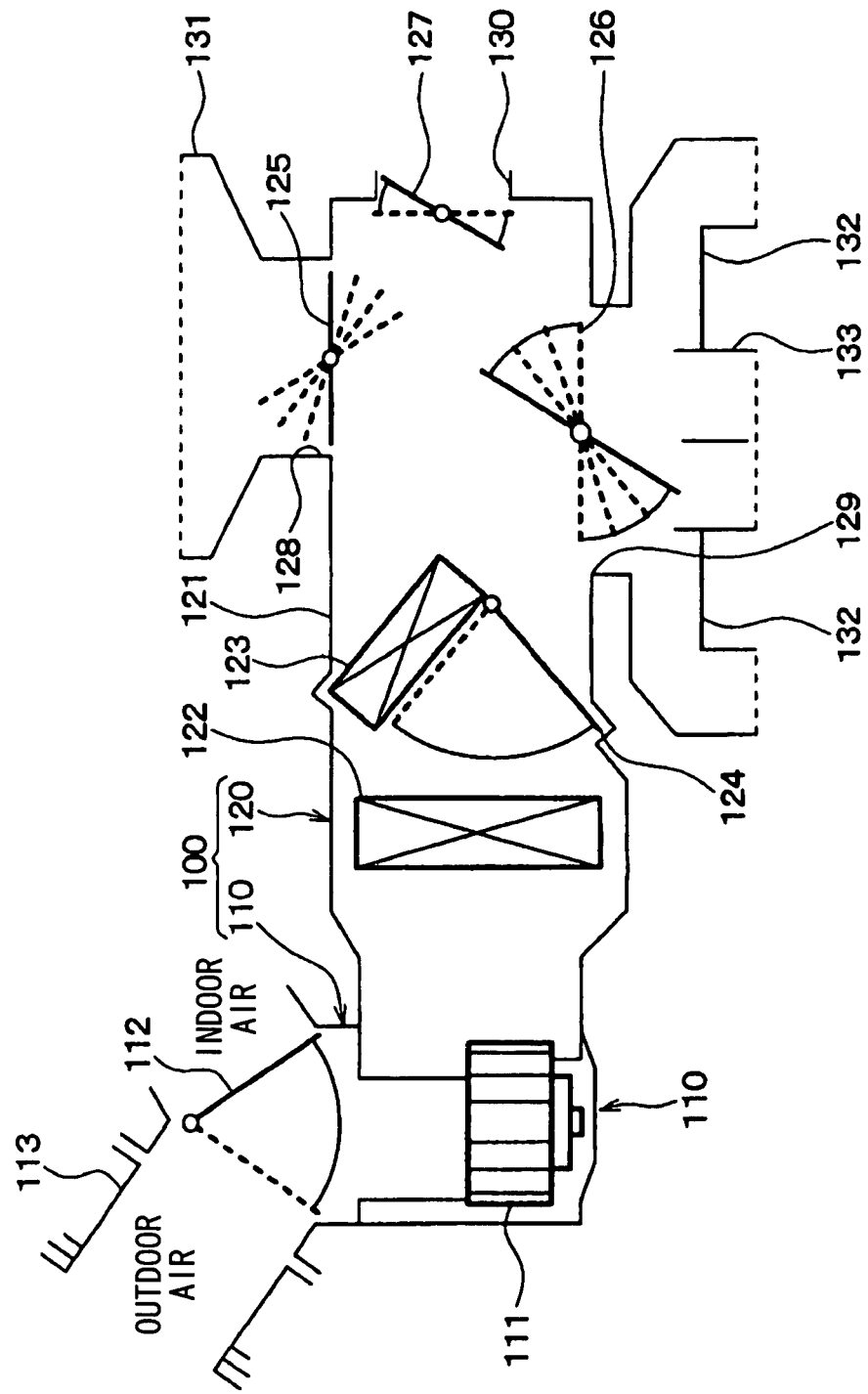
FIG. 2 is a schematic diagram illustrating an inner configuration of an inner air conditioning unit shown in FIG. 1.

First, the configuration of a vehicle air conditioner will be described. FIG. 1 is a perspective view illustrating the appearance of an interior air conditioning unit of the vehicle air conditioner. FIG. 2 is a schematic diagram illustrating an inner configuration of the interior air conditioning unit of FIG. 1. In FIG. 1, upward, downward, leftward, rightward, forward, and backward arrows indicate directions in a state in which the vehicle air conditioner is installed in a vehicle. Also, the interior air conditioning unit of FIG. 1 is an example in which the interior air conditioning unit is installed in a right-handle vehicle having a right steering wheel.

The interior air conditioning unit 100 shown in FIG. 1 mainly includes a blower unit 110 and an air conditioning body unit 120. The blower unit 110 is arranged inside the instrument panel (dash panel) of the vehicle at a passenger seat side. The air conditioning body unit 120 is arranged inside the instrument panel (dash panel) at a substantially-central position in a lateral direction of the vehicle.

Connected to the air conditioning body unit 120 are air ducts for vehicle air conditioning to guide conditioned air from the air conditioning body unit 120 to the vehicle compartment, i.e., a front defroster duct 131, side face ducts 132, a center face duct 133, a rear face duct 134, etc. Registers 141 to 144 constituting respective outlet ports provided at the instrument panel are connected to the downstream side ends of the ducts, respectively. The registers are also called "grilles".

The front defroster duct 131 is connected to a front defroster outlet port 141 for blowing out a conditioning air toward the windshield of the vehicle. The side face ducts 132 are connected to side face outlet ports 142 for blowing out the conditioning air toward the face areas of passengers or toward the side window glasses of the vehicle at opposite lateral ends of the vehicle compartment, respectively. The center face duct 133 is connected to a center face outlet port 143 for blowing out the conditioning air toward the face areas of passengers at the substantially-central position in the lateral direction of the vehicle. The rear face duct 134 is connected to a rear face outlet port 144 for blowing out the conditioning air toward the face areas of passengers on a rear seat in the vehicle compartment.

Since the front defroster outlet port 141, side face outlet ports 142, center face outlet port 143, and rear face outlet port 144 are arranged near the ears of the passengers, it is necessary to reduce noise emitted from the outlet ports to the vehicle compartment. Accordingly, it is necessary to provide a noise attenuating function to the air ducts for vehicle air conditioning, in particular, the front defroster duct 131, side face ducts 132, center face duct 133, and rear face duct 134.

Each of the air ducts for vehicle air conditioning is shaped to have a bending section, in order to change the flow direction of the air due to a limited installation space or the positional relation of the air conditioning body unit 120 with the associated one of the outlet ports 141 to 144. For example, the side face ducts 132 are shaped to extend from the air conditioning body unit 120 in the left and right directions of the vehicle, respectively, and to be bent from positions just before respective side face outlet ports 142 in a substantially-normal direction toward the rear side of the vehicle.

As shown in FIG. 2, the blower unit 110 includes a blower 111, an indoor air/outdoor air switching door 112 arranged above the blower 111 to introduce indoor air (i.e., air inside the vehicle compartment) or outdoor air (i.e., air outside the vehicle compartment) in a switching manner, and an indoor air/outdoor air switching case 113. In accordance with this configuration, the blower unit 110 blows and guides the air introduced from the indoor air/outdoor air switching case 113 to the air conditioning body unit 120 by the blower 111.

The air conditioning body unit 120 adjusts the temperature of the air blown from the blower unit 110, and then discharges the conditioned air to the vehicle compartment. The air conditioning body unit 120 includes an air conditioning case 121 made of a resin material and defining an air passage. The air conditioning case 121 receives an evaporator 122 functioning as a cooling heat exchanger to cool the blown air, a hot-water type heater core 123 functioning as a heating heat exchanger to heat the blown air, an air mixing door 124 for mixing the cooled air and the heated air, and air-outlet mode changing doors 125, 126, and 127 for changing the air-outlet mode (discharging mode), etc.

A defroster opening 128, face openings 129, and foot openings 130 are provided at the air conditioning case 121, in order to allow the temperature-adjusted air, i.e., conditioned air, by the evaporator 122 or/and heater core 123 to be blown from the outlet ports of the instrument panel. The front defroster duct 131, side face ducts 132, center face duct 133, etc. are connected to the defroster opening 128 and face openings 129, respectively.

Although not shown, the vehicle air conditioner also includes a compressor, a condenser, etc. constituting a refrigerant cycle, in addition to the evaporator 122.

Figure 3:
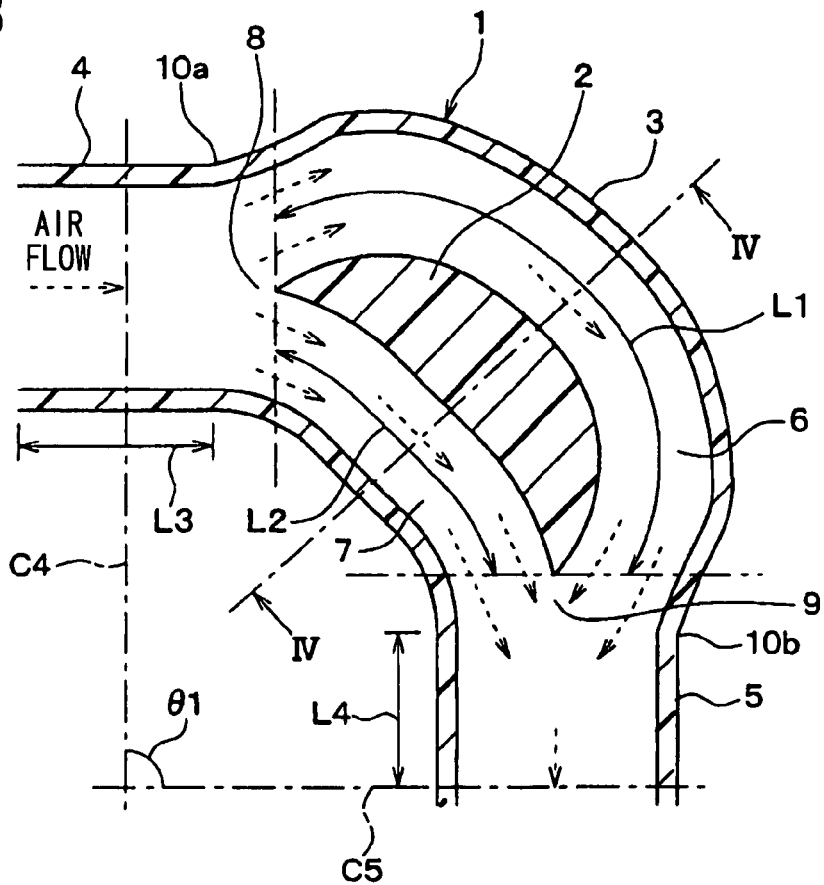
FIG. 3 is a sectional view of a duct according to the first embodiment of the present invention.
Figure 4:
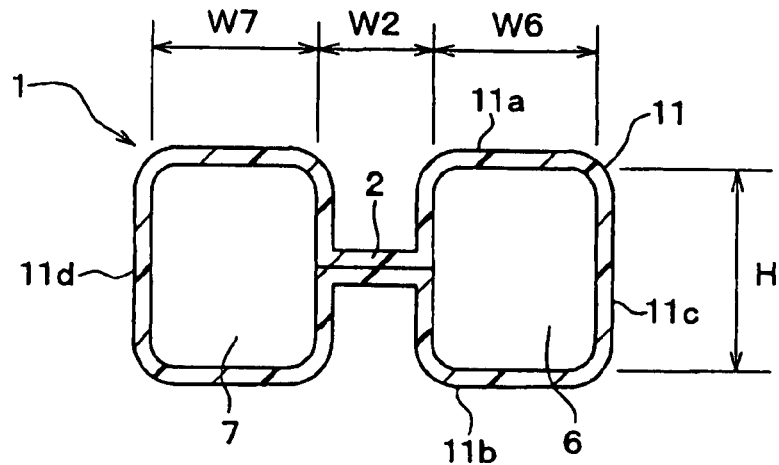
FIG. 4 is a cross-sectional view taken along the line IV-IV of FIG. 3.

FIG. 3 shows a sectional view of an air duct for vehicle air conditioning according to the first embodiment of the present invention. FIG. 4 is a cross-sectional view taken along the line IV-IV of FIG. 3.

FIG. 3 is a sectional view showing a bending section just before the side face outlet port 142 and a section near the bending section of the side face duct 132 shown in FIG. 1. This sectional view is taken along a horizontal plane direction of the side face duct 132 shown in FIG. 1. The "bending section just before the outlet port" means a bending section nearest to the outlet port in a case in which the duct has a plurality of bending sections.

As shown in FIG. 3, the side face duct 132 of this embodiment includes a duct body 1, and a passage dividing wall 2 for dividing a passage defined in the duct body 1.

The duct body 1 has a tube shape to define an air passage therein. The duct body 1 guides conditioned air from the air conditioning body unit 120 to at least an outlet port. The duct body 1 is made of a resin material, for example, polypropylene (PP), etc., and is molded by blow molding or injection molding, for example.

The duct body 1 includes a bending section 3, an upstream-side straight section 4, and a downstream-side straight section 5. In the duct body 1, the bending section 3 changes the flow direction of air, the upstream-side straight section 4 having a rectilinear shape is connected to an upstream side of the bending section 3 in an air flow direction, and the downstream-side straight section 5 having a rectilinear shape is connected to a downstream side of the bending section 3 in the air flow direction. In this embodiment, the bending angle of the bending section 3 is a right angle or a substantially-right angle. Here, the "bending angle" means an angle formed between a plane perpendicular to the direction of a main flow of air introduced into the bending section 3 and a plane perpendicular to the direction of the main flow of air discharged from the bending section 3. The bending angle in FIG. 3 is an angle θ1 formed between a virtual plane C4 perpendicular to the direction of the main flow of air in the upstream-side straight section 4 and a virtual plane C5 perpendicular to the direction of the main flow of air in the downstream-side straight section 5.

In the bending section 3 which is arranged in a middle portion of the duct body 1 in an air flow direction, the passage dividing wall 2 is arranged at the center of a passage in a bending diameter direction. In the bending section 3, the air passage is divided into two air passages, i.e., an outer-periphery-side air passage 6 as a first passage and an inner-periphery-side air passage 7 as a second passage, by the passage dividing wall 2.

The passage dividing wall 2 is formed by, for example, bending upper and lower wall portions 11a and 11b of a wall 11 constituting the duct body 1 toward the inside of the duct body 1, such that the upper and lower wall portions 11a and 11b have a concave shape, as shown in FIG. 4.

The duct body 1, which has the above-described configuration, may be manufactured by performing step of: molding the duct body 1 to have an integral structure; bending the upper and lower wall portions 11a and 11b toward the inside of the duct body 1 such that the upper and lower wall portions 11a and 11b have a concave shape; and joining the concave-shaped portions by using, for example, ultrasonic welding or the like, as shown in FIG. 4.

Figure 5:
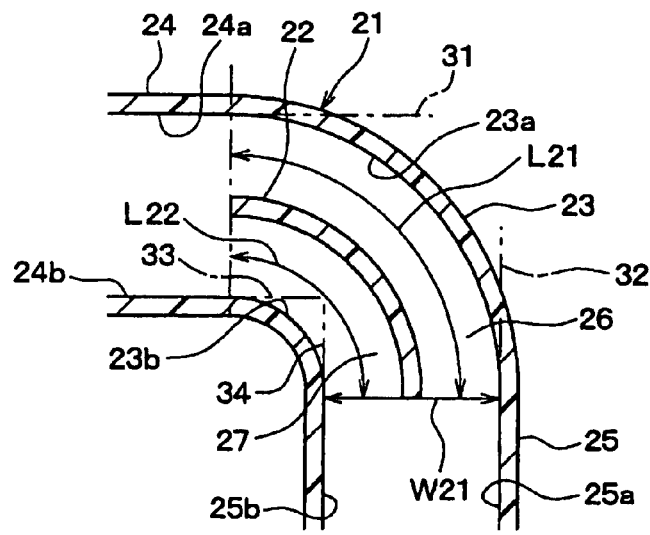
FIG. 5 is a sectional view of a duct according to a Comparative Example 1 compared to the first embodiment.
Figure 6:
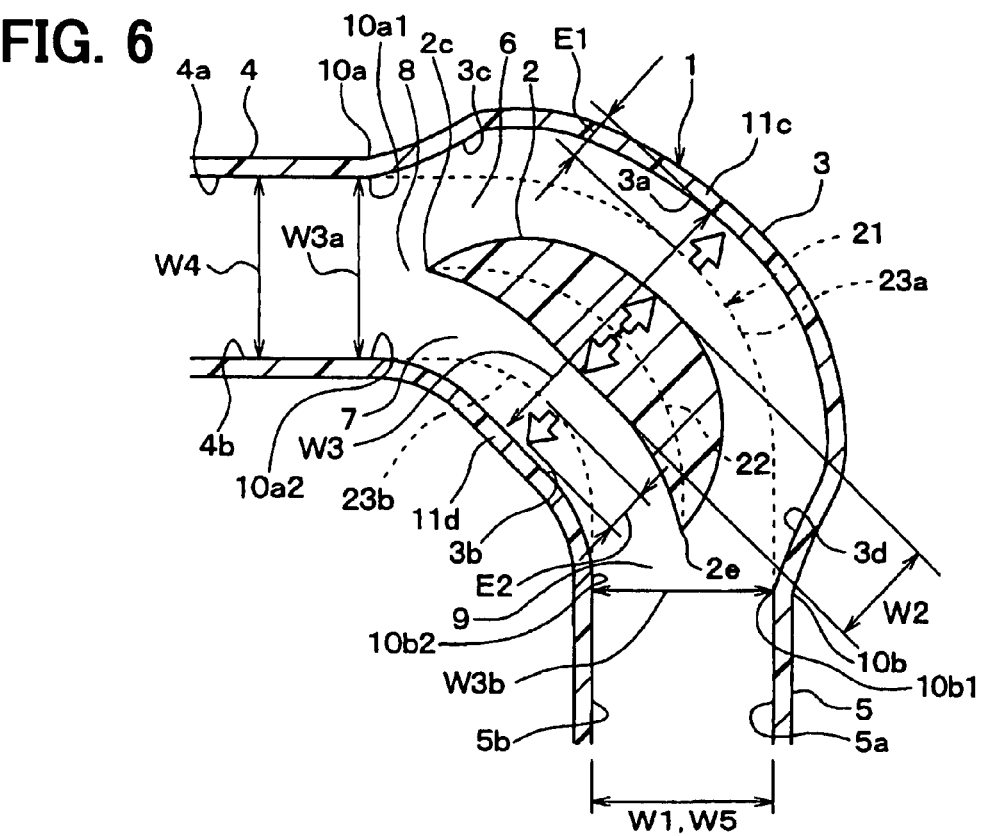
FIG. 6 is a view showing a structure in which the duct of FIG. 5 is overlapped with the duct of FIG. 3.

FIG. 5 shows a sectional view of an air duct according to Comparative Example 1 compared to this embodiment. FIG. 6 shows the air duct of FIG. 5 overlapped against the air duct of FIG. 3. In FIG. 6, the broken line indicates the air duct of FIG. 5.

Similarly to the air duct shown in FIG. 3, the air duct shown in FIG. 5 includes a duct body 21 and a passage dividing wall 22. Also, the duct body 21 includes a bending section 23, an upstream-side straight section 24, and a downstream-side straight section 25. In the bending section 23, the air passage thereof is divided into an outer-periphery-side air passage 26 and an inner-periphery-side air passage 27 by the passage dividing wall 22. In the duct shown in FIG. 5, however, the passage dividing wall 22 has a planar shape having a uniform width (uniform wall thickness). The duct body 21 has a uniform width W21.

As shown in FIG. 5, in the duct body 21 of Comparative Example 1, the cross-sectional shape of an outer-periphery-side inner wall surface 23a of the bending section 23 is an arc shape to which extension lines 31 and 32 are tangent. The extension line 31 extends from an outer-periphery-side inner wall surface 24a of the upstream-side straight section 24 toward the bending section 23 in parallel to the outer-periphery-side inner wall surface 24a. The extension line 32 extends from an outer-periphery-side inner wall 25a of the downstream-side straight section 25 toward the bending section 23 in parallel to the outer-periphery-side inner wall surface 25a. Similarly, the cross-sectional shape of an inner-periphery-side wall surface 23b of the bending section 23 is an arc shape to which extension lines 33 and 34 are tangent. The extension line 33 extends from an inner-periphery-side inner wall surface 24b of the upstream-side straight section 24 toward the bending section 23 in parallel to the inner-periphery-side inner wall surface 24b. The extension line 34 extends from an inner-periphery-side inner wall surface 25b of the downstream-side straight section 25 toward the bending section 23 in parallel to the inner-periphery-side inner wall surface 25b.

When the shape of the duct body 1 in the first embodiment is compared with the shape of the duct body 21 shown in FIG. 5, it can be seen, as shown in FIG. 6, that the duct body 1 is shaped such that the duct widths W3a and W3b in a bending diameter direction at an inlet 10a and an outlet 10b of the bending section 3 are equal to those of the duct shown in FIG. 5. In contrast, the outer-periphery-side wall 11c is enlarged toward the bending outer periphery in the overall region of the bending section 3, as compared to the outer-periphery-side inner wall surface 23a of the bending section 23 in the duct body 21 shown in FIG. 5, and the inner-periphery-side wall 11d is enlarged toward the bending inner periphery in the overall region of the bending section 3, as compared to the inner-periphery-side inner wall surface 23b of the bending section 23 in the duct body 21 shown in FIG. 5, as indicated by arrows in FIG. 6.

That is, referring to the cross-sectional shape of the duct body 1, as shown in FIG. 6, that the outer-periphery-side inner wall surface 3a of the bending section 3 is enlarged toward the bending outer periphery, as compared to the arc-shaped virtual line 23a. The arc-shaped virtual line 23a is a line which connects an outer-periphery-side downstream end 10a1 of the upstream-side straight section 4 and an outer-periphery-side upstream end 10b1 of the downstream-side straight section 5 and to which extension lines extending from an outer-periphery-side inner wall surface 4a of the upstream-side straight section 4 and an outer-periphery-side inner wall surface 5a of the downstream-side straight section 5 are tangent. Also, the inner-periphery-side inner wall surface 3b of the bending section 3 is enlarged toward the bending inner periphery, as compared to the arc-shaped virtual line 23b. The arc-shaped virtual line 23b is a line which connects an inner-periphery-side downstream end 10a2 of the upstream-side straight section 4 and an inner-periphery-side upstream end 10b2 of the downstream-side straight section 5 and to which extension lines extending from an inner-periphery-side inner wall surface 4b of the upstream-side straight section 4 and an inner-periphery-side inner wall surface 5b of the downstream-side straight section 5 are tangent.

In detail, when the longitudinal cross-section of the duct body 1 shown in FIG. 6 is assumed to be a reference cross-section including an upstream air flow direction of conditioned air flowing in the upstream-side straight section 4 and a downstream air flow direction of conditioned air flowing in the downstream-side straight section 5, the outer-periphery-side inner wall surface 3a and inner-periphery-side inner wall surface 3b of the bending section 3 are lines of intersection with the reference cross-section. Also, the arc-shaped virtual line 23a is an outer reference line connecting the outer-periphery-side inner wall surface 4a of the upstream-side straight section 4 and the outer-periphery-side inner wall surface 5a of the downstream-side straight section 5 via an arc, to which the upstream air flow direction and the downstream air flow direction are tangent. The arc-shaped virtual line 23b is an inner reference line connecting the inner-periphery-side inner wall surface 4b of the upstream-side straight section 4 and the inner-periphery-side inner wall surface 5b of the downstream-side straight section 5 via an arc, to which the upstream air flow direction and the downstream air flow direction are tangent. Accordingly, the bending section 3 may have a shape in which an outer intersection line 3a extends outside the outer reference line 23a and an inner intersection line 3b extends inside the inner reference line 23b. The outer intersection line 3a is a line of intersection between the outer-periphery-side inner wall surface and the reference cross-section. The inner intersection line 3b is a line of intersection between the inner-periphery-side inner wall surface and the reference cross-section.

Thus, the duct body 1 of this embodiment is shaped such that, in the overall region of the bending section 3, the duct width W3 of the bending section 3 is larger than the duct width W3a at the inlet 10a of the bending section 3 and the duct width W3b at the outlet 10b of the bending section 3. That is, the duct body 1 is shaped such that the duct width W3 in the overall region of the bending section 3 is larger than the duct width W4 of the upstream-side straight section 4 and the duct width W5 of the downstream-side straight section 5.

Here, the above-described duct width means the width of the duct body 1 in a direction parallel to the sheet plane of FIG. 6, i.e., the width of the duct body 1 in a direction parallel to the outer-periphery-side air passage 6 and inner-periphery-side air passage 7. The duct width W3a is a duct width at a position just before a passage dividing portion. The duct width W3b is a duct width at a position just after a passage joining portion. The duct width W3 of the bending section 3 corresponds to a sum of the cross-sectional width W6 of the outer-periphery-side air passage 6, the cross-sectional width W7 of the inner-periphery-side air passage 7, and the cross-sectional width W2 of the passage dividing wall 2. The cross-sectional width W2 of the passage dividing wall 2 corresponds to the space between the outer-periphery-side air passage 6 and the inner-periphery-side air passage 7.

As the duct body 1 has the above-described shape in this embodiment, the length L1 of the outer-periphery-side air passage 6 increases and the length L2 of the inner-periphery-side air passage 7 decreases, as compared to the duct shown in FIG. 5. Thus, the passage length difference "L1–L2" is about in a range of 0.085 m to 0.215 m corresponding to a range of lengths required for a noise reduction by interference to noise having a frequency of 800 Hz to 2 kHz. Each of the lengths L1 and L2 of the outer-periphery-side air passage 6 and the inner-periphery-side air passage 7 is a distance from the position of a passage cross-section at the upstream end 2c of the passage dividing wall 2 to the position of a passage cross-section at the downstream end 2e of the passage dividing wall 2. The lengths L1 and L2 are the length of a line connecting approximately the centers of the passage cross-sections.

As shown in FIG. 6, the cross-sectional shapes of the outer-periphery-side inner wall surface 4a of the upstream-side straight section 4, the outer-periphery-side inner wall surface 3a of the bending section 3, and outer-periphery-side inner wall surface 5a of the downstream-side straight section 5 are convex toward the inside of the duct in the vicinity of the inlet 10a and outlet 10b of the bending section 3, and are convex toward the outside of the duct in regions of the bending section 3 other than the inlet 10a and outlet 10b. That is, the outer-periphery-side inner wall surface 3a of the bending section 3 has a cross-sectional shape having inflection points 3c and 3d at the inlet 10a and outlet 10b.

The width W2 of the passage dividing wall 2 in an arrangement direction of the outer-periphery-side air passage 6 and the inner-periphery-side air passage 7 increases to be larger than the plate-shaped passage dividing wall 22, as indicated by arrows in FIG. 6. Therefore, the width W2 is equal to the enlarged width "E1+E2" of the outer-periphery-side wall 11c and inner-periphery-side wall 11d of the bending section 3.

Figure 7:
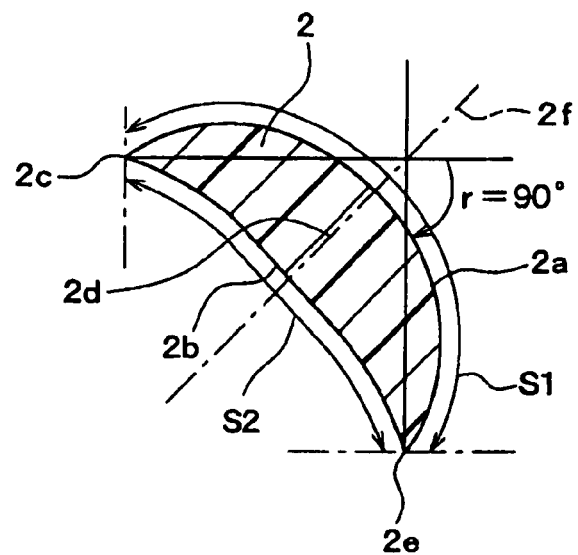
FIG. 7 is an enlarged view of a passage dividing wall shown in FIG. 3.

FIG. 7 shows a view illustrating a portion of the passage dividing wall 2 shown in FIG. 3. As shown in FIG. 7, the outer-periphery-side wall surface 2a of the passage dividing wall 2 is shaped to conform to the outer-periphery-side inner wall surface 3a of the bending section 3, whereas the inner-periphery-side wall surface 2b of the passage dividing wall 2 is shaped to conform to the inner-periphery-side inner wall surface 3b of the bending section 3. In detail, the outer-periphery-side wall surface 2a is curved in the overall region thereof, whereas the inner-periphery-side wall surface 2b is planar in a certain region thereof, and is curved in other regions thereof.

The width of the passage dividing wall 2 increases gradually as the passage dividing wall 2 extends from the upstream end 2c in the air flow direction to a middle portion 2d in the air flow direction, and decreases gradually as the passage dividing wall 2 extends from the middle portion 2d to the downstream end 2e in the air flow direction. Thus, the passage dividing wall 2 has a blade shape linearly symmetrical to a virtual line 2f passing the middle portion 2d, or a substantially-crescent shape.

Since the passage dividing wall 2 has the above-described shape in this embodiment, the passage cross-sectional areas of the outer-periphery-side air passage 6 and the inner-periphery-side air passage 7 are substantially uniform in the flow direction of conditioned air. Here, the term "substantially uniform" means that, when passage cross-sectional areas are measured at a plurality of positions having different air flow directions, the deviation between the average value of the measured passage cross-sectional areas and each of the measured passage cross-sectional areas is within 30% of the average value.

The ratio between the lengths S1 and S2, in the air flow direction, of the wall surface 2a at the side of the outer-periphery-side air passage 6 and the wall surface 2b at the side of the inner-periphery-side air passage 7, i.e., the periphery-side length ratio S2:S1, is, for example, 1:1.29. This periphery-side length ratio is larger than the periphery-side length ratio of a flow guide blade disclosed in Japanese Laid-open Patent Publication No. 2003-194018, i.e., 1:1.03.

Although the flow guide blade disclosed in Japanese Laid-open Patent Publication No. 2003-194018 is shaped to prevent a flow division phenomenon, the passage dividing wall 2 of this embodiment is shaped to increase the difference between the length L1 of the outer-periphery-side air passage 6 and the length L2 of the inner-periphery-side air passage 7. Thus, the duct of this embodiment has an unusual shape in that the duct is required a smooth air flow. Although the periphery-side length ratio S2:S1 is 1:1.29 in this embodiment, it may have other values, as long as it is larger than 1:1.03. It is preferred that the ratio of the outer-periphery-side length S1 of the wall surface 2a at the outer-periphery-side air passage 6 to the inner-periphery-side length S2 of the wall surface 2b at the inner-periphery-side air passage 7 be 1.1 to 2.0 for a noise reduction in a vehicle air conditioner, i.e., a reduction of noise in a low frequency band of 0.8 kHz to 2 kHz.

In the dimensions of the duct of this embodiment, the duct widths W4, W5, W3a, and W3b of the upstream-side straight section 4, the downstream-side straight section 5, the inlet 10a of the bending section 3, and the outlet 10b of the bending section 3 are, for example, 70 mm (see FIG. 6). The width W6 of the outer-periphery-side air passage 6 and the width W7 of the inner-periphery-side air passage 7 are 35 mm at minimum, taking into consideration the security of a desired passage area. The width W2 of the passage dividing wall 2 is 30 mm. The height H of the duct body 1 is 25 mm to 50 mm (see FIG. 4). The duct widths W4 and W5 are variable within a range of 50 mm to 140 mm, taking into consideration the installation space of the air duct for vehicle air conditioning. In particular, it is preferred that the duct widths W4 and W5 are 70 mm to 120 mm. Also, the length L3 of the upstream-side straight section 4 is 85 mm to 500 mm, whereas the length L4 of the downstream-side straight section 5 is 42 mm to 500 mm (see FIG. 3). The sum of the passage cross-sectional areas of the upstream-side straight section 4 and downstream-side straight section 5 and the sum of the passage cross-sectional areas of the outer-periphery-side air passage 6 and the inner-periphery-side air passage 7 are, for example, 2,000 mm² to 5,000 mm².

In the duct of this embodiment having the above-described configuration, as indicated by broken-line arrows in FIG. 3, a conditioned air from the air conditioning unit flows through the upstream-side straight section 4 of the duct body 1, flows through the outer-periphery-side air passage 6 and the inner-periphery-side air passage 7 after being divided at a passage branching portion 8 arranged at the inlet 10a of the bending section 3, and then flows through the downstream-side straight section 5 after being joined at a passage joining portion 9. Thereafter, the conditioned air reaches an outlet port disposed at the downstream side of the downstream-side straight section 5 of the duct body 1, so that it is introduced into the vehicle compartment. In this case, sound waves passing through the two air passages 6 and 7 in the bending section 3 interfere with each other, so that they are attenuated. The sound waves are out of phase with each other (i.e., they have a phase difference) at the passage joining portion 9 due to the difference between the travel lengths of the sound waves, i.e., "L1−L2".

In order to cancel out-of-phase sound waves by interference therebetween, it is preferred that the energy levels of the out-of-phase sound waves are approximately equal. Therefore, it is preferred that the passage cross-sectional areas of the outer-periphery-side air passage 6 and the inner-periphery-side air passage 7 are substantially equal. Here, the substantial equalization of the passage cross-sectional areas means that, when one passage cross-sectional area of the outer-periphery-side air passage 6 and the inner-periphery-side air passage 7 is assumed to be 1, the other passage cross-sectional area is 0.7 to 1.3. Each of the passage cross-sectional areas of the outer-periphery-side air passage 6 and the inner-periphery-side air passage 7 making the energy levels of the sound waves approximately equal depends on the shape of the duct body 1. Accordingly, it is preferred that the passage cross-sectional areas of the outer-periphery-side air passage 6 and the inner-periphery-side air passage 7 are equal, or one passage cross-sectional area is larger than the other passage cross-sectional area such that the energy levels of the sound waves are approximately equal.

Also, in this embodiment, the sum of the passage cross-sectional areas of the outer-periphery-side air passage 6 and the inner-periphery-side air passage 7 in the bending section 3 is equal to the sum of the passage cross-sectional areas of the upstream-side straight section 4 and downstream-side straight section 5. As a result, the passage cross-sectional areas of the outer-periphery-side air passage 6 and the inner-periphery-side air passage 7 are reduced, so that an increase in the pressure loss of an air flow is prevented.

Hereinafter, advantages and effects of the first embodiment will be described.

(1) In this embodiment, as described above, the duct body 1 is shaped such that the duct widths W4 and W5 of the upstream-side straight section 4 and downstream-side straight section 5 are equal to the duct width W21 of the duct shown in FIG. 5, and only one of the bending section 3, upstream-side straight section 4, and downstream-side straight section 5, i.e., the bending section 3 is enlarged in a diameter direction. Also, the passage dividing wall 2 is shaped to conform to the inner wall surfaces 3a and 3b of the bending section 3.

Accordingly, it is possible to increase the passage length difference "L1−L2" such that it is larger than the passage length difference "L21−L22" in the duct of FIG. 5, by increasing the length L1 of the outer-periphery-side air passage 6 while decreasing the length L2 of the inner-periphery-side air passage 7, as compared to the duct of FIG. 5. As a result, it is possible for the passage length difference "L1−L2" of the duct body 1 to be a value required for a noise reduction by interference to noise having a frequency of 800 Hz to 2 kHz, i.e., 0.085 m to 0.215 m, while suppressing a large size of the duct body 1.

For example, in the duct shown in FIG. 5, when the width W21 in the duct diameter direction is 70 mm, the passage length difference between the length L21 of the outer-periphery-side air passage 26 and the length L22 of the inner-periphery-side air passage 27 can be 55 mm. At this passage length difference and under standard atmospheric pressure, it is possible to obtain noise attenuation effect by interference to noise having a central frequency of 3.1 kHz, as calculated when the sound velocity at room temperature, i.e., about 340 m/s, is applied to the following relation equation between a frequency f and a passage length difference ΔL.

Here, the following relation is established between a frequency and a wavelength of a sound.

$$f = c/\lambda, \text{ c: sound velocity (m/s), and } \lambda: \text{ sound wavelength (m)}$$

Also, the following relation is established between a wavelength and a passage length difference required for interference.

$$\Delta L = \lambda/2$$

Accordingly, the relation equation between the passage length difference and the frequency can be expressed as follows.

$$f = c/(2\Delta L)$$

When it is desired to lower frequency reducing the noise below the above-described frequency, for example, it is desired for frequency to be 1.6 kHz (the vicinity of the center of 1 kHz to 2 kHz), the passage length difference required based on the above-described relation equation is 106 mm (0.106 m). In the duct shown in FIG. 5, the duct width W21 should increase from 70 mm to 135 mm or more. In this case, the duct body shapes before and after the enlargement should have a resemblance to each other.

For reference, in a duct having a resemblance to the duct illustrated in FIG. 1 of Japanese Laid-open Patent Publication No. 2004-196180, when the duct width of the straight section is 70 mm, the maximum duct width required to provide a passage length difference for a reduction of noise having a frequency of 1.6 kHz is 159 mm or more. This width is considerably outside of the standard width range of ducts for vehicle air conditioning, for example, a range of 70 mm to 110 mm.

On the contrary, in the duct of this embodiment, it is possible for the frequency reducing the noise to be, for example, 1.6 kHz (the vicinity of the center of 1 kHz to 2 kHz) only by increasing the duct width W3 to be 70 mm to 100 mm in regions other than the inlet 10a and outlet 10b of the bending portion 3 while maintaining the duct widths W3a and W3b at the inlet 10a and outlet 10b of the bending portion 3 to be 70 mm.

Figure 8:
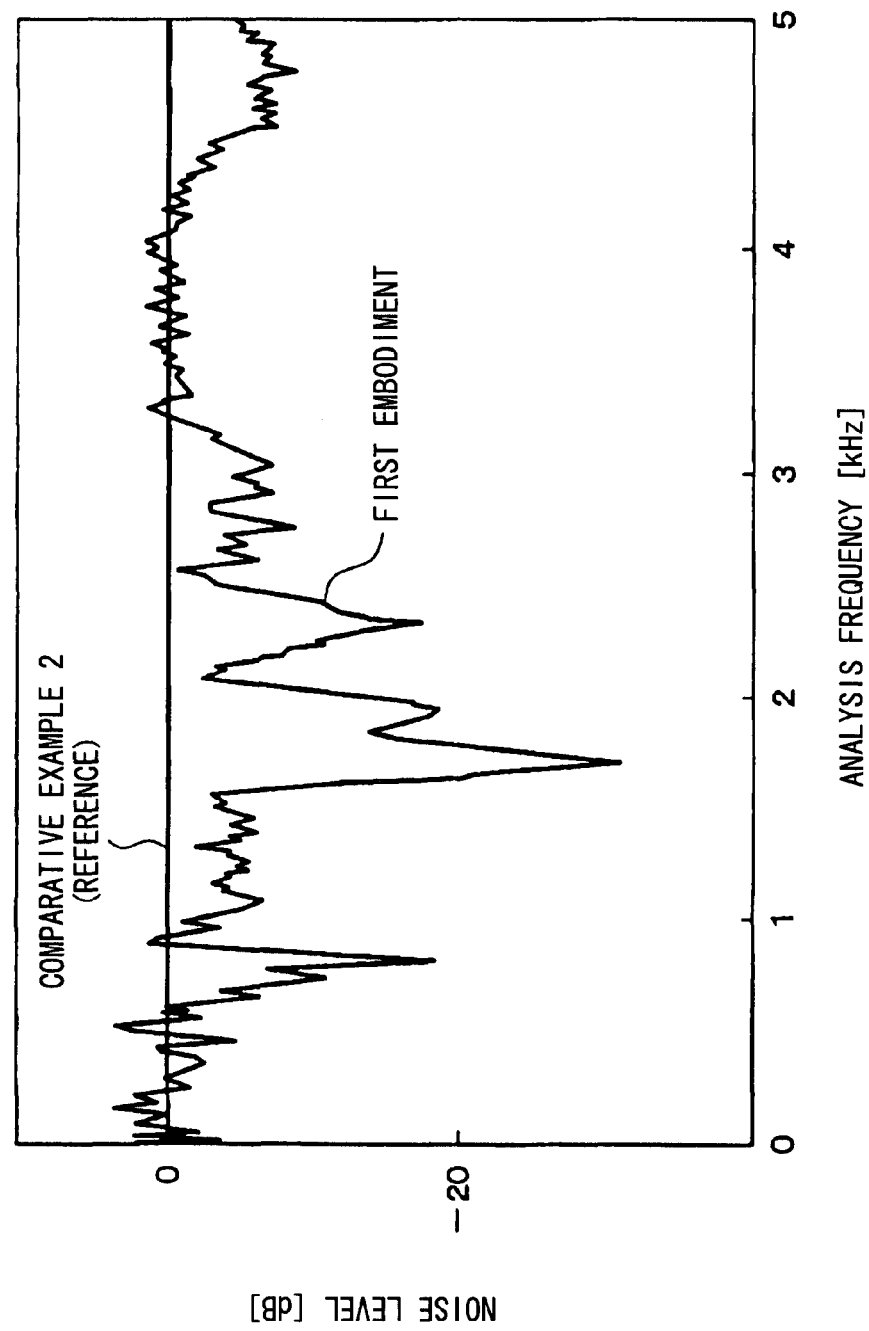
FIG. 8 is a graph depicting the results of examination for a noise attenuation effect of a duct body 1 according to the first embodiment.

The results of examination for the noise reduction effect in the duct body 1 are shown in FIG. 8. FIG. 8 shows the results of examination for a noise attenuation effect obtained when a noise generated in a case, where the duct of Comparative Example 2 is used, is applied as reference noise. The Comparative Example 2 shows a duct having a structure in which the passage dividing wall 22 is omitted from the duct body 21 shown in FIG. 5. As shown in FIG. 8, in accordance with the duct body 1 of this embodiment, there is a noise attenuation effect in a range of 1.5 kHz to 2 kHz having a center frequency of 1.6 kHz. It can also be seen that, even for noise in a range of 500 Hz to 1.5 kHz or 2.0 kHz to 2.5 kHz, there is a noise attenuation effect, even though it has a reduced level.

(2) In this embodiment, the passage dividing wall 2 has a substantially-crescent shape, as shown in FIGS. 3 and 6 and as described above. Also, the passage branching portion 8 and the passage joining portion 9 have a Y shape as the outer-periphery-side inner wall surface 3a is convex toward the inside of the duct in the vicinity of the inlet 10a and outlet 10b of the bending section 3 while being bent to be enlarged toward the outer periphery.

Here, the "Y-shaped passage branching portion 8" means that the flow direction of air introduced into the outer-periphery-side air passage 6 and the inner-periphery-side air passage 7 forms an acute angle with respect to the flow direction of a main air flow in the upstream-side straight section 4, i.e., the flow direction of air directed from the upstream-side straight section 4 to the upstream end 2c of the passage dividing wall 2, as shown in FIG. 3. Similarly, the "Y-shaped passage joining portion 9" means that the flow direction of air introduced from the outer-periphery-side air passage 6 and the inner-periphery-side air passage 7 into the downstream-side straight section 5 forms an acute angle with respect to the flow direction of a main air flow in the downstream-side straight section 5, as shown in FIG. 3.

Thus, in this embodiment, the passage branching portion 8 has a Y shape, and the flow direction of air introduced into the outer-periphery-side air passage 6 forms an acute angle with respect to the flow direction of a main air flow in the upstream-side straight section 4 so that they cannot be parallel to each other. Accordingly, it is possible to increase the passage length difference "L1–L2" in this embodiment, as compared to the case in which the outer-periphery-side inner wall surface 3a does not have a shape convex toward the inside of the duct, and the flow direction of air introduced into the outer-periphery-side air passage 6 is parallel to the flow direction of a main air flow in the upstream-side straight section 4, different from this embodiment.

Figure 55:
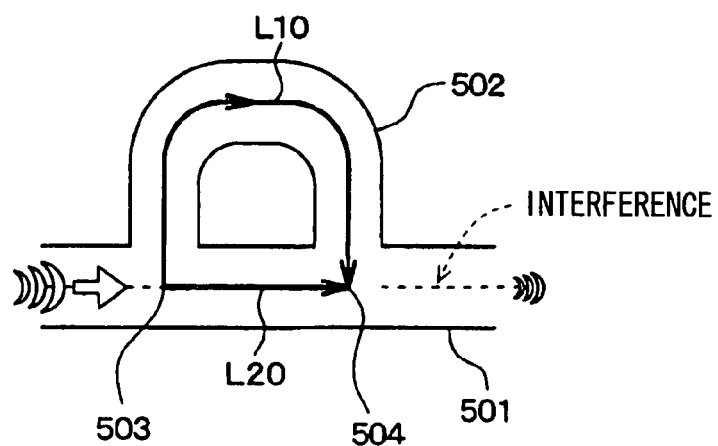
FIG. 55 is a schematic diagram of an interference type sound attenuator disclosed in a book "Noise Attenuation Chapter of Technology and Law for Environmental Pollution Prevention"

Meanwhile, as shown in FIG. 55, a sound mainly flows through a passage associated with the former branched fluid flow direction, due to the directionality of sound waves, when one of branched fluid flow directions at a branching portion, at which a fluid flow direction is branched into the branched fluid flow directions, is parallel to the fluid flow direction just before the branching portion in the fluid flow direction, and the other branched fluid flow direction is normal to the fluid flow direction. When the passage associated with the branched fluid flow direction parallel to the fluid flow direction before the branching is squeezed to have a reduced passage cross-sectional area, in order to equalize the energy levels of sounds flowing through the branched passages, as a measure against the above-mentioned problem, there is a problem in that an increase in air flow resistance occurs due to the reduced passage cross-sectional area.

On the contrary, in this embodiment, the passage branching portion 8 has a Y shape. Thus, the flow directions of air introduced into the outer-periphery-side air passage 6 and the inner-periphery-side air passage 7 are not parallel to the flow direction of the main air flow in the upstream-side straight section 4, but form an angle other than a right angle, i.e., an acute angle, with respect to the flow direction of the main air flow. Accordingly, it is possible to achieve travel of sounds in such a manner that the energy levels of sounds in the outer-periphery-side air passage 6 and the inner-periphery-side air passage 7 are equalized, without squeezing one of the outer-periphery-side air passage 6 and the inner-periphery-side air passage 7 to have a reduced passage cross-sectional area.

In a manner different from this embodiment, when the flow directions of air discharged from the outer-periphery-side air passage 6 and the inner-periphery-side air passage 7 are parallel to each other, sound waves passing through the outer-periphery-side air passage 6 and sound waves passing through the inner-periphery-side air passage 7 pass through the downstream-side straight section 7 in a parallel state. As a result, only the parts of the sound waves positioned near the outer-periphery-side air passage 6 and the inner-periphery-side air passage 7 interfere with each other, whereas the parts of the sound waves positioned far from the outer-periphery-side air passage 6 and the inner-periphery-side air passage 7 are emitted from the outlet port to the vehicle compartment without interfering with each other. Therefore, the noise reduction effect by interference is relatively small.

On the contrary, in this embodiment, the passage joining portion 9 has a Y shape. Thus, the flow directions of air directed from the outer-periphery-side air passage 6 and the inner-periphery-side air passage 7 to the downstream-side straight section 5 intersect each other. Accordingly, most sound waves passing through the outer-periphery-side air passage 6 and the inner-periphery-side air passage 7 can interfere with each other, as compared to the case in which the flow directions of air passing through the outer-periphery-side air passage 6 and the inner-periphery-side air passage 7 are parallel to each other. Thus, in accordance with this embodiment, it is possible to obtain a relatively large noise reduction effect.

(3) In a case different from this embodiment, where the duct has a shape, in which the upstream-side straight section 4 is omitted from the duct body 1 of FIG. 3, i.e., where the shape shown in FIG. 3 is not applied to the bending section arranged just before the outlet port, but applied to the bending section arranged at the air inlet of each side face duct 132, a sound enters the bending section under the condition in which the distribution of sound pressure in a direction parallel to the outer-periphery-side air passage 6 and the inner-periphery-side air passage 7 is non-uniform. Therefore, even when the outer-periphery-side air passage 6 and the inner-periphery-side air passage 7 have the same passage cross-sectional area, the energy levels of sounds passing through the outer-periphery-side air passage 6 and the inner-periphery-side air passage 7 are different from each other. As a result, there is a problem in that the noise reduction effect by interference is reduced.

On the contrary, in this embodiment, the duct body 1 includes the upstream-side straight section 4, which is arranged upstream of the bending section 3 and has a certain length L3. Accordingly, a sound, which passes through the duct body 1, has a uniform sound pressure distribution in a direction parallel to the outer-periphery-side air passage 6 and inner-periphery-side air passage 7, at the upstream-side straight section 4. The sound is then branched into the outer-periphery-side air passage 6 and inner-periphery-side air passage 7, at the bending section 3. Therefore, in accordance with this embodiment, it is possible to always equalize the energy levels of sounds passing through the outer-periphery-side air passage 6 and inner-periphery-side air passage 7, and thus to enhance the noise reduction effect by interference, by setting the passage cross-sectional areas of the outer-periphery-side air passage 6 and the inner-periphery-side air passage 7 such that the energy levels of sounds passing through the outer-periphery-side air passage 6 and the inner-periphery-side air passage 7 are equalized.

The length L3 of the upstream-side straight section 4 required to obtain a uniform sound pressure distribution is a length required to form a stationary wave of a sound having a frequency promoting a noise reduction by interference, i.e., a length equal to or longer than a ½ wavelength of a sound having a frequency promoting a noise reduction by interference. For example, in order to reduce a noise having a frequency of 2 kHz, the length of the upstream-side straight section 4 required to obtain a uniform sound distribution is 85 mm or more. The length should be 121 mm or more to reduce a noise having a frequency of 1.4 kHz. The length should be 212 mm or more to reduce a noise having a frequency of 0.8 kHz. Accordingly, it is preferred that the length L3 of the upstream-side straight section 4 is 85 mm or more, in order to, at least, reduce a noise having a frequency of 2 kHz. It is preferred that the length L3 of the upstream-side straight section 4 is 121 mm or more, in order to, at least, reduce a noise having a frequency of 1.4 kHz to 2 kHz. Also, it is preferred that the length L3 of the upstream-side straight section 4 is 212 mm or more, in order to, at least, reduce a noise having a frequency of 0.8 kHz to 2 kHz.

(4) In a case different from this embodiment, where the duct has a shape, in which the downstream-side straight section 5 is omitted from the duct body 1 of FIG. 3, and an outlet port is connected to the outlet 10b of the bending section 3 in this duct, sounds passing through the outer-periphery-side air passage 6 and the inner-periphery-side air passage 7 are diffused from the outlet port before being joined. Therefore, in this case, it is difficult for an interference phenomenon to occur between the sounds passing through the outer-periphery-side air passage 6 and inner-periphery-side air passage 7. As a result, the noise reduction effect is reduced.

On the contrary, in the first embodiment, the duct body 1 includes the downstream-side straight section 5, which is arranged downstream of the bending section 3 and has a certain length L4. Accordingly, sounds passing through the outer-periphery-side air passage 6 and the inner-periphery-side air passage 7 of the bending section 3 are joined, so that they can interfere with each other while passing through the downstream-side straight section 5. Accordingly, it is possible to enhance the noise reduction effect by interference, as compared to the case where the duct has a shape, in which the downstream-side straight section 5 is omitted from the duct body 1 of FIG. 3.

Figure 9:
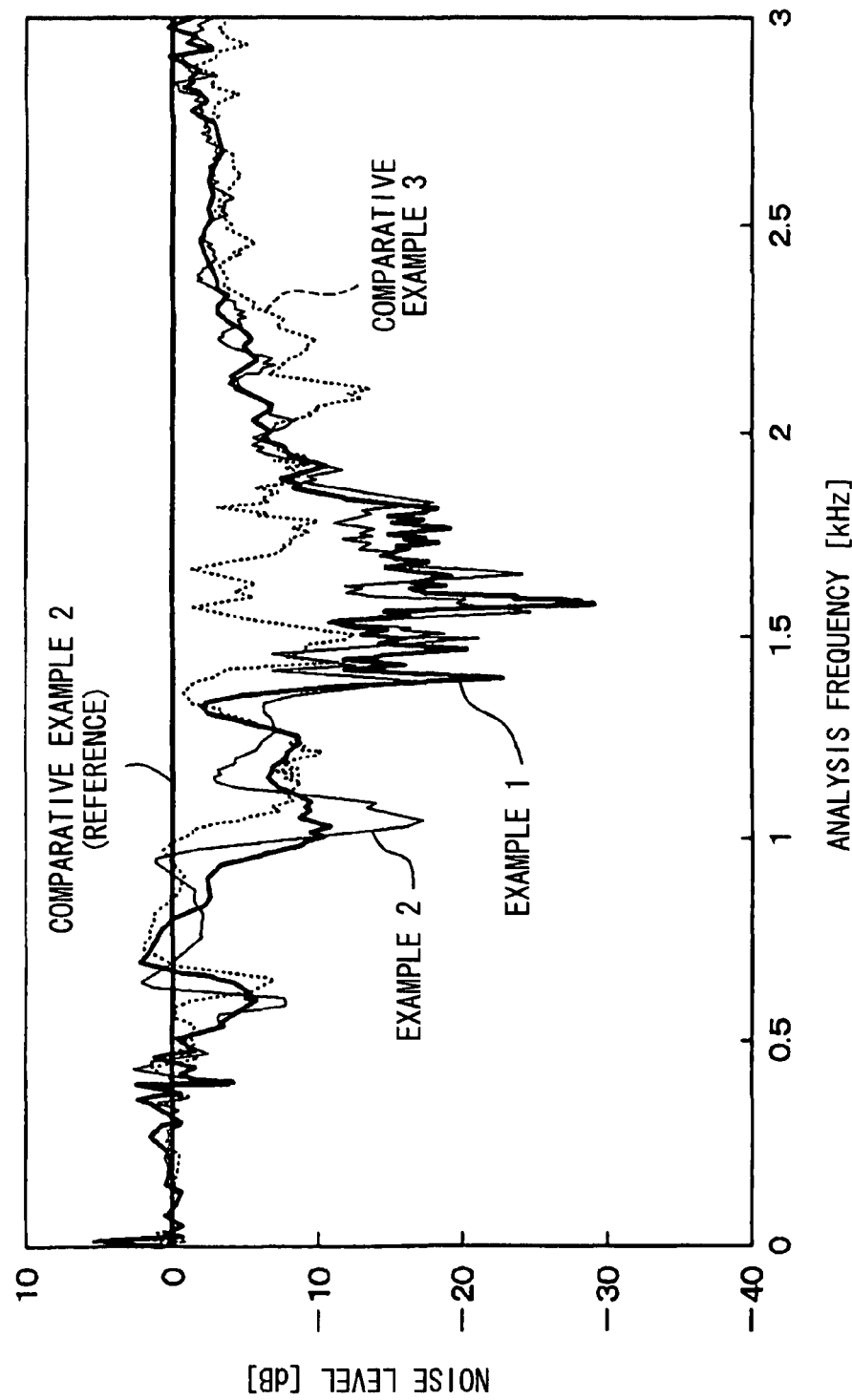
FIG. 9 is a graph depicting the results of examination for the relation between the length of a downstream-side straight section in a duct body according to the first embodiment and the noise attenuation.

The length required for the downstream-side straight section 5 will now be described. The length required for the downstream-side straight section 5 is a length capable of securing a space required for the sounds passing through the outer-periphery-side air passage 6 and the inner-periphery-side air passage 7 of the bending section 3 to be joined and to interfere with each other, as described above. FIG. 9 shows the results of examination for the relation between the length of the downstream-side straight section 5 and the noise attenuation. In all Example 1, Example 2, and Comparative Example 3 in FIG. 9, the frequency target range for a noise reduction was 1.6 kHz. Also, the duct widths W3a and W3b in a bending diameter direction at the inlet 10a and the outlet 10b of the bending section 3 in the duct body 1, which has a shape shown in FIG. 3, were 70 mm, and the duct width W3 in regions other than the inlet 10a and the outlet 10b of the bending section 3 was 100 mm. In Example 1, the length of the downstream-side straight section 5 was 53 mm. In Example 2, the length of the downstream-side straight section 5 was 100 mm. On the other hand, in Comparative Example 3, the length of the downstream-side straight section 5 was 0 mm. That is, in Comparative Example 3, the downstream-side straight section 5 was omitted.

As shown in FIG. 9, in Examples 1 and 2, results causing a maximum noise attenuation at 1.6 kHz were obtained. In Comparative Example 3, however, the noise reduction effect for noise target range at 1.6 kHz was little because the noise attenuation at 1.6 kHz was small. Here, it can be seen that the length required for the downstream-side straight section 5 may be λ/4 or more of a sound having a frequency target range because the length of 53 mm in Example 1 corresponds to ¼ of the wavelength of a sound having a frequency of 1.6 kHz.

Accordingly, for example, the length required for the downstream-side straight section 5 to reduce a noise having a frequency of 2 kHz is 42 mm or more. The length required for the downstream-side straight section 5 to reduce a noise having a frequency of 1.4 kHz, is 60 mm or more. Also, the length required for the downstream-side straight section 5 to reduce a noise having a frequency of 0.8 kHz is 106 mm or more. Thus, it is preferred that the length of the downstream-side straight section 5 is 42 mm or more, in order to, at least, reduce a noise having a frequency of 2 kHz. It is also preferred that the length of the downstream-side straight section 5 is 60 mm or more, in order to, at least, reduce a noise having a frequency of 1.4 kHz to 2 kHz. Also, it is preferred that the length of the downstream-side straight section 5 is 106 mm or more, in order to, at least, reduce a noise having a frequency of 0.8 kHz to 2 kHz.

As described above, in accordance with the air duct of the first embodiment, it is possible to secure a large passage length difference while enabling the overall size of the duct to be compact. Even when there is a high limitation on installation space, as in ducts for vehicle air conditioning, it is possible to achieve a noise reduction in a frequency band lower than 2 kHz by an interference effect, without increasing the air flow resistance of the duct.

Figure 10A:
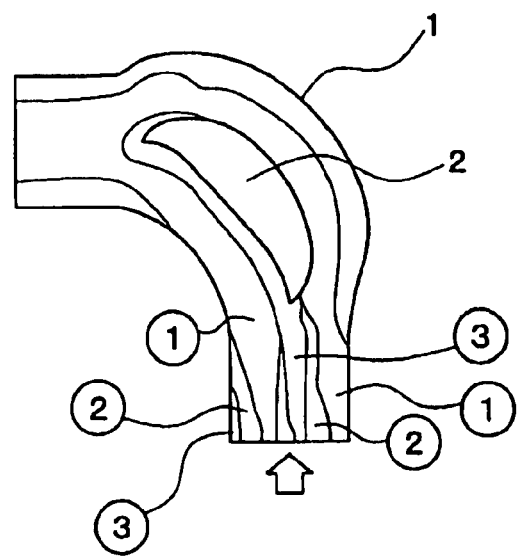
FIGS. 10A and 10B are views each illustrating a flow velocity distribution in the duct body according to the first embodiment.
Figure 10B:
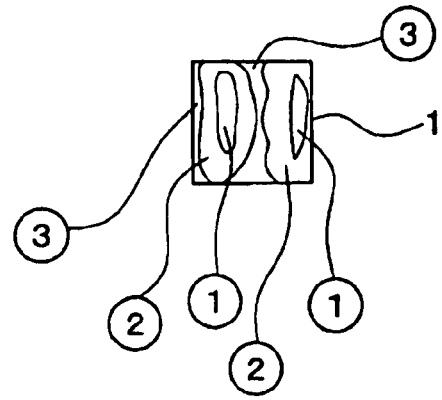
Figure 11A:
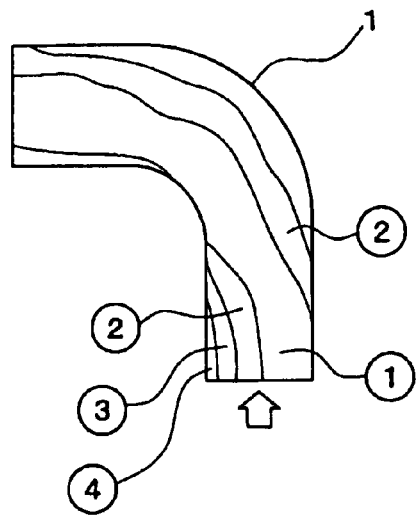
FIGS. 11A and 11B are views each illustrating a flow velocity distribution in a duct of Comparative Example 2.
Figure 11B:
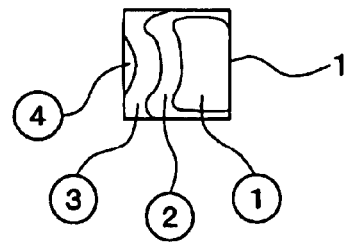

As apparent from a comparison of FIGS. 10A and 10B and FIGS. 11A and 11B, the duct of this embodiment also has a flow regulating function. FIGS. 10A and 10B show a flow velocity distribution in the duct of this embodiment. FIGS. 11A and 11B show a flow velocity distribution in the duct of Comparative Example 2. FIGS. 10A and 10B and FIGS. 11A and 11B depict the analysis results obtained when the flow rate of air flowing in the duct is 150 m³/h. Comparative Example 2 is a structure in which the passage dividing wall 22 is omitted from the duct body 21 shown in FIG. 5. FIGS. 10A and 11A correspond to FIGS. 3 and 5, respectively. FIGS. 10B and 11B are views each taken when viewing the duct body 1 of the corresponding FIG. 10A or FIG. 11A in a direction indicated by the arrow XB, XIB in the corresponding FIG. 10A or FIG. 11A. In the drawings, the larger the circled numeral, the higher the flow velocity.

As shown in FIGS. 11A and 11B, it can be seen that in the downstream-side straight section 5 of Comparative Example 2, the flow velocity decreases gradually from the right side to the left side of the drawing, and an unsteady flow is generated. On the other hand, as shown in FIGS. 10A and 10B, in the duct of the first embodiment, generation of an unsteady flow is reduced, as compared to FIGS. 11A and 11B.

Figure 12:
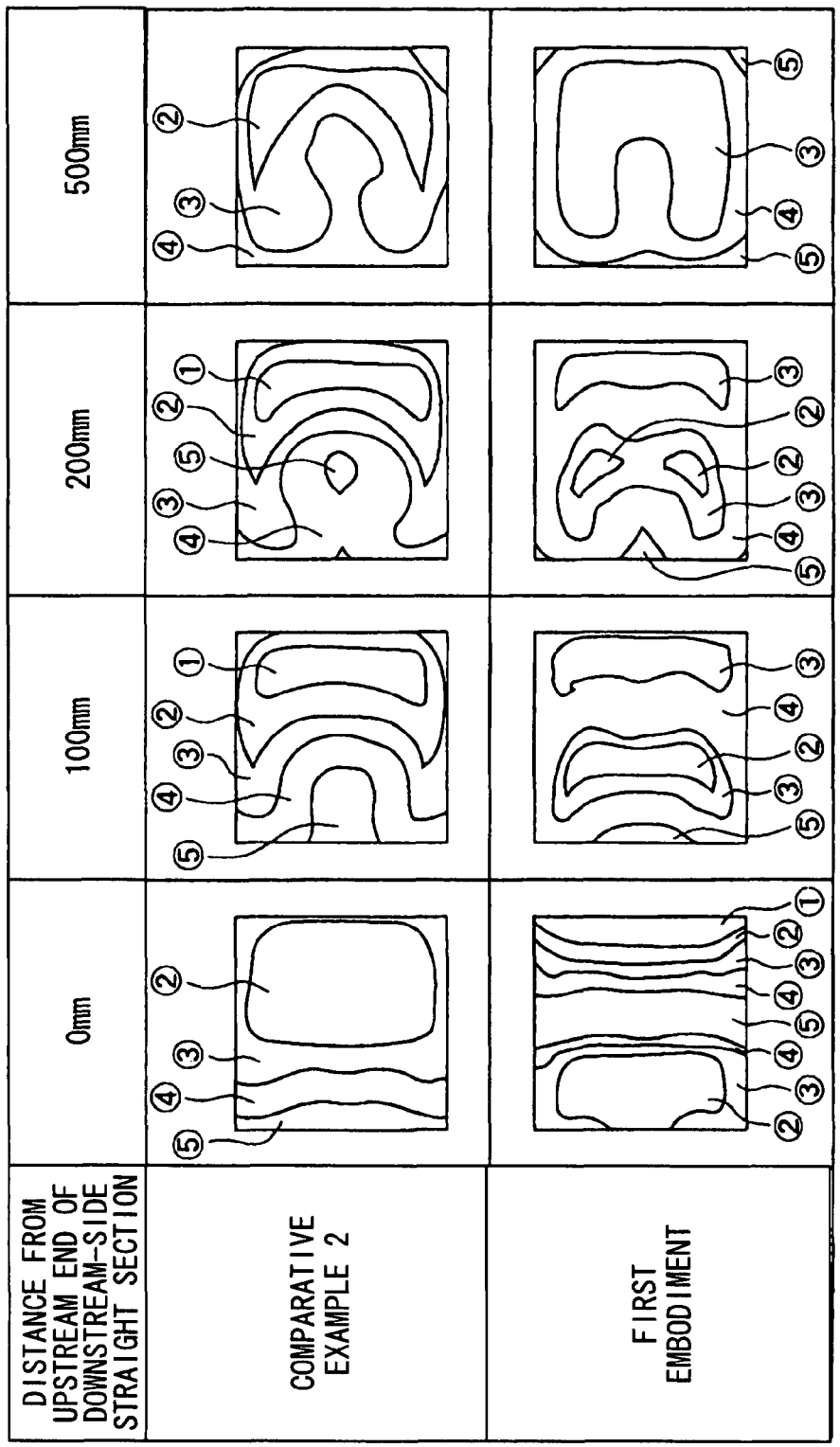
FIG. 12 is a view illustrating a flow velocity distribution along a passage cross-section at a position spaced apart from the upstream end of a downstream-side straight section by a certain distance when the length L4 of the downstream-side straight section in a flow direction is 500 mm or more, in each of the first embodiment and Comparative Example 2.

FIG. 12 shows a flow velocity distribution along a passage cross-section at a position spaced apart from the upstream end of the downstream-side straight section 5 by a certain distance when the length L4 of the downstream-side straight section 5 in a flow direction is 500 mm or more, in each of the first embodiment and Comparative Example 2. FIG. 12 shows the analysis results obtained when the flow rate of air flowing in the duct is 150 m³/h. In the drawing, the smaller the circled numeral, the higher the flow velocity.

As apparent from the flow velocity distribution shown in FIG. 12, in Comparative Example 2, an unsteady flow is generated in a flow of conditioned air flowing through the downstream-side straight section 5 when the distance from the upstream end of the downstream-side straight section 5 is 500 mm or less. In the first embodiment, however, generation of an unsteady flow is reduced, as compared to Comparative Example 2, in all the cases in which the distance from the upstream end of the downstream-side straight section 5 is 0 mm, 100 mm, 200 mm, 300 mm, 400 mm, and 500 mm, respectively. It can also be seen that the maximum flow velocity in this embodiment is reduced, as compared to Comparative Example 2. Thus, it can be seen that it is possible to obtain a desired unsteady flow suppression effect when the length of the downstream-side straight section 5 is 500 mm or less.

As apparent from the above description, in accordance with the duct body 1 of this embodiment, it is possible to suppress generation of an unsteady flow and to achieve a reduction in maximum flow velocity, by the bending of the air flow passage. Accordingly, it is also possible to reduce a wind roar occurring at grilles due to pulsations caused by a local high flow velocity or a lop-sided flow velocity distribution at the downstream side of the duct body 1.

(Second Embodiment)

Figure 13:
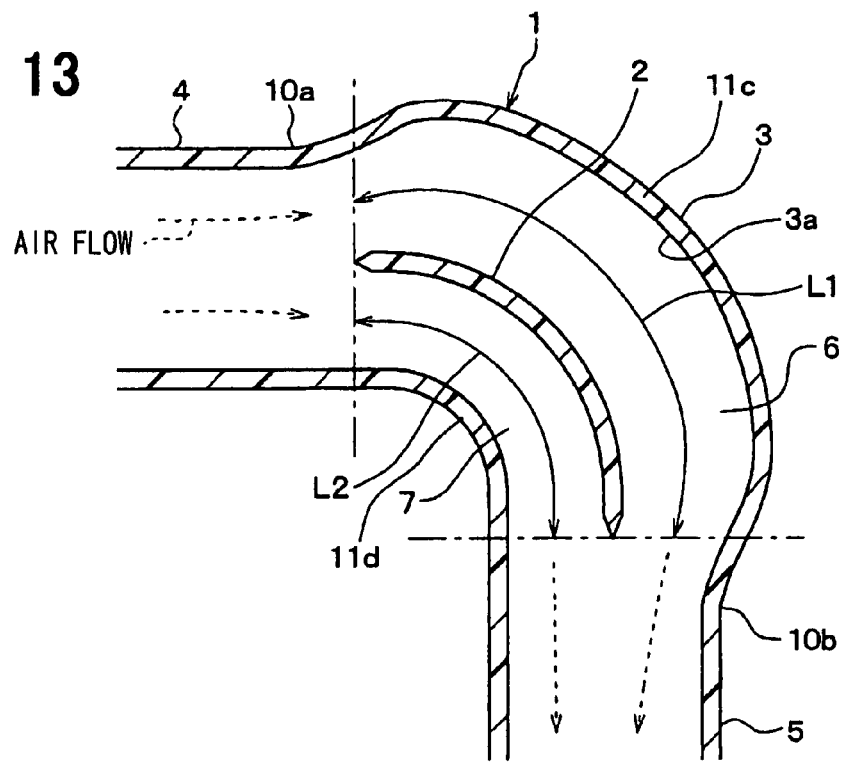
FIG. 13 is a sectional view of a duct according to a second embodiment of the present invention.

FIG. 13 is a sectional view of an air duct according to a second embodiment of the present invention. In FIG. 13, constituent elements identical to those of FIGS. 3 and 6 are designated by the same reference numerals as those of FIGS. 3 and 6.

In the first embodiment, the duct body 1 is shaped such that the outer-periphery-side wall 11c of the bending section 3 is enlarged toward the outer periphery, and the inner-periphery-side wall 11d is enlarged toward the inner periphery, as indicated by arrows in FIG. 6. However, the shape of the duct body 1 is not limited to the above-described shape. As shown in FIG. 13, the duct body 1 may be shaped such that only a desired one of the outer-periphery-side wall 11c and inner-periphery-side wall 11d of the bending section 3, e.g., the outer-periphery-side wall 11c, is enlarged toward the outer periphery.

Similarly to the first embodiment, the length L1 of the outer-periphery-side air passage 6 in this embodiment may be increased, as compared to the duct shown in FIG. 5. In this embodiment, accordingly, it is possible to increase the passage length difference "L1−L2" to be larger than the passage length difference "L21−L22" of the duct shown in FIG. 5, while suppressing a large size of the duct body 1.

In the duct body 1 shown in FIG. 13, the passage dividing wall 2 has a planar shape having a uniform width in an arrangement direction of the outer-periphery-side air passage 6 and the inner-periphery-side air passage 7. However, the passage dividing wall 2 may be shaped to conform to the shape of the outer-periphery-side inner wall surface 3a of the bending section 3, as in the first embodiment. That is, the passage dividing wall 2 shown in FIG. 3 may be used in the structure of FIG. 13 of the second embodiment.

(Third Embodiment)

Figure 14:
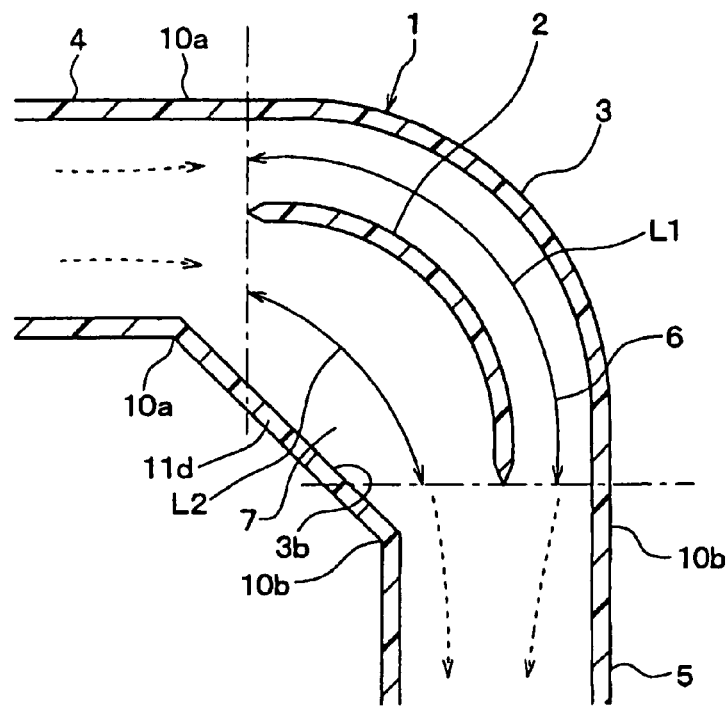
FIG. 14 is a sectional view of a duct according to a third embodiment of the present invention.

FIG. 14 is a sectional view of an air duct according to a third embodiment of the present invention. In FIG. 14, constituent elements identical to those of FIGS. 3 and 6 are designated by the same reference numerals as those of FIGS. 3 and 6.

In this embodiment, the inner-periphery-side wall 11d of the bending section 3 has a planar shape such that only a desired one of the outer-periphery-side wall 11c and inner-periphery-side wall 11d of the bending section 3, e.g., the inner-periphery-side wall 11d, is enlarged toward the bending inner periphery. Although the inner-periphery-side wall 11d of the bending section 3 is planar in the overall region thereof in the air duct shown in FIG. 14, it may have a planar shape at a portion thereof, or may have a slightly-curved shape, in place of the planar shape.

When the inner-periphery-side wall 11d is planar in the overall region thereof, as in the air duct shown in FIG. 14, the length L2 of the inner-periphery-side air passage 7 is minimized. Accordingly, it is preferred that, when the inner-periphery-side wall 11d has a curved surface in the overall region thereof or in a partial region thereof, the curved surface is made approximate to a planar surface, so as to reduce the length L2 of the inner-periphery-side air passage 7. Here, as the curved surface approximates to a planar surface, the radius of curvature of the curved surface increases. Accordingly, when the inner-periphery-side wall 11d is shaped to have a gently-curved surface approximate to a planar surface such that it is enlarged toward the inner periphery, it has an increased radius of curvature, as compared to the outer-periphery-side wall 11c.

Also, although the passage dividing wall 2 in the duct body 1 shown in FIG. 14 has a planar shape having a uniform width in an arrangement direction of the outer-periphery-side air passage 6 and inner-periphery-side air passage 7, it may be shaped to conform to the shape of the inner-periphery-side inner wall surface 3b of the bending section 3, similarly to the shape of the passage dividing wall 2 of the above-described first embodiment.

(Fourth Embodiment)

Figure 15:
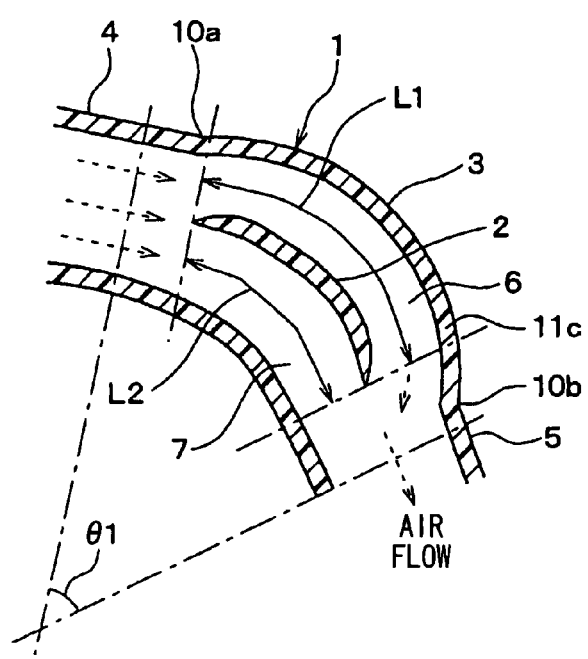
FIG. 15 is a sectional view of a duct according to a fourth embodiment of the present invention.

FIG. 15 is a sectional view of an air duct according to a fourth embodiment of the present invention. In FIG. 15, constituent elements identical to those of FIG. 3 are designated by the same reference numerals as those of FIG. 3.

In the first to third embodiments, the case where the bending angle of the bending section 3 is a right angle or an approximately-right angle has been illustratively described. However, the present invention may also be applied to the case in which the bending angle of the bending section 3 is an angle other than the right angle. Also, the duct shown in FIG. 15 is configured such that the bending angle of the bending section 3 is reduced, as compared to the duct shown in FIG. 3. In the example of FIG. 15, the bending angle θ1 is approximately 45°.

In the fourth embodiment of the present invention, it is preferred that the bending angle of the bending section 3 is about 45° or more. When the bending angle is less than 45°, it is necessary to increase the width of the duct in the overall region thereof, or to shape the bending section 3 to be enlarged toward the bending outer periphery, when the passage length difference "L1−L2" is set to obtain a desired noise reduction effect by interference, with respective to noise having a frequency target range. This is because the bending angle of less than 45° is unsuitable for a vehicle air conditioning duct having a limitation on size due to a limited installation space. Also, when the bending section 3 is greatly enlarged toward the bending outer periphery such that the outer-periphery-side air passage 6 turns greatly along the outer periphery of the bending section 3, there is a problem in that it is difficult for a sound to travel through the outer-periphery-side air passage 6, as in the shape shown in FIG. 55. Therefore, it is preferred that the bending angle of the bending section 3 is about 45° or more.

(Fifth Embodiment)

Figure 16:
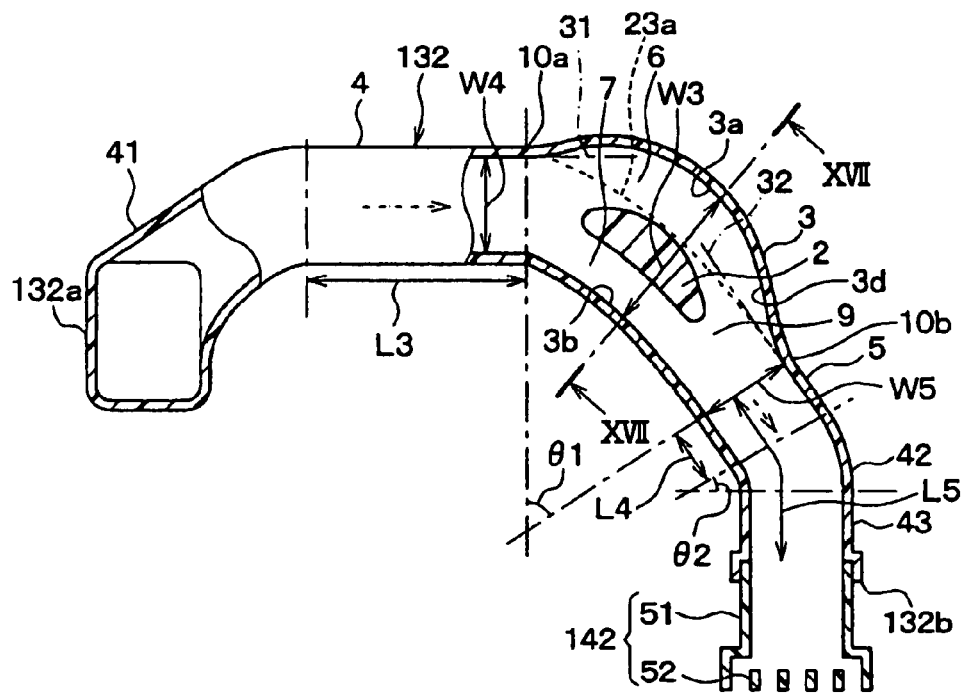
FIG. 16 is a partially-sectional view of a side face duct according to a fifth embodiment of the present invention.

In this embodiment, the present invention is applied to a side face duct. FIG. 16 is a partially-sectional view of the overall portion of a side face duct according to the fifth embodiment. In FIG. 16, constituent elements identical to those of FIGS. 3, 5, and 6 are designated by the same reference numerals as those of FIGS. 3, 5, and 6.

An upstream end 132a of the side face duct 132 is connected to the air conditioning case of the air conditioning body unit. The side face outlet port 142 (regulator) is connected to a downstream end 132b of the side face duct 132. The side face outlet port 142 is configured to have a retaining portion 51 and a grille 52 for adjusting an air blowing-out direction.

The side face duct 132 of this embodiment is shaped such that a first bending section 41 for changing the flow direction of conditioned air, an upstream-side straight section 4, a second bending section 3, a first downstream-side straight section 5, a third bending section 42 for changing the flow direction of conditioned air, and a second downstream-side straight section 43 are sequentially connected to one another. The second bending section 3 has a bending angle θ1 of about 45°. The third bending section 42 has a bending angle θ2 of about 30°.

In this embodiment, the bending angle θ1 of the bending section 3 can be set at about 45° or more. Also, a passage dividing wall 2 is installed in the second bending section 3, which is a bending section before the outlet port. Only a desired one of the outer-periphery-side inner wall surface 3a and inner-periphery-side inner wall surface 3b of the second bending section 3, e.g., the outer-periphery-side inner wall 3a, is outwardly enlarged.

Also, in this embodiment, the outer-periphery-side inner wall surface 3a at an outlet 10b of the second bending section 3, and the outlet 10b is convex toward the inside of the duct such that the flow direction of air introduced from the outer-periphery-side air passage 6 to the first downstream-side straight section 5 forms an acute angle with respect to the flow direction of a main air flow in the first downstream-side straight section 5.

As a result, in this embodiment, the flowing directions of air streams, which are directed from the outer-periphery-side air passage 6 and the inner-periphery-side air passage 7 to the first downstream-side straight section 5 intersect with each other. Accordingly, sound waves respectively passing through the outer-periphery-side air passage 6 and the inner-periphery-side air passage 7 can positively interfere with each other.

Figure 17:
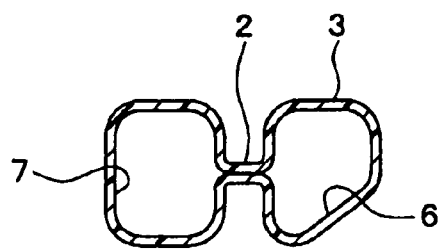
FIG. 17 is a cross-sectional view taken along the line XVII-XVII of FIG. 16.

FIG. 17 shows a cross-sectional view taken along the line XVII-XVII of FIG. 16. As shown in FIG. 17, in this embodiment, the outer-periphery-side air passage 6 and the inner-periphery-side air passage 7 approximately have the same passage cross-sectional area, but have different passage cross-sectional shapes, when viewing the cross-section of the second bending section 3.

In this embodiment, the sum L5 of lengths of the duct sections arranged downstream of the second bending section 3, i.e., the first downstream-side straight section 5, the third bending section 42, and the second downstream-side straight section 43 in an air flow direction, is, for example, in a range of 42 mm to 500 mm. By this length in the range of 42 mm to 500 mm, it is possible to secure a space required to enable sounds, respectively passing through the outer-periphery-side air passage 6 and the inner-periphery-side air passage 7 of the second bending section 3 to be joined and to interfere with each other. Also, the length L4 of the first downstream-side straight section 5 may be set, for example, in a range of 42 mm to 500 mm.

(Sixth Embodiment)

Figure 18:
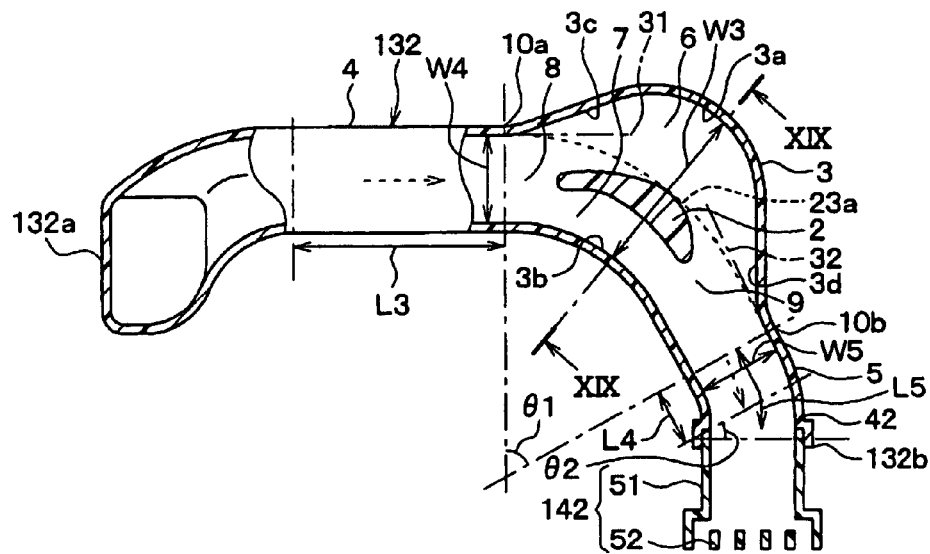
FIG. 18 is a partially-sectional view of a side face duct according to a sixth embodiment of the present invention.

In a sixth embodiment, the present invention is typically applied to a side face duct for a vehicle air conditioner. FIG. 18 is a partially-sectional view of a side face duct according to the sixth embodiment. In FIG. 18, constituent elements identical to those of FIG. 16 are designated by the same reference numerals as those of FIG. 16.

As shown in FIG. 18, in a side face duct 132 of this embodiment, the second bending section 3 has a bending angle θ1 of about 75°. The third bending section 42 also has a bending angle θ2 of about 15°. Accordingly, the bending angle of the second bending section 3 in this embodiment is included in a range of 45° or more, similarly to the fifth embodiment. Also, a passage dividing wall 2 is installed in the second bending section 3, which is a bending section having a bending angle of 45° or more, just before the outlet port, i.e., nearest to the outlet port, for example. Only a desired one of the outer-periphery-side inner wall surface 3a and inner-periphery-side inner wall surface 3b of the second bending section 3, e.g., the outer-periphery-side inner wall surface 3a, is outwardly enlarged.

Also, in this embodiment, the outer-periphery-side inner wall surface 3a at an outlet 10b of the second bending section 3 is convex toward the inside of the duct such that the flow direction of air introduced from the outer-periphery-side air passage 6 to the first downstream-side straight section 5 forms an acute angle with respect to the flow direction of a main air flow in the first downstream-side straight section 5.

Figure 19:
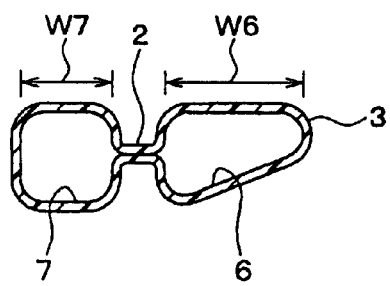
FIG. 19 is a cross-sectional view taken along the line XIX-XIX of FIG. 18.

FIG. 19 shows a cross-sectional view taken along the line XIX-XIX of FIG. 18. As shown in FIG. 19, in this embodiment, the outer-periphery-side air passage 6 and the inner-periphery-side air passage 7 have approximately the same passage cross-sectional area, but have different passage cross-sectional shapes, when viewing the cross-section of the second bending section 3. The cross-sectional width W6 of the outer-periphery-side air passage 6 in an arrangement direction of the outer-periphery-side air passage 6 and the inner-periphery-side air passage 7 is larger than the cross-sectional width W7 of the inner-periphery-side air passage 7. Accordingly, when the passage length difference between the outer-periphery-side air passage 6 and the inner-periphery-side air passage 7 is in a range of 0.085 to 0.215 m corresponding to a range of lengths required for a noise reduction by an interference with respective to noise having a frequency of 800 Hz to 2 kHz, the size of the overall portion of the side face duct 132 can be more compact.

Also, in this embodiment, the sum L5 of lengths of the duct sections arranged downstream of the second bending section 3, i.e., including the first downstream-side straight section 5 and the third bending section 42 in an air flow direction is, for example, 42 mm to 500 mm. Also, the length L4 of the first downstream-side straight section 5 may be, for example, 42 mm to 500 mm.

(Seventh Embodiment)

Figure 20:
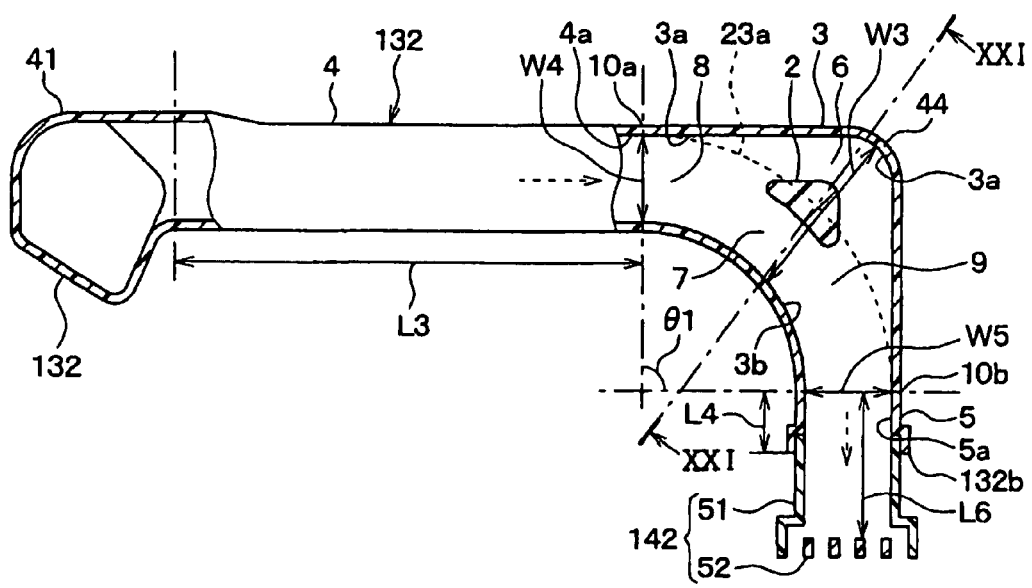
FIG. 20 is a partially-sectional view of a side face duct according to a seventh embodiment of the present invention.

In this embodiment, the present invention is applied to a side face duct for a vehicle air conditioner, for example. FIG. 20 is a partially-sectional view of the overall portion of the side face duct according to the seventh embodiment. In FIG. 20, constituent elements identical to those of FIGS. 16 to 19 are designated by the same reference numerals as those of FIGS. 16 to 19.

As shown in FIG. 20, a side face duct 132 of this embodiment is shaped to include an upstream-side straight section 4, a bending section 3, and a downstream-side straight section 5. The bending section 3 has a bending angle θ1 of about 90°, and is shaped such that the outer-periphery-side inner wall surface 3a thereof is enlarged toward the outer periphery to have a corner 44. The corner 44 is formed to have a round shape such that the sound moving from the upstream-side straight section 4 to the bending section 3 can move toward an outlet portion.

In this embodiment, the outer-periphery-side inner wall surface 3a of the bending section 3 and the outer-periphery-side inner wall surface 4a of the upstream-side straight section 4 are connected in parallel. Also, the outer-periphery-side inner wall surface 3a of the bending section 3 and the outer-periphery-side inner wall surface 5a of the downstream-side straight section 5 are connected in parallel.

Figure 21:
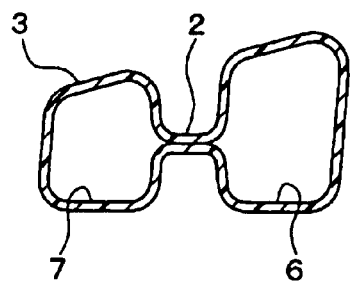
FIG. 21 is a cross-sectional view taken along the line XXI-XXI of FIG. 20.

FIG. 21 shows a cross-sectional view taken along the line XXI-XXI of FIG. 20. As shown in FIG. 21, the outer-periphery-side air passage 6 and the inner-periphery-side air passage 7 have different passage cross-sectional shapes when viewing the cross-section of the bending section 3. Also, the upper surfaces of the outer-periphery-side air passage 6 and the inner-periphery-side air passage 7 have an inclined shape such that they are gradually lowered from the outer periphery side toward the inner periphery side in accordance with the upper surface of the instrument panel.

In this embodiment, the length L4 of the downstream-side straight section 5 is short. Accordingly, the length L6 from the upstream end of the downstream-side straight section 5 to the retaining portion 51 of the outlet port 142 in an air flow direction is, for example, in a range of 42 mm to 500 mm. Thus, it is possible to secure a space required to enable sounds, respectively passing through the outer-periphery-side air passage 6 and the inner-periphery-side air passage 7 to be joined and to interfere with each other.

(Eighth Embodiment)

Figure 22:
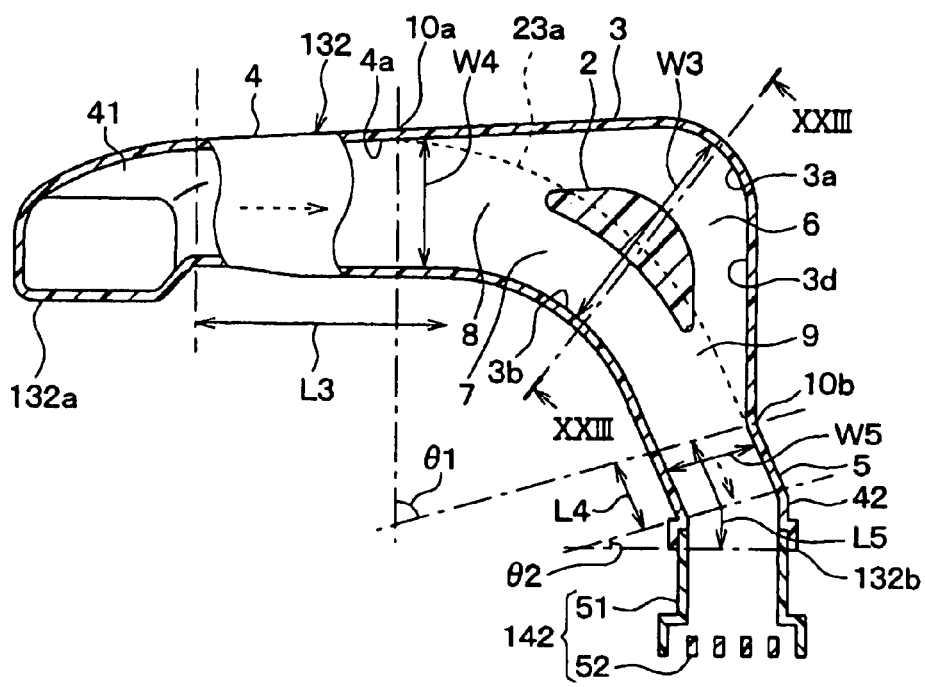
FIG. 22 is a partially-sectional view of a side face duct according to an eighth embodiment of the present invention.
Figure 23:
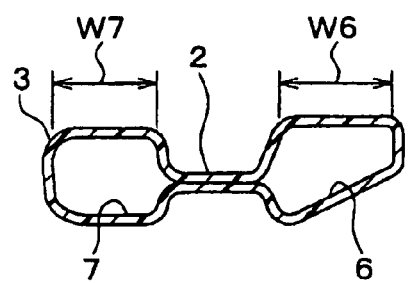
FIG. 23 is a cross-sectional view taken along the line XXIII-XXIII of FIG. 22.

In this embodiment, the present invention is applied to a side face duct for a vehicle air conditioner. FIG. 22 is a partially-sectional view of the overall portion of a side face duct according to the eighth embodiment. FIG. 23 is a cross-sectional view taken along the line XXIII-XXIII of FIG. 22. In FIGS. 22 and 23, constituent elements identical to those of FIGS. 16 to 21 are designated by the same reference numerals as those of FIGS. 16 to 21.

As shown in FIG. 22, in the side face duct 132 of this embodiment, a passage dividing wall 2 is installed in the second bending section 3. Also, only a desired one of the outer-periphery-side inner wall surface 3a and the inner-periphery-side inner wall surface 3b of the second bending section 3, e.g., the outer-periphery-side inner wall surface 3a, is outwardly enlarged in this embodiment, as compared with the virtual line. For example, in this embodiment of FIG. 22, the outer-periphery-side inner wall surface 3a is bent approximately by a right angle, and the passage dividing wall 2 is positioned on the virtual line so as to divide the outer-periphery-side air passage 6 and the inner-periphery-side air passage 7 from each other Also, in this embodiment, the outer-periphery-side inner wall surface 3a at an outlet 10b of the second bending section 3 is convex toward the inside of the duct such that the flow direction of air introduced from the outer-periphery-side air passage 6 to the downstream-side straight section 5 forms an acute angle with respect to the flow direction of a main air flow in the downstream-side straight section 5.

In this embodiment, the passage cross-sectional width increases gently from the upstream-side straight section 4 to the passage branching portion 8 of the second bending section 3. The outer-periphery-side inner wall surface 3a of the second bending section 3 and the outer-periphery-side inner wall surface 4a of the upstream-side straight section 4 are connected in parallel.

Also, as shown in FIG. 23, when viewing the cross-section of the second bending section 3, the outer-periphery-side air passage 6 and the inner-periphery-side air passage 7 have different passage cross-sectional shapes. The outer-periphery-side air passage 6 and the inner-periphery-side air passage 7 may have approximately the same passage cross-sectional area. Other configurations are similar to those of the side face duct 132 shown in FIG. 18.

(Ninth Embodiment)

Figure 24:
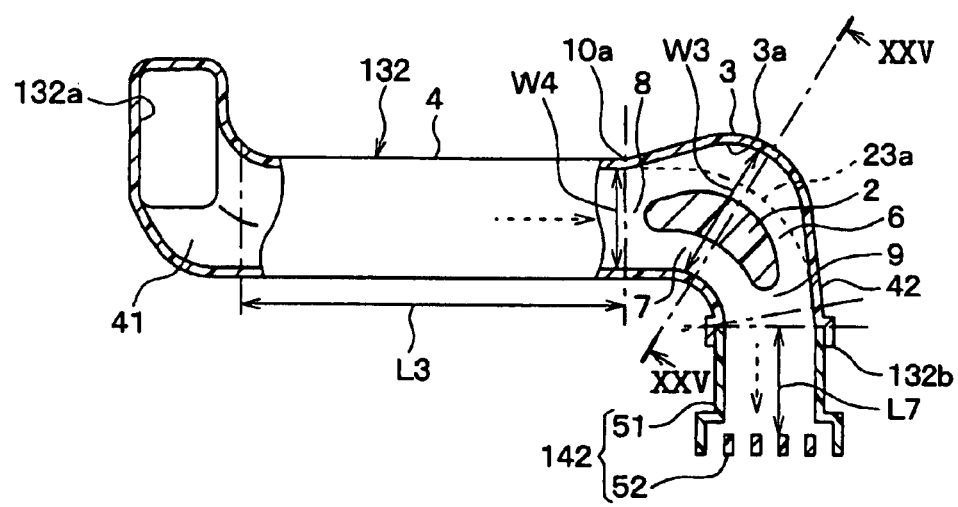
FIG. 24 is a partially-sectional view of a side face duct according to a ninth embodiment of the present invention.
Figure 25:
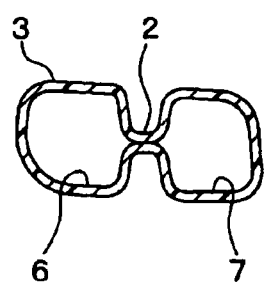
FIG. 25 is a cross-sectional view taken along the line XXV-XXV of FIG. 24.

In this embodiment, the present invention is applied to a side face duct for a vehicle air conditioner. FIG. 24 is a partially-sectional view of the overall portion of a side face duct according to the ninth embodiment. FIG. 25 is a cross-sectional view taken along the line XXV-XXV of FIG. 24. In FIGS. 24 and 25, constituent elements identical to those of FIGS. 16 to 23 are designated by the same reference numerals as those of FIGS. 16 to 23.

As shown in FIG. 24, the side face duct 132 of this embodiment is shaped such that a first bending section 41, an upstream-side straight section 4, a second bending section 3, and a third bending section 42 constituting a duct section arranged downstream of the second bending section 3 are sequentially connected to one another. The side face duct 132 of this embodiment does not include the downstream-side straight section 5, different from the above-described embodiments.

In this embodiment, the length L7 of the retaining portion 51 in an air flow direction is, for example, 42 mm to 500 mm, in order to secure a space required to enable sounds, respectively passing through the outer-periphery-side air passage 6 and the inner-periphery-side air passage 7, to be joined at a joining portion 9 and to interfere with each other.

Also, in this embodiment, when viewing the cross-section of the second bending section 3, the outer-periphery-side air passage 6 and the inner-periphery-side air passage 7 have different passage cross-sectional shapes, as shown in FIG. 25. The outer-periphery-side air passage 6 and the inner-periphery-side air passage 7 may have approximately the same passage cross-sectional area. Furthermore, in this example of FIG. 24, the passage dividing wall 2 is located at an inner peripheral side relative to the virtual line 23a.

(Tenth Embodiment)

Figure 26:
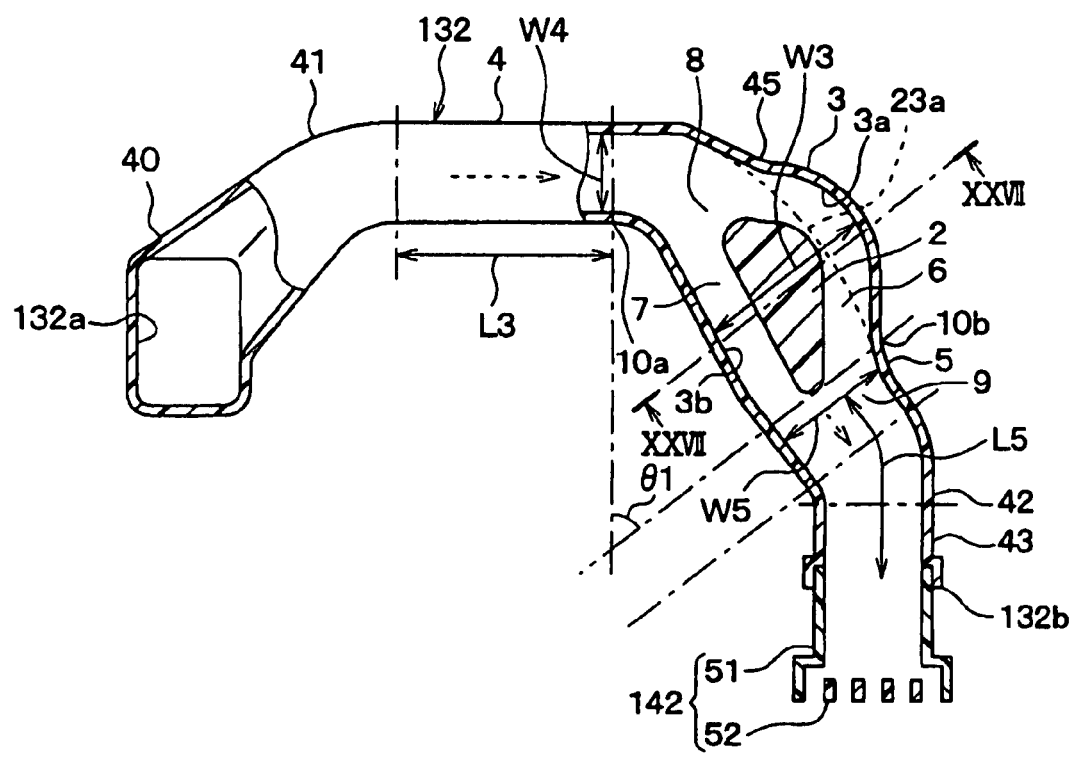
FIG. 26 is a partially-sectional view of a side face duct according to a tenth embodiment of the present invention.
Figure 27:
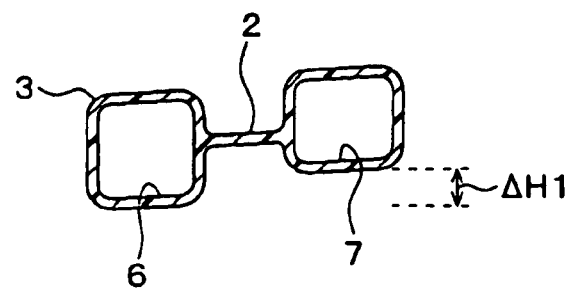
FIG. 27 is a cross-sectional view taken along the line XXVII-XXVII of FIG. 26.

In this embodiment, the present invention is applied to a side face duct for a vehicle air conditioner. FIG. 26 is a partially-sectional view of the overall portion of a side face duct according to the tenth embodiment. FIG. 27 is a cross-sectional view taken along the line XXVII-XXVII of FIG. 26. In FIGS. 26 and 27, constituent elements identical to those of FIGS. 16 to 25 are designated by the same reference numerals as those of FIGS. 16 to 25.

In this embodiment, the second bending section 3 is shaped such that the outer-periphery-side inner wall surface 3a is outwardly enlarged from a portion 45 arranged at an intermediate position in an air flow direction. Here, the portion 45 is located between the upstream-side straight section 4 and the second bending section 3.

In the second bending section 3, the outer-periphery-side air passage 6 is misaligned (offset) from the inner-periphery-side air passage 7 in a height direction by a height ΔH1.

Accordingly, when the passage length difference between the outer-periphery-side air passage 6 and the inner-periphery-side air passage 7 has a desired range of, for example, 0.085 m to 0.215 m, it is possible to reduce the passage cross-sectional width W3 of the second bending section 3, as compared to a case in which the outer-periphery-side air passage 6 and the inner-periphery-side air passage 7 have same position in a height direction of the side face duct mounted on the vehicle. Thus, the overall portion of the side face duct may be minimized.

(Eleventh Embodiment)

Figure 28:
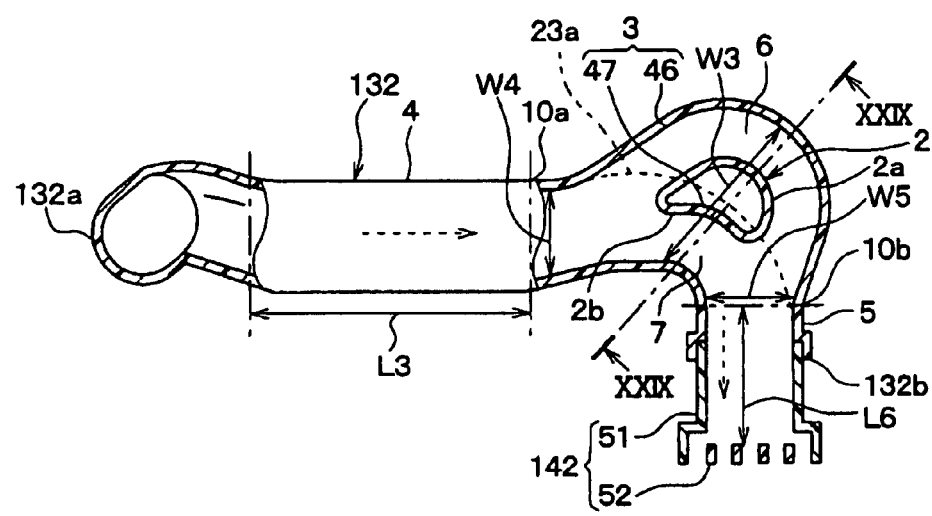
FIG. 28 is a partially-sectional view of a side face duct according to an eleventh embodiment of the present invention.
Figure 29:
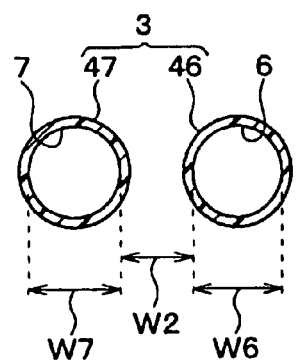
FIG. 29 is a cross-sectional view taken along the line XXIX-XXIX of FIG. 28.

In this embodiment, the present invention is applied to a side face duct for a vehicle air conditioner. FIG. 28 is a partially-sectional view of the overall portion of a side face duct according to the eleventh embodiment. FIG. 29 is a cross-sectional view taken along the line XXIX-XXIX of FIG. 28. In FIGS. 28 and 29, constituent elements identical to those of FIGS. 16 to 27 are designated by the same reference numerals as those of FIGS. 16 to 27.

In this embodiment, the outer-periphery-side air passage 6 and the inner-periphery-side air passage 7 of the second bending section 3 are constituted by separate tubes 46 and 47 such that they are independent of each other. The outer-periphery-side tube 46 constituting the outer-periphery-side air passage 6 and the inner-periphery-side tube 47 constituting the inner-periphery-side air passage 7 are arranged in a bending diameter direction while being separate from each other.

Also, in this embodiment, the sum of the passage cross-sectional widths W6 and W7 of the outer-periphery-side air passage 6 and the inner-periphery-side air passage 7 and the space W2 between the outer-periphery-side air passage 6 and the inner-periphery-side air passage 7 corresponds to the passage cross-sectional width W3 of the second bending section 3. The duct width W3 of the second bending section 3 is larger than the duct width W4 of the upstream-side straight section 4 and the duct width W5 of the downstream-side straight section 5.

In this embodiment, the passage dividing wall 2 installed in the second bending section 3 includes a wall surface 2a at the side of the outer-periphery-side air passage 6 and a wall surface 2b at the side of the inner-periphery-side air passage 7. However, the interior enclosed by the wall surface 2a at the side of the outer-periphery-side air passage 6 and the wall surface 2b at the side of the inner-periphery-side air passage 7 has the form of a cavity.

In this embodiment, the tubes 46, 47 have approximately the same shape in the bending portion 3. However, the tubes 46, 47 may have different shapes.

(Twelfth Embodiment)

Figure 30:
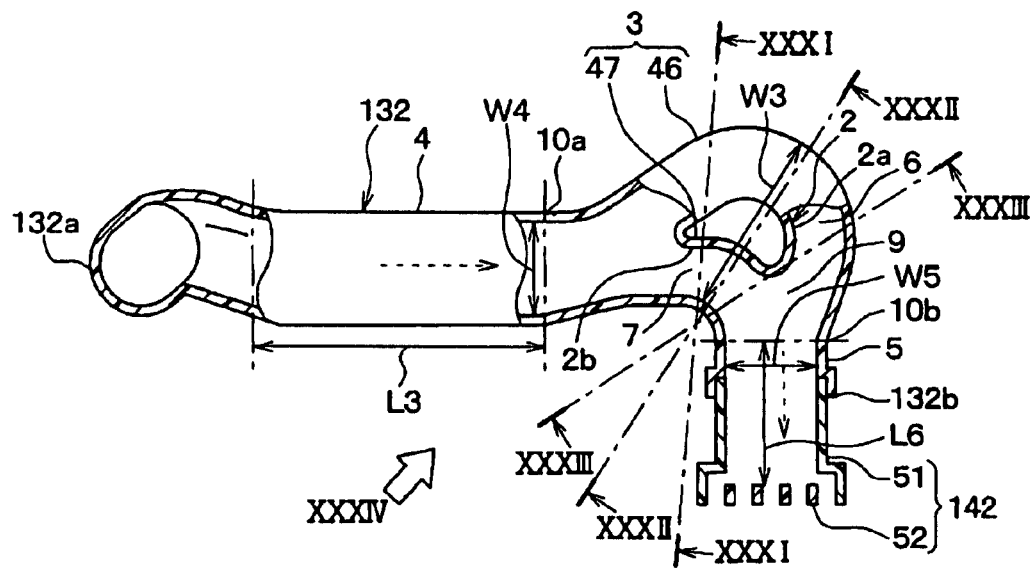
FIG. 30 is a partially-sectional view of a side face duct according to a twelfth embodiment of the present invention.
Figure 31:
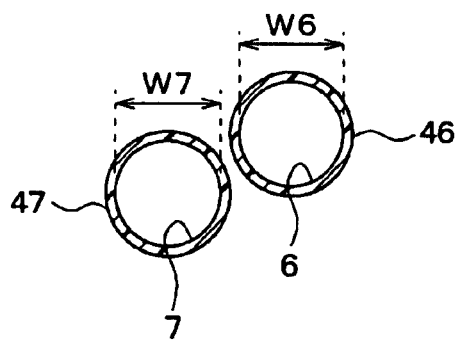
FIG. 31 is a cross-sectional view taken along the line XXXI-XXXI of FIG. 30.
Figure 32:
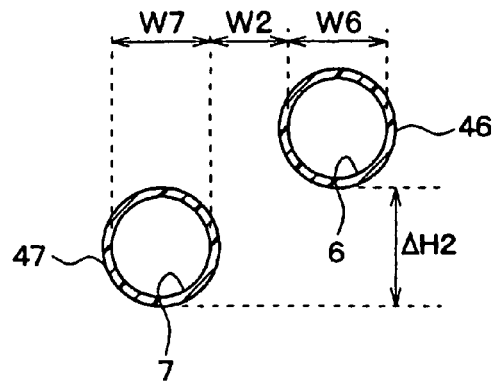
FIG. 32 is a cross-sectional view taken along the line XXXII-XXXII of FIG. 30.
Figure 33:
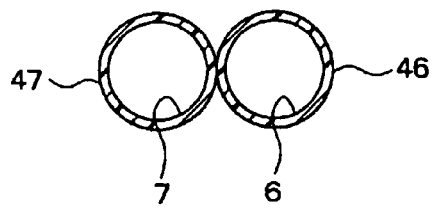
FIG. 33 is a cross-sectional view taken along the line XXXIII-XXXIII of FIG. 30.
Figure 34:
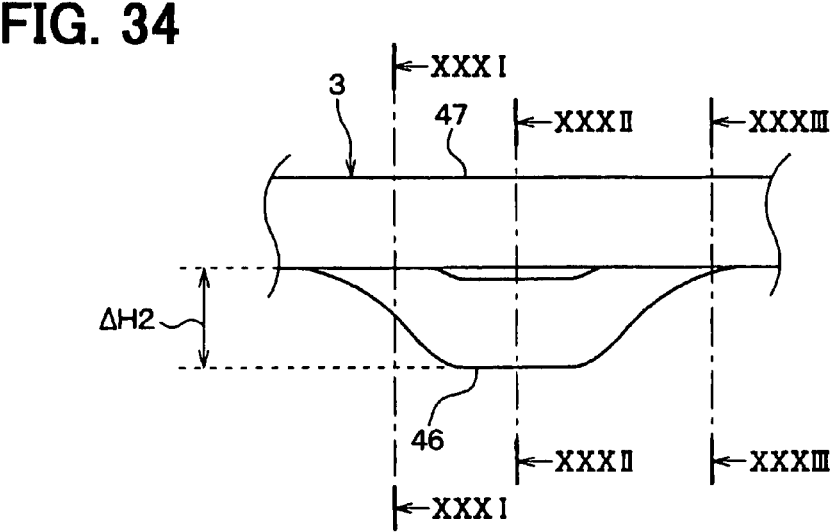
FIG. 34 is a view taken in a direction indicated by an arrow XXXIV of FIG. 30.

In this embodiment, the present invention is applied to a side face duct for a vehicle air conditioner. FIG. 30 is a partially-sectional view of the overall portion of a side face duct according to the twelfth embodiment. FIGS. 31, 32, and 33 are cross-sectional views respectively taken along the lines XXXI-XXXI, XXXII-XXXII, and XXXIII-XXXIII of the FIG. 30. FIG. 34 is a view taken when the side face duct 132 is viewed in a direction indicated by an arrow XXXIV. In FIGS. 30 to 34, constituent elements identical to those of FIGS. 16 to 29 are designated by the same reference numerals as those of FIGS. 16 to 29.

As shown in FIGS. 30 to 34, the side face duct 132 of this embodiment has a shape modified from the side face duct 132 of FIG. 28 described in the eleventh embodiment, such that the outer-periphery-side tube 46 turns toward a lower portion of the vehicle as shown in FIG. 34.

As shown in FIG. 34, the outer-periphery-side tube 46 turns toward the lower portion of the vehicle, as compared to the inner-periphery-side tube 47, such that there is a certain height difference ΔH2 between the outer-periphery-side tube 46 and the inner-periphery-side tube 47. Accordingly, it is possible to provide a passage length difference larger than that of the side face duct 132 shown in FIG. 28.

Although the outer-periphery-side tube 46 turns toward the lower portion of the vehicle, as compared to the inner-periphery-side tube 47, in this embodiment as shown in FIG. 34, the inner-periphery-side tube 47 may turn toward an upper portion of the vehicle. That is, in accordance with the present invention, it is possible to arrange the outer-periphery-side tube 46 and inner-periphery-side tube 47 in a three-dimensionally-tilted state by turning the outer-periphery-side tube 46 with respect to the inner-periphery-side tube 47, not only in the bending diameter direction of the bending section 3, but also in a direction perpendicular to the bending diameter direction, for example, in a vertical direction of the vehicle.

Also, in this embodiment, the passage dividing wall 2 installed in the bending section 3 includes a wall surface 2a at the side of the outer-periphery-side air passage 6 and a wall surface 2b at the side of the inner-periphery-side air passage 7, as shown in FIG. 30. However, the interior enclosed by the wall surface 2a at the side of the outer-periphery-side air passage 6 and the wall surface 2b at the side of the inner-periphery-side air passage 7 has the form of a cavity.

(Thirteenth Embodiment)

Figure 35:
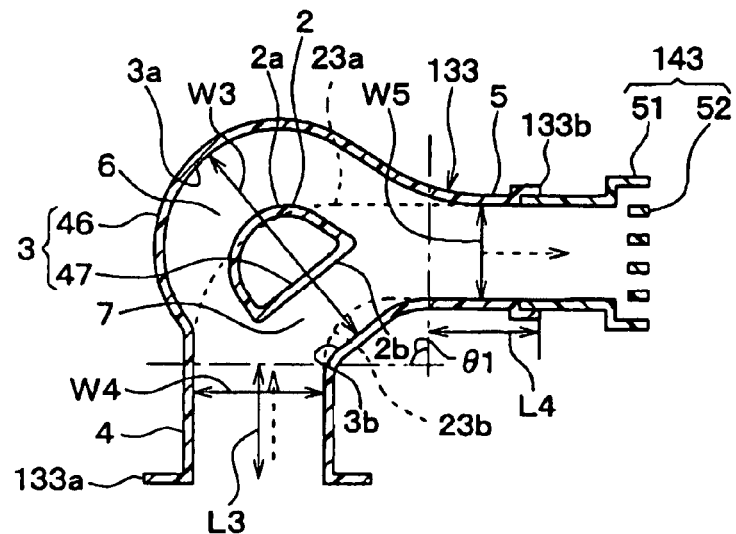
FIG. 35 is a sectional view of a center face duct according to a thirteenth embodiment of the present invention.

In this embodiment, the present invention is applied to a center face duct for a vehicle air conditioner. FIG. 35 is a sectional view of the overall portion of a center face duct according to the thirteenth embodiment. In FIG. 35, constituent elements identical to those of FIGS. 16 to 34 are designated by the same reference numerals as those of FIGS. 16 to 34.

As shown in FIG. 35, the upstream end 133a of the center face duct 133 is connected to the air conditioning case of the air conditioning body unit. The center face outlet port (register) 143 is connected to the downstream end 133b of the center face duct 133.

The center face duct 133 is shaped to include an upstream-side straight section 4, a bending section 3, and a downstream-side straight section 5. The bending section 3 has a bending angle θ1 of about 90°. In the bending section 3, the outer-periphery-side inner wall surface 3a is enlarged toward the bending outer periphery, and the inner-periphery-side inner wall surface 3b is enlarged toward the bending inner periphery, such that the duct width W3 is larger than the duct widths W4 and W5 of the upstream-side straight section 4 and downstream-side straight section 5. The bending section 3 is constituted by an outer-periphery-side tube 46 defining the outer-periphery-side air passage 6 and an inner-periphery-side tube 47 defining the inner-periphery-side air passage 7.

Also, in the configuration of the passage dividing wall 2 installed in the bending section 3 in this embodiment, the interior enclosed by the wall surface 2a at the side of the outer-periphery-side air passage 6 and the wall surface 2b at the side of the inner-periphery-side air passage 7 has the form of a cavity.

Similarly to the above-described embodiments, in this embodiment, the length L3 of the upstream-side straight section 4 is equal to or longer than a ½ wavelength of a sound having a frequency promoting a noise reduction by interference. Also, the length L4 of the downstream-side straight section 5 corresponds to a length capable of securing a space required to enable sounds, respectively passing through the outer-periphery-side air passage 6 and the inner-periphery-side air passage 7 to be joined and to interfere with each other.

(Fourteenth Embodiment)

Figure 36:
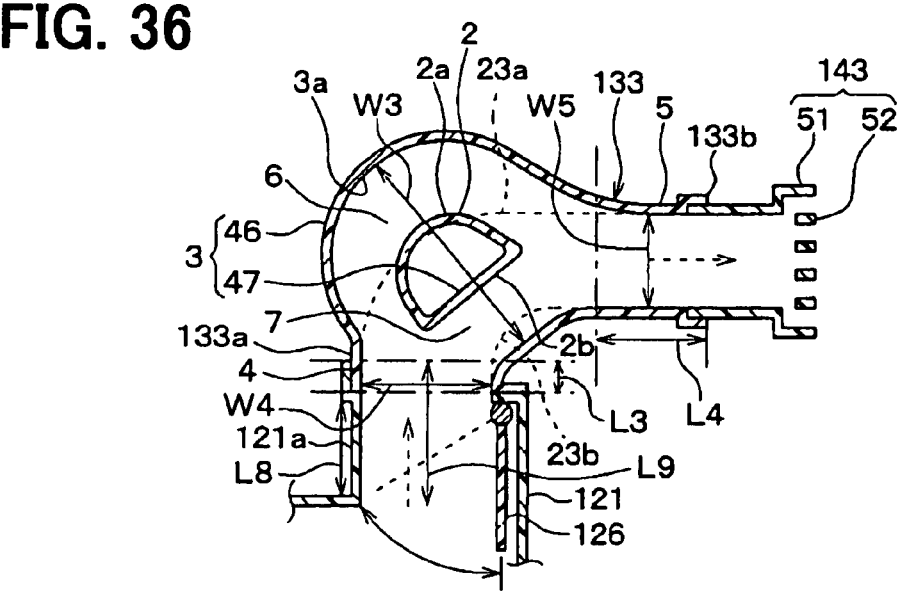
FIG. 36 is a sectional view of a center face duct according to a fourteenth embodiment of the present invention.

In this embodiment, the present invention is applied to a center face duct for a vehicle air conditioner. FIG. 36 is a sectional view of the overall portion of a center face duct according to the fourteenth embodiment. In FIG. 36, constituent elements identical to those of FIG. 35 are designated by the same reference numerals as those of FIG. 35.

In the center face duct 133 of this embodiment, the length L3 of the upstream-side straight section 4 is short, as compared to the center face duct 133 of FIG. 35 according to the thirteenth embodiment. As a result, in this embodiment, the air conditioning case 121 of the air conditioning body unit 120 is shaped to have an air passage 121a having a certain length L8 in a region where the air conditioning case 121 is connected to the center face duct 133. The length L8 is equal to or longer than a ½ wavelength of a sound having a frequency promoting a noise reduction by interference. For example, the length L8 is 85 mm or more.

Although the length L8 of the air passage 121a is equal to or longer than a ½ wavelength of a sound having a frequency promoting a noise reduction by interference, the sum L9 of the length L3 of the upstream-side straight section 4 and the length L8 of the air passage 121a may be equal to or longer than the ½ wavelength of the sound having the frequency promoting a noise reduction by interference.

(Fifteenth Embodiment)

Figure 37:
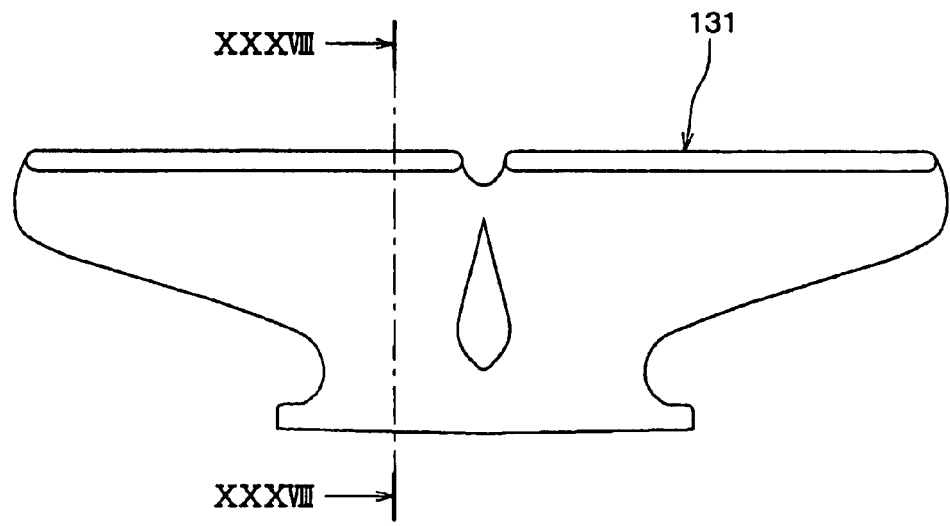
FIG. 37 is a front view of the overall portion of a front defroster duct according to a fifteenth embodiment of the present invention.
Figure 38:
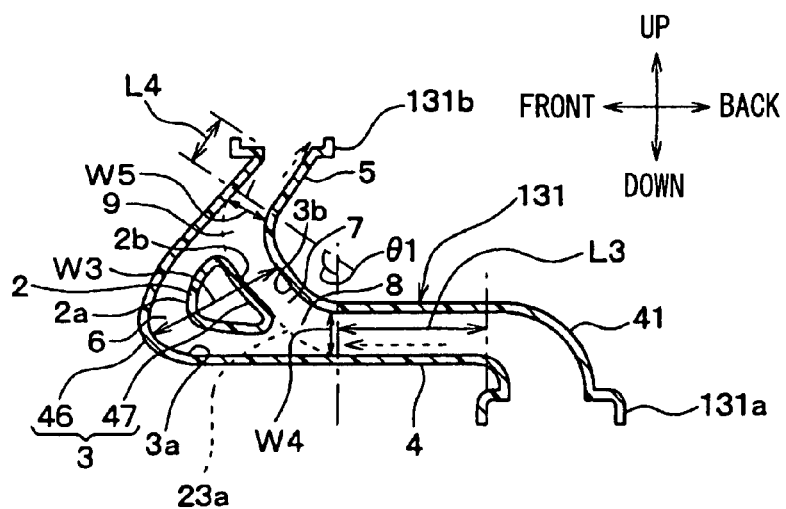
FIG. 38 is a cross-sectional view taken along the line XXXVIII-XXXVIII of FIG. 37.
Figure 39:
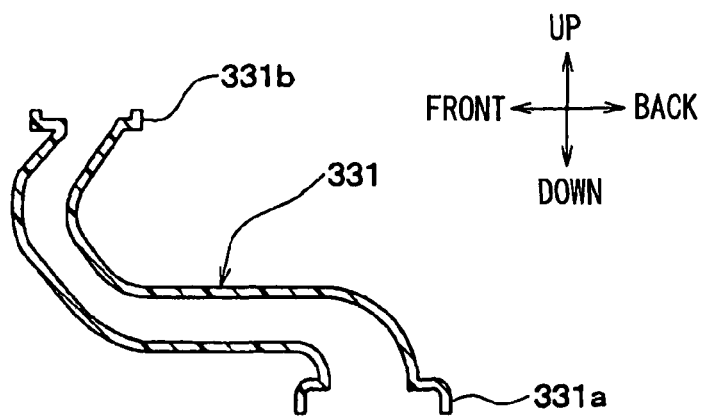
FIG. 39 is a sectional view of a front defroster duct according to a Comparative Example compared to the fifteenth embodiment of the present invention.

In this embodiment, the present invention is applied to a front defroster duct for a vehicle air conditioner. FIG. 37 is a front view of the overall portion of a front defroster duct 131 according to the fifteenth embodiment. FIG. 38 is a cross-sectional view taken along the line XXXVIII-XXXVIII of FIG. 37. In FIG. 38, constituent elements identical to those of FIGS. 3, 5, 6, and 16 are designated by the same reference numerals as those of FIGS. 3, 5, 6, and 16. FIG. 39 illustrates a front defroster duct 331 as a comparative example.

In each of the front defroster ducts 131 and 331 in this embodiment and in the comparative example, the upstream end 131a or 331a connected to the air conditioning body unit and the downstream end 131b or 331b at the side of an outlet port are arranged while being spaced apart from each other in a longitudinal direction of the vehicle. This is because the front defroster duct 131 or 331 is used for a case in which the front defroster opening and front defroster outlet port of the air conditioning body unit are positioned to be spaced apart from each other in the longitudinal direction of the vehicle.

As shown in FIG. 38, the front defroster duct 131 of this embodiment is shaped such that, starting from the side of the upstream end 131a, a first bending section 41, an upstream-side straight section 4, a second bending section 3, and a downstream-side first straight section 5 are sequentially connected to one another. The second bending section 3 has a bending angle θ1 of about 135°.

As in the eleventh and thirteenth embodiments, the second bending section 3 is constituted by an outer-periphery-side tube 46 defining the outer-periphery-side air passage 6 and an inner-periphery-side tube 47 defining the inner-periphery-side air passage 7. In other words, in the passage dividing wall 2 installed in the second bending section 3 in this embodiment, the interior enclosed by the wall surface 2a at the side of the outer-periphery-side air passage 6 and the wall surface 2b at the side of the inner-periphery-side air passage 7 also has the form of a cavity.

The outer-periphery-side inner wall surface 3a of the second bending section 3 is enlarged toward the bending outer periphery, as compared to the front defroster duct 331 shown in FIG. 39. Also, a portion of the inner-periphery-side inner wall surface 3b has a planar shape. In this embodiment, the duct width W3 of the second bending section 3 is also larger than the duct widths W4 and W5 of the upstream-side straight section 4 and downstream-side straight section 5.

(Sixteenth Embodiment)

Figure 40:
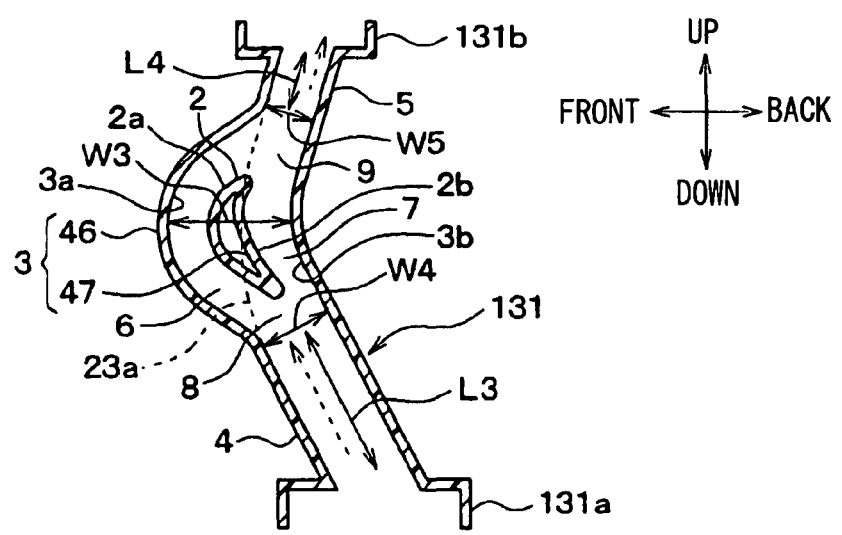
FIG. 40 is a sectional view of a front defroster duct according to a sixteenth embodiment of the present invention.
Figure 41:
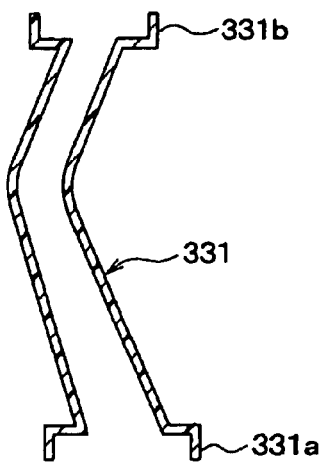
FIG. 41 is a sectional view of a front defroster duct according to a Comparative Example compared to the sixteenth embodiment of the present invention.

In this embodiment, the present invention is applied to a front defroster duct for a vehicle air conditioner. FIG. 40 is a sectional view of the overall portion of a front defroster duct according to the sixteenth embodiment. FIG. 41 illustrates a front defroster duct 331 as a comparative example. FIGS. 40 and 41 correspond to FIGS. 38 and 39, respectively. In FIGS. 40 and 41, constituent elements identical to those of FIGS. 38 and 39 are designated by the same reference numerals as those of FIGS. 38 and 39.

The front defroster ducts 131 and 331 in this embodiment and the comparative example are used for a case in which the front defroster opening and front defroster outlet port of the air conditioning body unit are positioned near each other in the longitudinal direction of the vehicle.

In this embodiment, the second bending section 3 has a bending angle θ1 (not shown in FIG. 40) of about 45°. The second bending section 3 is shaped such that the outer-periphery-side inner wall 3a is enlarged toward the bending outer periphery beyond a virtual arc line 23a, as compared to the front defroster duct 331 of FIG. 41.

(Seventeenth Embodiment)

Figure 42:
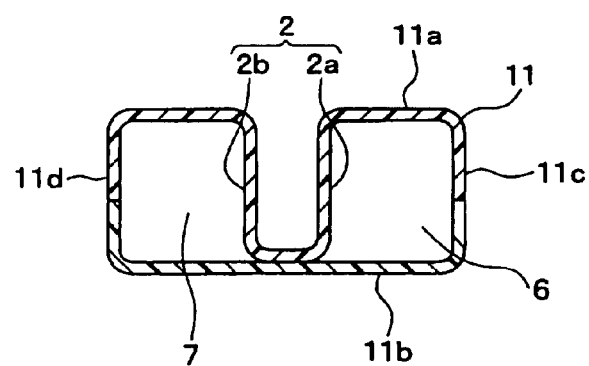
FIG. 42 is a sectional view of a bending section in an air duct for vehicle air conditioning according to a seventeenth embodiment of the present invention.

FIG. 42 is a sectional view of a bending section 3 in an air duct for vehicle air conditioning according to a seventeenth embodiment of the present invention. FIG. 42 is a cross section of the bending section 3, corresponding to FIG. 4. In FIG. 42, constituent elements identical to those of FIG. 4 are designated by the same reference numerals as those of FIG. 4.

In the above-described first embodiment, the passage dividing wall 2 is constituted such that both the upper and lower wall portions 11a and 11b of the wall 11 constituting the bending section 3 is shaped to be concave toward the inside of the duct body 1, as shown in FIG. 4. However, the passage dividing wall 2, which is constituted by an outer-periphery-side wall surface 2a and an inner-periphery-side wall surface 2b, may be formed by shaping only a desired one of the upper and lower wall portions 11a and 11b, e.g., the upper wall portion 11a, to be concave toward the inside of the duct body 1.

(Eighteenth Embodiment)

Figure 43:
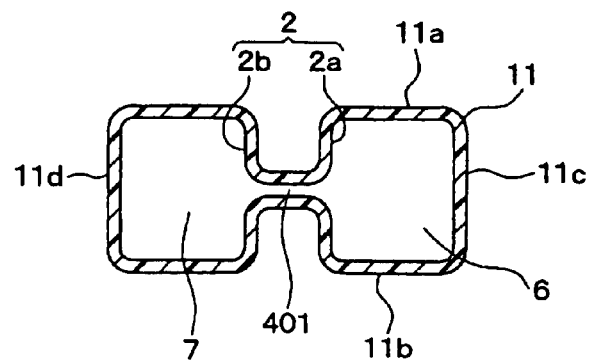
FIG. 43 is a sectional view of a bending section in an air duct for vehicle air conditioning according to an eighteenth embodiment of the present invention.

FIG. 43 is a sectional view of a bending section 3 in an air duct for vehicle air conditioning according to an eighteenth embodiment of the present invention. FIG. 43 is a cross section of the bending section 3, corresponding to FIG. 4. In FIG. 43, constituent elements identical to those of FIG. 4 are designated by the same reference numerals as those of FIG. 4.

In the above-described first embodiment, the outer-periphery-side air passage 6 and the inner-periphery-side air passage 7 in the bending section 3 are completely partitioned from each other by the passage dividing wall 2. However, if the outer-periphery-side air passage 6 and the inner-periphery-side air passage 7 may be configured substantially, a configuration, in which the outer-periphery-side air passage 6 and the inner-periphery-side air passage 7 partially communicate with each other, may be used, as in this embodiment.

In this embodiment, the passage cross-sectional area of a communicating portion 401, which communicates the outer-periphery-side air passage 6 and inner-periphery-side air passage 7, is smaller than the passage cross-sectional areas of the outer-periphery-side air passage 6 and inner-periphery-side air passage 7, so as to obtain a desired noise reduction effect by interference.

Also, the communicating portion 401 may be shaped to be concave toward the inside of the duct body 1 while preventing the upper and lower wall portions 11a and 11b of the wall 11 constituting the duct body 1 from coming into contact with each other.

Although not shown, a communicating hole may be formed through the passage dividing wall 2, so as to communicate the outer-periphery-side air passage 6 and inner-periphery-side air passage 7 with each other. The communicating portion in this embodiment also includes a space inevitably formed in the manufacture of an air duct for vehicle air conditioning.

(Nineteenth Embodiment)

Figure 44:
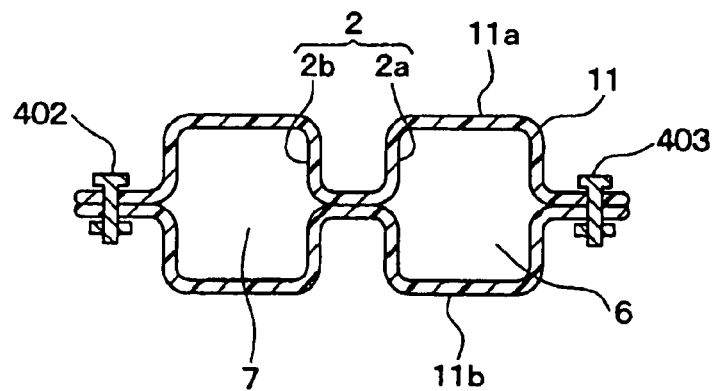
FIG. 44 is a sectional view of a bending section in an air duct for vehicle air conditioning according to a nineteenth embodiment of the present invention.

FIG. 44 is a sectional view of a bending section 3 in an air duct for vehicle air conditioning according to a nineteenth embodiment of the present invention. FIG. 44 shows a cross section of the bending section 3, corresponding to FIG. 4. In FIG. 44, constituent elements identical to those of FIG. 4 are designated by the same reference numerals as those of FIG. 4.

In the above-described first embodiment, as a method for manufacturing the air duct for vehicle air conditioning, a method including a step of molding the duct body 1 to have an integral structure, a step of shaping the upper and lower wall portions 11a and 11b to have a concave structure, and a step of joining the concave portions, thereby forming the passage dividing wall 2 has been described. However, as in this embodiment, a method including a step of forming the duct body 1 to have two divisional structures of upper and lower half portions respectively forming the upper and lower wall portions 11a and 11b, a step of joining concave portions of the upper and lower wall portions 11a and 11b by using welding or bonding, and a step of fastening the upper and lower wall portions 11a and 11b by using bolts 402 and 403 may be used.

(Twentieth Embodiment)

Figure 45:
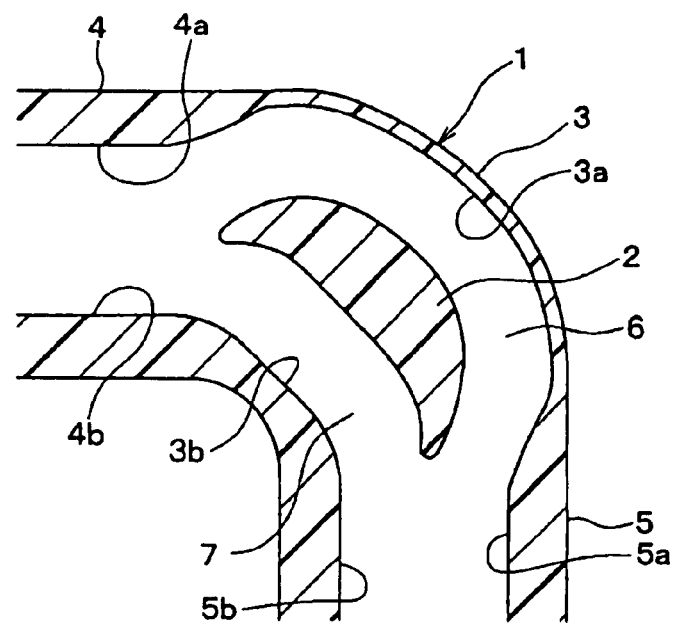
FIG. 45 is a sectional view of an air duct for vehicle air conditioning according to a twentieth embodiment of the present invention.

FIG. 45 is a sectional view of an air duct for vehicle air conditioning according to a twentieth embodiment of the present invention. FIG. 45 is a sectional view of a bending section 3 corresponding to FIG. 3. In FIG. 45, constituent elements identical to those of FIG. 3 are designated by the same reference numerals as those of FIG. 3.

In the above-described first embodiment, an example of the duct body 1, in which the tube constituting the duct body 1 has a uniform wall thickness, and a portion of the duct body 1 is enlarged at the bending portion 3, has been described. However, as in this embodiment, it is also possible to configure a duct substantially identical to the duct body 1 of FIG. 3 described in the first embodiment by varying the thickness of the tube constituting the duct body 1 while maintaining the width (outer diameter) of the duct body 1.

(Twenty-First Embodiment)

Figure 46:
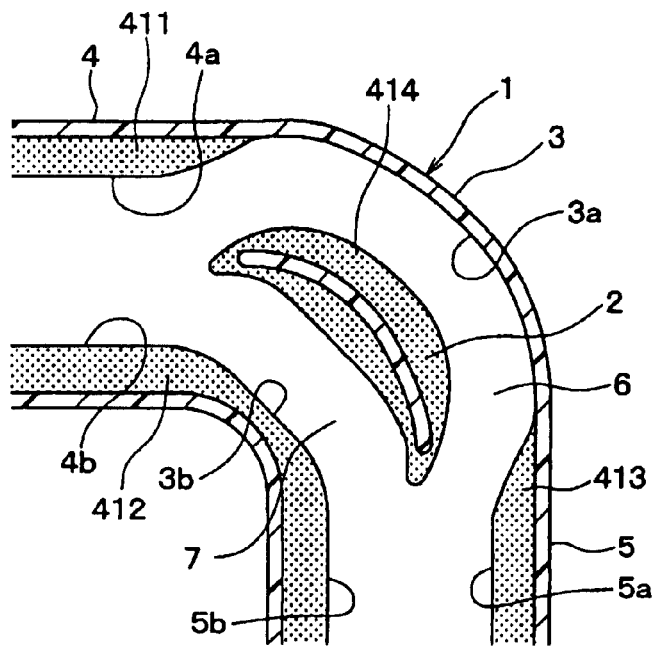
FIG. 46 is a sectional view of an air duct for vehicle air conditioning according to a twenty-first embodiment of the present invention.

FIG. 46 is a sectional view of an air duct for vehicle air conditioning according to a twenty-first embodiment of the present invention. FIG. 46 is a sectional view of a bending section 3 corresponding to FIG. 3. In FIG. 46, constituent elements identical to those of FIG. 3 are designated by the same reference numerals as those of FIG. 3.

The duct body 1 shown in FIG. 46 is configured by attaching lining materials 411, 412, 413, and 414 to inner wall surfaces of a duct body 21 and a passage dividing wall 22, which have shapes shown in FIG. 5. Thus, it is possible to configure a duct substantially identical to the duct body 1 of FIG. 3 described in the first embodiment.

(Twenty-Second Embodiment)

Figure 47:
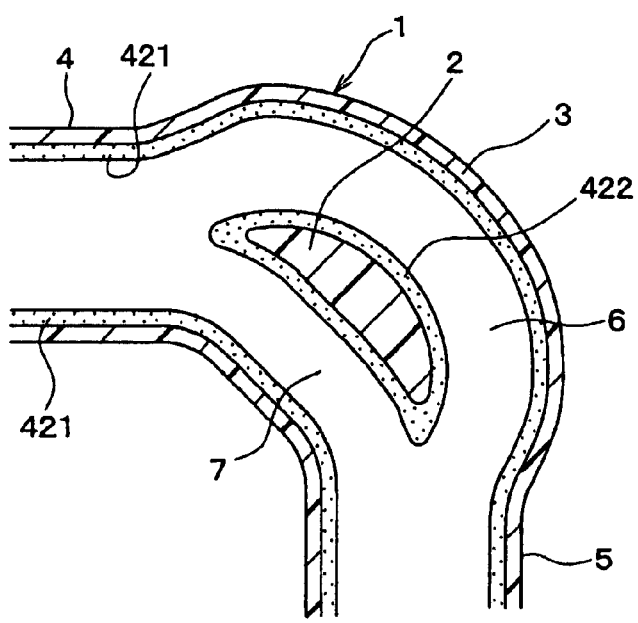
FIG. 47 is a sectional view of an air duct for vehicle air conditioning according to a twenty-second embodiment of the present invention.

FIG. 47 is a sectional view of an air duct for vehicle air conditioning according to a twenty-second embodiment of the present invention. FIG. 47 is a sectional view of a bending section 3 corresponding to FIG. 3. In FIG. 47, constituent elements identical to those of FIG. 3 are designated by the same reference numerals as those of FIG. 3.

As shown in FIG. 47, the duct body 1 of this embodiment is configured by attaching a sound absorbing material 421 to the inner wall surfaces of the duct body 1 shown in FIG. 3, and attaching a sound absorbing material 422 to the surfaces of the passage dividing wall 2. For the sound absorbing materials 421 and 422, for example, ether-based urethane foam may be used. The remaining configurations of the duct body 1 are identical to those of the duct body 1 of FIG. 3 described in the first embodiment.

In accordance with this embodiment, it is possible to obtain a desired noise reduction effect by interference to noise having a frequency of 800 Hz to 2 kHz because this embodiment has the same configuration as the first embodiment. It is also possible to obtain a desired noise reduction effect by interference to noise having a frequency of 2 kHz or more in accordance with a sound absorption by the sound absorbing materials 421 and 422.

Although the sound absorbing material 422 is attached to the surfaces of the passage dividing wall 2 in the case of FIG. 47, the passage dividing wall 2 itself may be made of a sound absorbing material to have a suitable shape shown in FIG. 3.

(Twenty-Third Embodiment)

Figure 48:
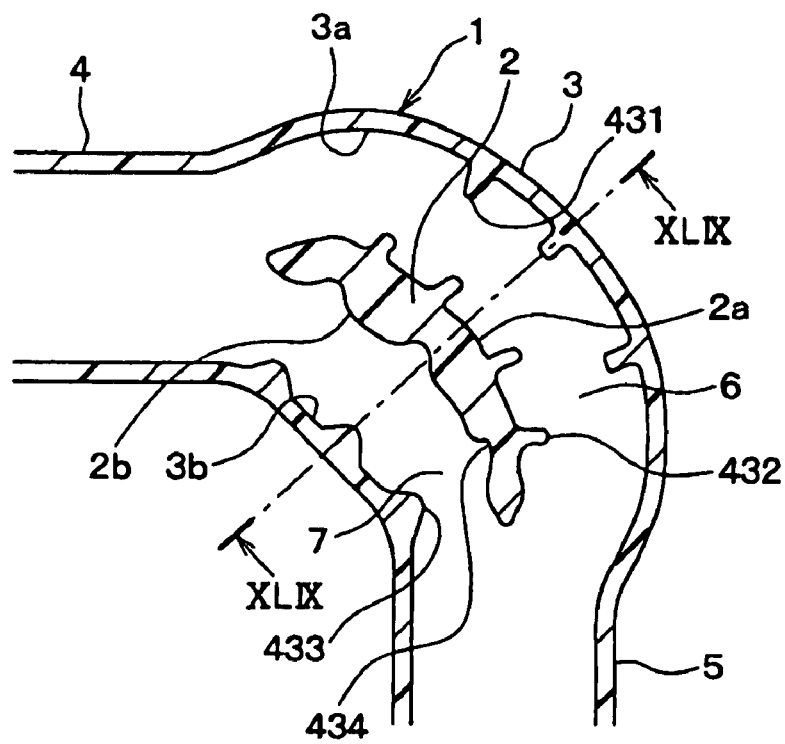
FIG. 48 is a sectional view of an air duct for vehicle air conditioning according to a twenty-third embodiment of the present invention.
Figure 49:
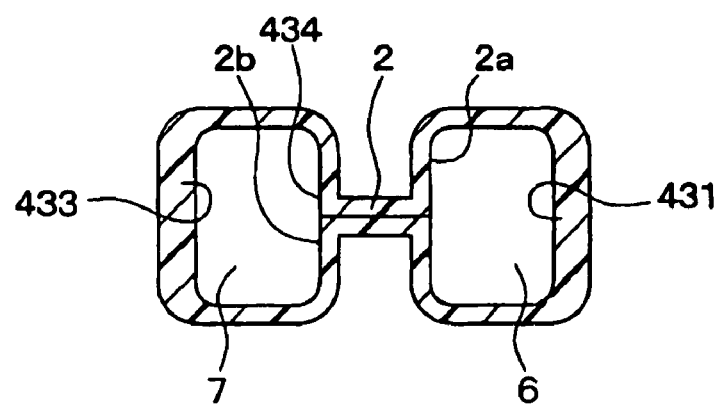
FIG. 49 is a cross-sectional view taken along the line XLIX-XLIX of FIG. 48.

FIG. 48 is a sectional view of an air duct for vehicle air conditioning according to a twenty-third embodiment of the present invention. FIG. 49 is a cross-sectional view taken along the line XLIX-XLIX of FIG. 48. FIG. 48 is a sectional view of a bending section 3 corresponding to FIGS. 3 and 6. FIG. 49 corresponds to FIG. 4. In FIGS. 48 and 49, constituent elements identical to those of FIGS. 3 to 7 are designated by the same reference numerals as those of FIGS. 3 to 7.

Although the inner wall surfaces 3a and 3b of the bending section 3 and the wall surfaces 2a and 2b of the passage dividing wall 2 in each of the above-described embodiments are smooth, protrusions and grooves are provided at the inner wall surfaces 3a and 3b of the bending section 3 and the wall surfaces 2a and 2b of the passage dividing wall 2 in this embodiment.

As shown in FIGS. 48 and 49, the duct body 1 of this embodiment has a configuration in which convex portions are formed on facing ones of the wall surfaces constituting the outer-periphery-side air passage 6. This configuration is obtained by forming convex portions 431 at the outer-periphery-side inner wall surface 3a of the bending section 3 in the duct body 1 shown in FIG. 6, and forming convex portions 432 at the outer-periphery-side wall surface 2a of the passage dividing wall 2 in the duct body 1 shown in FIG. 6. The convex portions 431 of the outer-periphery-side inner wall surface 3a are arranged in plural while being spaced apart from one another in an air flow direction. Also, the convex portions 432 of passage dividing wall 2 are arranged in plural while being spaced apart from one another in an air flow direction. The convex portions 431 of the outer-periphery-side inner wall surface 3a and the convex portions 432 of the passage dividing wall 2 are arranged such that they are misaligned from each other, so as not to face each other.

Also, the duct body 1 of this embodiment has a configuration in which convex portions are formed on one of the facing wall surfaces included in the wall surfaces constituting the inner-periphery-side air passage 7, and concave portions are formed at the other facing wall surface. This configuration is obtained by forming convex portions 433 at the inner-periphery-side inner wall surface 3b of the bending section 3 in the duct body 1 shown in FIG. 6, and forming concave portions 434 at the inner-periphery-side wall surface 2b of the passage dividing wall 2 in the duct body 1 shown in FIG. 6. The convex portions 433 of the inner-periphery-side inner wall surface 3b are arranged in plural while being spaced apart from one another in an air flow direction. Also, the concave portions 434 of the passage dividing wall 2 are arranged in plural while being spaced apart from one another in an air flow direction. The convex portions 433 of the inner-periphery-side inner wall surface 3b and the concave portions 434 of the passage dividing wall 2 are arranged such that they face each other in a bending diameter direction.

Since protrusions and grooves are provided at the inner wall surfaces 3a and 3b of the bending section 3 and the wall surfaces 2a and 2b of the passage dividing wall 2, as described above, it is possible to adjust the passage length difference between the outer-periphery-side air passage 6 and the inner-periphery-side air passage 7, and thus to reduce noise having a frequency target range band by interference.

It is preferred that the convex portions 431, 432, and 433 and concave portions 434 have sizes causing no increase in air flow resistance, respectively. The numbers of convex portions and concave portions are variable, if necessary.

In the case of FIG. 48, the convex portions 431 of the outer-periphery-side inner wall surface 3a and the convex portions 432 of the passage dividing wall 2 are smaller than the convex portions 433 of the inner-periphery-side inner wall surface 3b in terms of a width in an air flow direction. Also, the convex portions 431 and 432 have constant widths, respectively, while extending in a height direction. On the other hand, the convex portions 433 of the inner-periphery-side inner wall 3b have a soft-mountain shape. However, the shapes of the convex portions are variable, if necessary.

In the case of FIG. 48, the convex portions 431 of the outer-periphery-side inner wall 3a and the convex portions 432 of the passage dividing wall 2 are alternately arranged in an air flow direction, in only one of the outer-periphery-side air passage 6 and the inner-periphery-side air passage 7, e.g., in the outer-periphery-side air passage 6. However, the inner-periphery-side air passage 7 may also have the same configuration as the outer-periphery-side air passage 6.

In the structure of FIG. 48, the convex portions 433 of the inner-periphery-side inner wall surface 3b and the concave portions 434 of the passage dividing wall 2 are arranged to face each other. However, on the contrary, it may be possible to form concave portions at the inner-periphery-side inner wall surface 3b while forming convex portions at the passage dividing wall 2. Also, the outer-periphery-side air passage 6 may have the same configuration as the inner-periphery-side air passage 7.

(Twenty-Fourth Embodiment)

Figure 50:
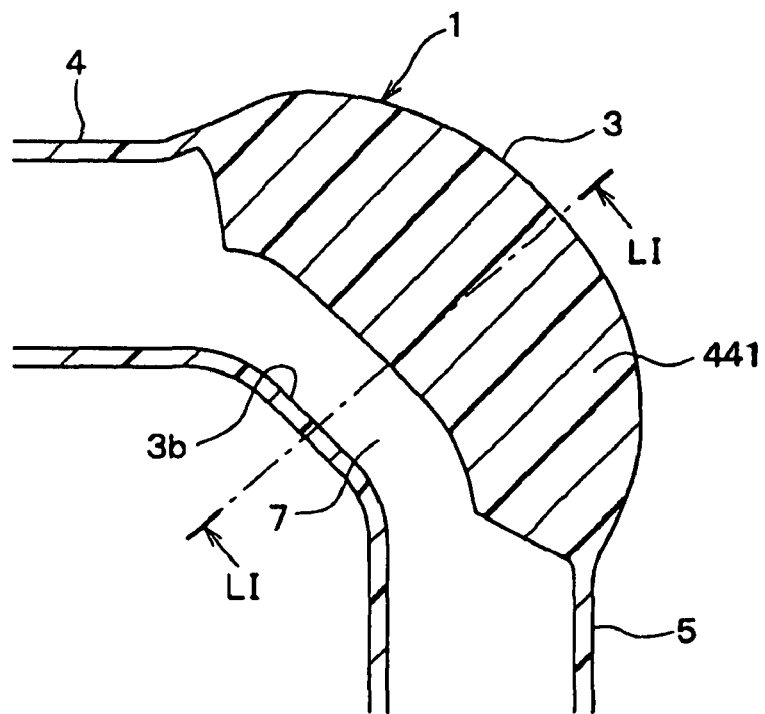
FIG. 50 is a sectional view of an air duct for vehicle air conditioning according to a twenty-fourth embodiment of the present invention.
Figure 51:
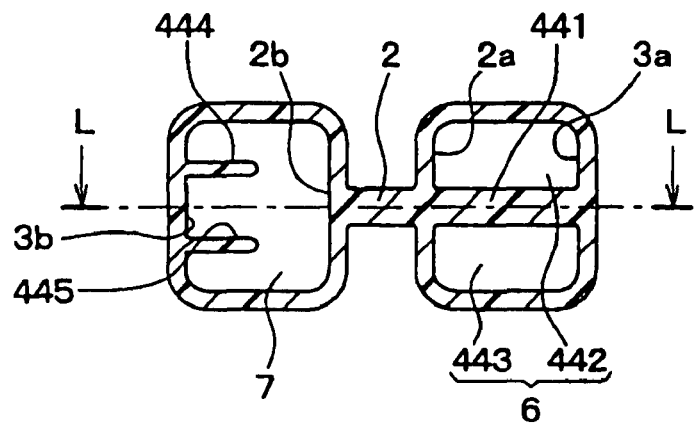
FIG. 51 is a cross-sectional view taken along the line LI-LI of FIG. 50.

FIG. 50 is a sectional view of an air duct for vehicle air conditioning according to a twenty-fourth embodiment of the present invention. FIG. 51 is a cross-sectional view taken along the line LI-LI of FIG. 50. FIG. 50 is a cross-sectional view taken along the line L-L of FIG. 51. FIG. 50 corresponds to FIGS. 3 and 6. FIG. 51 corresponds to FIG. 4. In FIGS. 50 and 51, constituent elements identical to those of FIGS. 3 to 7 are designated by the same reference numerals as those of FIGS. 3 to 7.

In this embodiment, the outer-periphery-side air passage 6 of the bending section 3 is completely divided into a plurality of passages, whereas the inner-periphery-side air passage 7 of the bending section 3 is partially divided into a plurality of passages.

In the duct body 1 of this embodiment, a dividing wall 441 is formed in the outer-periphery-side air passage 6, to divide the outer-periphery-side air passage 6 into two passages, as compared to the duct body 1 shown in FIG. 6.

As shown in FIG. 51, the dividing wall 441 is arranged centrally in a vertical direction of the outer-periphery-side air passage 6 when viewing the drawing. The dividing wall 441 has a length extending from the outer-periphery-side inner wall surface 3a to the passage dividing wall 2. As shown in FIG. 50, the dividing wall 441 is formed over the overall region of the outer-periphery-side air passage 6 in the air flow direction. By the dividing wall 441 as described above, the outer-periphery-side air passage 6 is completely divided into a first outer-periphery-side passage 442 and a second outer-periphery-side passage 443, as shown in FIG. 51.

As shown in FIG. 51, in the duct body 1 of this embodiment, two plate-shaped ribs 444 and 445 extending from the inner-periphery-side inner wall surface 3b of the bending section 3 to the inner-periphery-side wall surface 2b of the passage dividing wall 2 are provided in the inner-periphery-side air passage 7 of the bending section 3, as compared to the duct body 1 shown in FIG. 6. The ribs 444 and 445 extend in an air flow direction, i.e., in a direction perpendicular to the sheet plane of FIG. 51. Accordingly, when viewing the cross-section of the inner-periphery-side air passage 7, as shown in FIG. 51, the portion of the inner-periphery-side air passage 7 corresponding to the left half of the drawing is divided into three portions in a vertical direction.

The flow velocity distribution in a region arranged downstream of the bending section 3 in an air flow direction can be more uniform, as the outer-periphery-side air passage 6 of the bending section 3 is completely divided into a plurality of passages, and the inner-periphery-side air passage 7 of the bending section 3 is partially divided into a plurality of passages, as described above.

The numbers and installation positions of dividing walls 441 and ribs 444 and 445 are variable, if necessary, as long as the above-described effect can be obtained.

In the example of FIG. 51, the first and second outer-periphery-side passage 442 and 443 are arranged in a vertical direction when viewing the drawing, i.e., in a direction approximately perpendicular to an arrangement direction of the outer-periphery-side air passage 6 and the inner-periphery-side air passage 7 and to the air flow direction. However, the outer-periphery-side air passage 6 may be divided such that the first and second outer-periphery-side passages 442 and 443 are arranged in a lateral direction when viewing the drawing, i.e., in the arrangement direction of the outer-periphery-side air passage 6 and inner-periphery-side air passage 7.

In the case of FIG. 51, the inner-periphery-side air passage 7 is configured to be partially divided into plural portions (e.g., three portions) in a vertical direction when viewing the drawing. However, the inner-periphery-side air passage 7 may be divided into plural portions (e.g., three portions) in a lateral direction when viewing the drawing.

In the example of FIG. 51, the outer-periphery-side air passage 6 of the bending section 3 is completely divided into a plurality of passages, and the inner-periphery-side air passage 7 of the bending section 3 is partially divided into a plurality of passages. However, the configurations of the outer-periphery-side air passage 6 and the inner-periphery-side air passage 7 may be reversed to each other. Also, either the outer-periphery-side air passage 6 or the inner-periphery-side air passage 7 may be completely divided into a plurality of passages or may be partially divided into a plurality of passages. In any case described above, the effect of this embodiment can be obtained.

(Twenty-Fifth Embodiment)

Figure 52:
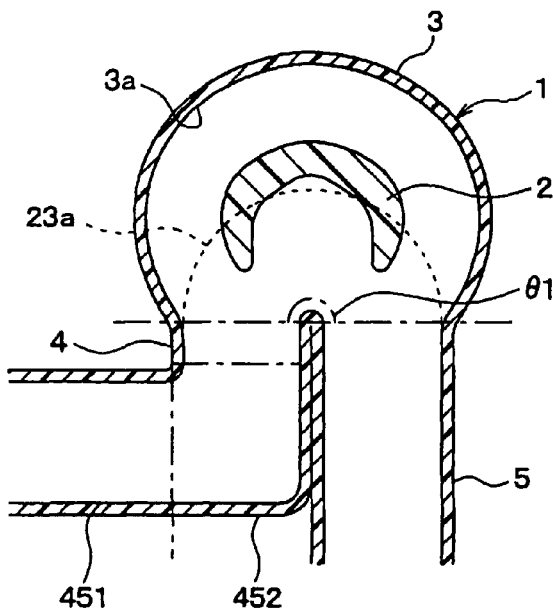
FIG. 52 is a sectional view of an air duct for vehicle air conditioning according to a twenty-fifth embodiment of the present invention.

FIG. 52 is a sectional view of an air duct for vehicle air conditioning according to a twenty-fifth embodiment of the present invention. FIG. 52 corresponds to FIGS. 3 and 6. In FIG. 52, constituent elements identical to those of FIGS. 3 and 6 are designated by the same reference numerals as those of FIGS. 3 and 6.

In this embodiment, the bending angle θ1 of the bending section 3 is about 180°, as shown in FIG. 52.

As shown in FIG. 52, the duct body 1 is shaped such that a first upstream-side straight section 451, a first bending section 452, a second upstream-side straight section 4, a second bending section 3, and a downstream-side straight section 5 are sequentially connected to one another. The second bending section 3 has a bending angle θ1 of about 180°. The second bending section 3 has a shape in which the outer-periphery-side inner wall 3a is outwardly enlarged beyond a virtual arc line 23a.

Although the bending angle θ1 of the second bending section 3 is 180°, as described above, the present invention is not limited to this case. As apparent from the fourth embodiment and this embodiment, it is preferred, for implementation of the present invention, that the bending angle θ1 of the second bending section 3 is 45° to 180°.

(Twenty-Sixth Embodiment)

Figure 53:
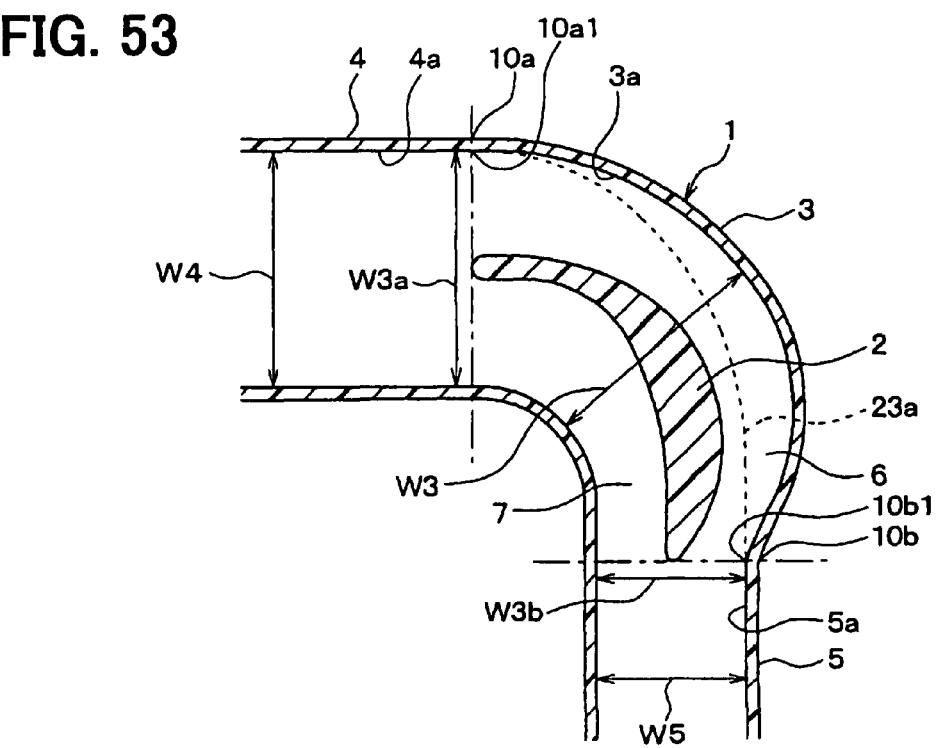
FIG. 53 is a sectional view of an air duct for vehicle air conditioning according to a twenty-sixth embodiment of the present invention.

FIG. 53 is a sectional view of an air duct for vehicle air conditioning according to a twenty-sixth embodiment of the present invention. FIG. 53 corresponds to FIGS. 3 and 6. In FIG. 53, constituent elements identical to those of FIGS. 3 and 6 are designated by the same reference numerals as those of FIGS. 3 and 6.

In the duct body 1 of the first embodiment, the duct width W3 of the bending section 3 is larger than the duct width W4 of the upstream-side straight section 4 and the duct width W5 of the downstream-side straight section 5, in the overall region of the bending section 3. In this embodiment, however, the duct width W3 of the bending section 3 is larger than only one of the duct width W4 of the upstream-side straight section 4 and the duct width W5 of the downstream-side straight section 5, e.g., is larger than the duct width W5 of the downstream-side straight section 5, as shown in FIG. 53.

That is, in the duct body 1 of this embodiment, the duct width W4 of the upstream-side straight section 4 is equal to or larger than the duct width W3 of the bending section 3. Also, the duct width W3a of the bending section 3 at the inlet 10a is equal to the duct width W4 of the upstream-side straight section 4. The duct width W3 of the bending section 3 decreases gradually as the bending section 3 extends from the inlet 10a in an air flow direction. Thus, the duct width W3b at the outlet 10b is smallest.

In this embodiment, the flowing direction of a main air flow in the upstream-side straight section 4 and the flowing direction of air introduced into the outer-periphery-side air passage 6 are parallel. Therefore, when the sizes of the bending section 3 and downstream-side straight section 5 are equal to those of the duct body 1 described in the first embodiment, the passage length difference between the outer-periphery-side air passage 6 and the inner-periphery-side air passage 7 is small, as compared to the first embodiment. However, the passage length difference can be adjusted in accordance with the duct width W3 of the bending section 3. Accordingly, this configuration may be used for the duct body 1, as long as the duct width W3 of the bending section 3 can be relatively large.

(Twenty-Seventh Embodiment)

Figure 54:
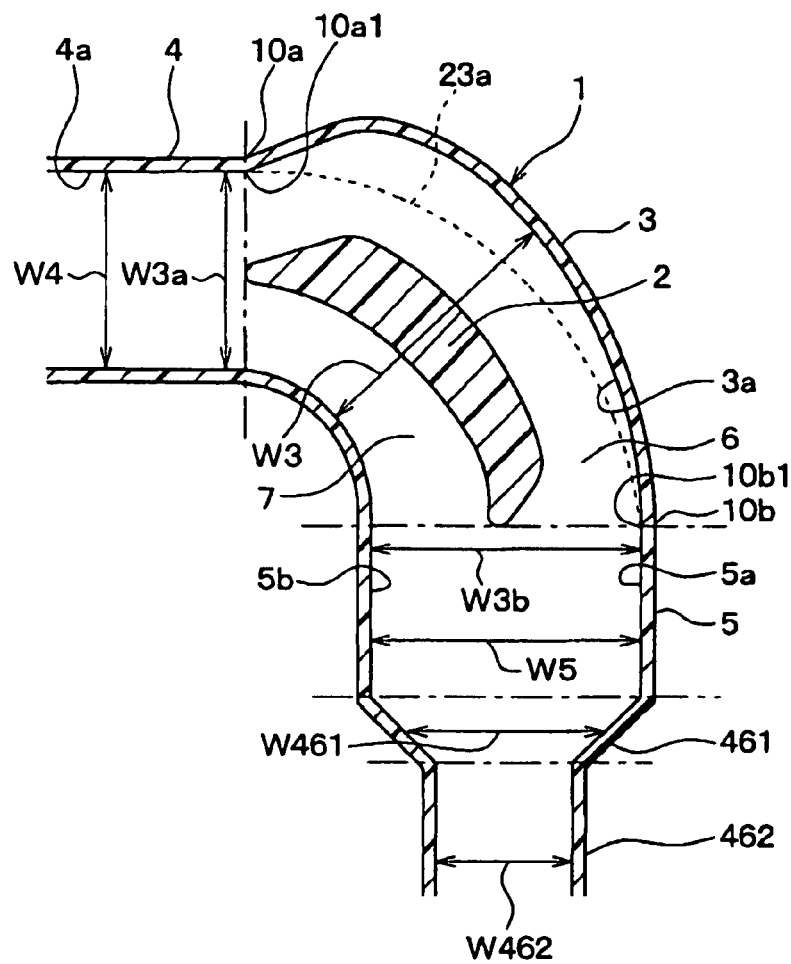
FIG. 54 is a sectional view of an air duct for vehicle air conditioning according to a twenty-seventh embodiment of the present invention.

FIG. 54 is a sectional view of an air duct for vehicle air conditioning according to a twenty-seventh embodiment of the present invention. FIG. 54 corresponds to FIGS. 3 and 6. In FIG. 54, constituent elements identical to those of FIGS. 3 and 6 are designated by the same reference numerals as those of FIGS. 3 and 6.

In this embodiment, the duct width W3 of the bending section 3 is larger than one of the duct width W4 of the upstream-side straight section 4 and the duct width W5 of the downstream-side straight section 5, e.g., is larger than the duct width W4 of the upstream-side straight section 4, as shown in FIG. 54.

That is, in the duct body 1 of this embodiment, the duct width W4 of the upstream-side straight section 4 is smaller than the duct width W3 of the bending section 3. Also, the duct width W5 of the downstream-side straight section 5 is equal to or larger than the duct width W3 of the bending section 3. Also, the duct width W3a of the bending section 3 at the inlet 10a is smallest. The duct width W3 of the bending section 3 increases gradually as the bending section 3 extends from the inlet 10a in an air flow direction, and is then constant.

Thus, the duct body 1 may have a configuration in which the duct width W3 of the bending section 3 is larger than the duct width W4 of the upstream-side straight section 4, but equal to or smaller than the duct width W5 of the downstream-side straight section 5.

In this embodiment, the duct sections 461 and 462 are arranged at the downstream end of the downstream-side straight section 5. The duct body 1 also includes a duct section 461 having a duct width W461 decreasing gradually in a downstream direction of the downstream-side straight section 5, and a duct section 462 having a constant duct width W462 smaller than the duct width W5 of the downstream-side straight section 5.

Although sound waves passing through the outer-periphery-side air passage 6 and sound waves passing through the inner-periphery-side air passage 7 pass through the downstream-side straight section 5 in a parallel state, it is possible to allow most sound waves passing through the outer-periphery-side air passage 6 and the inner-periphery-side air passage 7 to interfere with each other because the duct section 461, the duct width W461 of which decreases gradually, can change the flowing directions of air flows passing through the outer-periphery-side air passage 6 and the inner-periphery-side air passage 7 such that the flowing directions intersect each other.

Other Embodiments (1) Although the example, in which the passage dividing wall 2 has a blade shape, has been described in the first embodiment, the passage dividing wall 2 may have a planar shape having a uniform width in an arrangement direction of the outer-periphery-side air passage 6 and inner-periphery-side air passage 7, as long as a desired passage length difference is secured by the given shape of the duct body 1.

Similarly, in the fifth to twenty-seventh embodiments, the passage dividing wall 2 may have a planar shape, as long as a desired passage length difference is secured.

Also, although the upstream and downstream ends of the passage dividing wall 2 are sharp in the cases of FIGS. 13 to 15, they may have a round shape.

Thus, the shape of the passage dividing wall 2 is variable, if necessary, as long as a desired passage length difference is secured.

(2) In each of the above-described embodiments, the air duct for vehicle air conditioning includes the upstream-side straight section 4, which is arranged upstream of the bending section 3 where the passage dividing wall 2 is installed, as an upstream-side duct section. However, the upstream-side duct section is not limited to a straight shape, and may have a curved shape. Even when the shape of the upstream-side duct section is not straight, it is possible to obtain an approximately-uniform sound pressure distribution, as in the first embodiment, by making the upstream-side duct section have a desired length.

(3) The example, in which a method of shaping the duct body 1 to have a concave structure is used as a method for forming the passage dividing wall 2, has been described in the first embodiment and the seventeenth to nineteenth embodiments, another method may be used. For example, the passage dividing wall 2 is formed separately from the duct body 1, and is then fixed to the duct body 1, using a bonding method, etc.

(4) Although the example, in which the air passage is divided into two air passages by forming one passage dividing wall 2, has been described in each of the above-described embodiments, the air passage may be divided into three or more air passages by forming a plurality of passage dividing walls 2.

When the air passage is divided into three or more air passages under the condition in which the duct width of the duct body 1 is constant, the passage length difference between the adjacent air passages is reduced. Accordingly, it is preferred that the number of divided air passages is small.

(5) In the above-described embodiments, the length of the duct section arranged downstream of the bending section 3 corresponds to a ¼ or more of the wavelength of a sound wave having a frequency target range, in order to secure an interference space. However, in place of the length of the downstream-side duct section, the length from the downstream end of the passage dividing wall 2, i.e., the junction point between the outer-periphery-side air passage 6 and the inner-periphery-side air passage 7, to the outlet port in an air flow direction may correspond to a ¼ or more of the wavelength of a sound wave having a frequency target range, in terms of the security of a desired interference space.

(6) The example, in which the indoor air conditioning unit 100 includes the blower unit 110 and air conditioning body unit 120, has been described in the above-described embodiment, the indoor air conditioning unit 100 may have a single unit structure, from which the blower unit 110 and air conditioning body unit 120 cannot be divided.

Also, in the above-described embodiments, the blower 111 is arranged upstream of the evaporator 122 and heater core 123 in an air flow direction. However, the blower 111 may be arranged downstream of the evaporator 122 and heater core 123 in the air flow direction.

Thus, in implementing the present invention, there is no particular influence by the configuration of the vehicle air conditioner. Accordingly, the present invention is applicable to vehicle air conditioners of various structures.

(7) Each of the above-described embodiments is intended only to illustrate an implementation example. Accordingly, these embodiments may be appropriately combined within an applicable range, if necessary.

While the invention has been shown and described with respect to the preferred embodiments, it will be understood by those skilled in the art that various changes and modification may be made without departing from the spirit and scope of the invention as defined in the following claims.

What is claimed is:

1. An air duct for vehicle air conditioning, for guiding conditioned air to a vehicle compartment outlet port, wherein the conditioned air is generated as air is blown into an air conditioning case by a blower, and is heat-exchanged by a heat exchanger in the air conditioning case, the air duct comprising:

an upstream-side duct section into which the conditioned air from the air conditioning case flows;

a downstream-side duct section for introducing the conditioned air into the vehicle compartment outlet port;

a bending section located between the upstream-side duct section and the downstream-side duct section, for bending a flow direction of the entire conditioned air passing through the upstream-side duct section and for guiding the conditioned air from the upstream-side duct section to the downstream-side duct section, and a passage dividing wall provided within the bending section to partition a first passage and a second passage from each other, wherein an upstream end of the passage dividing wall is positioned downstream of the downstream end of the upstream-side duct section within the bending section in the air flow direction, and a downstream end of the passage dividing wall is positioned upstream of the upstream end of the downstream-side duct section within the bending section in the air flow direction;

wherein the bending section includes the first passage and the second passage for branching the conditioned air flowing from the upstream-side duct section toward a bending outer periphery side and a bending inner periphery side in the bending section, wherein the bending section includes an outer-periphery-side inner wall surface extending between the upstream-side duct section and the downstream-side duct section, the entire outer-periphery-side inner wall surface being enlarged toward the bending outer periphery beyond an outer reference line, on cross-sections of the upstream-side duct section, the downstream-side duct section and the bending section parallel to the flow direction of the conditioned air, wherein the outer reference line is a virtual curved line connecting an outer-periphery-side inner wall surface of the upstream-side duct section and an outer-periphery-side inner wall surface of the downstream-side duct section by an arc, to which a virtual straight line extending from a downstream end of the upstream-side duct section connected to the outer-periphery-side inner wall surface of the bending section, in parallel to the flow direction of the conditioned air introduced from the upstream-side duct section into the bending section, and a virtual straight line extending from an upstream end of the downstream-side duct section connected to the outer-periphery-side inner wall surface of the bending section, in parallel to the flow direction of the conditioned air introduced from the bending section into the downstream-side duct section, are tangent, wherein the outer-periphery-side inner wall surface of the bending section extends in a direction defined by an extension of a line extending from an inner-periphery-side inner wall surface of the upstream-side duct section to an outer-periphery-side inner wall surface of the upstream-side duct section, the direction being perpendicular to the flow direction of the conditioned air in the upstream-side duct section;

wherein the bending section and the upstream-side duct section are configured such that the outer-periphery-side inner wall surface of the bending section is concave toward an inside at an upstream connection portion connected to the upstream-side duct section, to allow the flow direction of the conditioned air introduced into the first passage to form an acute angle with respect to the flow direction of the conditioned air directed from the upstream-side duct section to the bending section;

wherein the bending section and the downstream-side duct section are configured such that the outer-periphery-side inner wall surface of the bending section is concave toward an inside at a downstream connection portion connected to the downstream-side duct section, to allow the conditioned air flowing through the first passage and the conditioned air flowing through the second passage to be joined while flowing in intersecting directions; and passage cross-sectional areas of the first passage and the second passage are substantially uniform in the air flow direction.

2. The air duct for vehicle air conditioning according to claim 1, wherein the bending section has a width dimension corresponding to a sum of cross-sectional widths of the first and second passages in an arrangement direction of the first and second passages and a distance between the first passage and the second passage in the arrangement direction, the width dimension of the bending section being larger than at least one of a cross-sectional width of the upstream-side duct section and a cross-sectional width of the downstream-side duct section.

3. The air duct for vehicle air conditioning according to claim 2, wherein the first and second passages of the bending section are constituted by separate tubes.

4. The air duct for vehicle air conditioning according to claim 3, wherein an outer-periphery-side one of the separate tubes defining the first and second passages turns toward an upper or lower side of the vehicle.

5. The air duct for vehicle air conditioning according to claim 2, wherein an inner-periphery-side inner wall surface of the bending section has a planar shape at least in a partial region of the inner-periphery-side inner wall surface.

6. The air duct for vehicle air conditioning according to claim 2, wherein the inner-periphery-side wall surface of the bending section has, in an overall region or in a partial region, a curved shape gentler than the outer-periphery-side inner wall surface.

7. The air duct for vehicle air conditioning according to claim 2, wherein the upstream-side duct section has, at least in a partial region, a substantially-straight shape to allow the flow direction of the conditioned air to be substantially constant.

8. The air duct for vehicle air conditioning according to claim 2, wherein the downstream-side duct section includes, at least in a partial region, a substantially-straight shape to allow the flow direction of the conditioned air to be substantially constant.

9. The air duct for vehicle air conditioning according to claim 2, wherein the upstream-side duct section has a length of about 85mm or more in the flow direction of the conditioned air, the length being a length adapted to be installable in a vehicle.

10. The air duct for vehicle air conditioning according to claim 2, wherein the upstream-side duct section has a length of about 121 mm or more in the flow direction of the conditioned air, the length being a length adapted to be installable in a vehicle.

11. The air duct for vehicle air conditioning according to claim 2, wherein the upstream-side duct section has a length of about 212 mm or more in the flow direction of the conditioned air, the length being a length adapted to be installable in a vehicle.

12. The air duct for vehicle air conditioning according to claim 2, wherein the downstream-side duct section has a length about in a range of 42 mm to 500 mm in the flow direction of the conditioned air.

13. The air duct for vehicle air conditioning according to claim 2, wherein the downstream-side duct section has a length about in a range of 60 mm to 500 mm in the flow direction of the conditioned air.

14. The air duct for vehicle air conditioning according to claim 2, wherein the downstream-side duct section has a length about in a range of 106 mm to 500 mm in the flow direction of the conditioned air.

15. The air duct for vehicle air conditioning according to claim 2, wherein the bending section is arranged just before the vehicle compartment outlet port in the flow direction of the conditioned air, and has a bending angle of about in a range of 45° to 180°.

16. The air duct for vehicle air conditioning according to claim 2, wherein the bending section is configured such that a difference (L1 −L2) between passage lengths of the first and the second passages extending through centers of passage cross-sections of the first and the second passages is about in a range of 0.085 m to 0.215 m.

17. The air duct for vehicle air conditioning according to claim 2, wherein the first passage and the second passage are configured such that a ratio between cross-sections of the first passage and the second passage taken at a cross-section of the bending section is set in a manner that, when one cross-section is set to 1, the other cross-section is set in a range from 0.7 to 1.3.

18. The air duct for vehicle air conditioning according to claim 2, wherein the vehicle compartment outlet port has a grille for adjusting a blowing direction of the conditioned air.

19. An air conditioner for a vehicle, comprising:
  an air conditioning case for accommodating the heat exchanger adapted to heat-exchange with air to be conditioned;
  the air duct according to claim 2;
  vehicle compartment outlet ports for discharging the conditioned air flowing from the air ducts into a vehicle compartment; and
  a blower for blowing the conditioned air from the air conditioning case toward the vehicle compartment outlet ports via the air duct.

20. The air duct for vehicle air conditioning according to claim 1,
  wherein the passage dividing wall has a first-passage-side wall surface facing the first passage, and a second-passage-side wall surface facing the second passage; and
  wherein the passage dividing wall is configured such that a ration (S1/S2) of an outer-periphery-side length (S1), in the flow direction of the conditioned air, of the first-passage-side wall surface facing the first passage to an inner-periphery-side length (S2), in the flow direction of the conditioned air, of the second-passage-side wall surface facing the second passage is about in a range of 1.1 to 2.0.

21. The air duct for vehicle air conditioning according to claim 1, wherein the outer-periphery-side inner wall surface has a first portion adjacent the upstream-side duct section convex toward the inside of the duct, a second portion adjacent the downstream-side duct convex toward the inside of the duct and a third section between said first and second sections concave toward the inside of the duct.

22. An air duct for vehicle air conditioning, for guiding a conditioned air to a vehicle compartment outlet port, wherein the conditioned air is generated as air is blown into an air conditioning case by a blower, and is heat-exchanged by a heat exchanger in the air conditioning case, the air duct comprising:
  an upstream-side duct section into which the conditioned air from the air conditioning case flows;
  a downstream-side duct section for introducing the conditioned air into the vehicle compartment outlet port;
  a bending section formed between the upstream-side duct section and the downstream-side duct section, for bending a flow direction of the entire conditioned air passing through the upstream-side duct section and for guiding the conditioned air from the upstream-side duct section to the downstream-side duct section, and a passage dividing wall provided within the bending section to partition a first passage and a second passage from each other, wherein an upstream end of the passage dividing wall is positioned downstream of the downstream end of the upstream-side duct section within the bending section in the air flow direction, and a downstream end of the passage dividing wall is positioned upstream of the upstream end of the downstream-side duct section within the bending section in the air flow direction;

wherein the bending section includes the first passage and the second passage for branching the conditioned air flowing from the upstream-side duct section toward a bending outer periphery side and a bending inner periphery side in the bending section, wherein the bending section includes an inner-periphery-side inner wall surface extending between the upstream-side duct section and the downstream-side duct section, the entire outer-periphery-side inner wall surface being enlarged toward a bending inner periphery beyond an inner reference line, on cross-sections of the upstream-side duct section, the downstream-side duct section and the bending section parallel to the flow direction of the conditioned air, wherein the inner reference line is a virtual curved line connecting an inner-periphery-side inner wall surface of the upstream-side duct section and an inner-periphery-side inner wall surface of the downstream-side duct section by an arc, to which a virtual straight line extending from a downstream end of the upstream-side duct section connected to the inner-periphery-side inner wall surface of the bending section, in parallel to the flow direction of the conditioned air introduced from the upstream-side duct section into the bending section, and a virtual straight line extending from an upstream end of the downstream-side duct section connected to the inner-periphery-side inner wall surface of the bending section, in parallel to the flow direction of the conditioned air introduced from the bending section into the downstream-side duct section, are tangent;

wherein the outer-periphery-side inner wall surface of the bending section extends in a direction defined by an extension of a line extending from an inner-periphery-side inner wall surface of the upstream-side duct section to an outer-periphery-side inner wall surface of the upstream-side duct section, the direction being perpendicular to the flow direction of the conditioned air in the upstream-side duct section;

wherein the bending section and the upstream-side duct section are configured such that the outer-periphery-side inner wall surface of the bending section is concave toward an inside at an upstream connection portion connected to the upstream-side duct section, to allow the flow direction of the conditioned air introduced into the first passage to form an acute angle with respect to the flow direction of the conditioned air directed from the upstream-side duct section to the bending section;

wherein the bending section and the downstream-side duct section are configured such that the outer-periphery-side inner wall surface of the bending section is concave toward an inside at a downstream connection portion connected to the downstream-side duct section, to allow the conditioned air flowing through the first passage and the conditioned air flowing through the second passage to be joined while flowing in intersecting directions; and passage cross-sectional areas of the first passage and the second passage are substantially uniform in the air flow direction.

23. The air duct for vehicle air conditioning according to claim 22,
wherein the bending section has a width dimension corresponding to a sum of cross-sectional widths of the first and second passages in an arrangement direction of the first and second passages and a cross-sectional width of the passage dividing wall in the arrangement direction, the width dimension being larger than at least one of a cross-sectional width of the upstream-side duct section and a cross-sectional width of the downstream-side duct section.

24. The air duct for vehicle air conditioning according to claim 23, wherein the passage dividing wall includes a first-passage-side wall surface facing the first passage and having a shape approximately conforming to an outer-periphery-side inner wall surface of the bending section, and a second-passage-side wall surface facing the second passage and approximately conforming to an inner-periphery-side inner wall surface of the bending section, to allow each of the first and second passages to have a passage cross-sectional area substantially constant in a flow direction of the conditioned air.

25. The air duct for vehicle air conditioning according to claim 23, wherein the passage dividing wall is configured such that a ratio (S1/S2) of an outer-periphery-side length (S1), in the flow direction of the conditioned air, of the first-passage-side wall surface facing the first passage to an inner-periphery-side length, in the flow direction of the conditioned air, of the second-passage-side wall surface facing the second passage is about in a range of 1.1 to 2.0.

26. The air duct for vehicle air conditioning according to claim 23, wherein the passage dividing wall has a width in an arrangement direction of the first and second passages, the width increasing gradually from an upstream end in the air flow direction toward a middle portion in the air flow direction, and decreasing gradually from the middle portion toward a downstream end in the air flow direction, to allow the passage dividing wall to have a substantially-crescent shape linearly symmetrical to a virtual line passing the middle portion.

27. The air duct for vehicle air conditioning according to claim 23, wherein:
the passage dividing wall is formed by shaping upper and lower wall portions of a wall constituting a duct body to be concaved toward an inside of the duct body, or shaping only the upper wall portion to be concaved toward the inside of the duct body; and
the upper and lower wall portions come into complete contact with each other or do not substantially come into contact with each other in a region where at least one of the upper and lower wall portions is shaped to be concaved toward the inside of the duct body in order to form the passage dividing wall.

28. The air duct for vehicle air conditioning according to claim 23, wherein the passage dividing wall is formed by individually forming the upper and the lower wall portions of a duct body, joining concave portions of the upper and lower wall portions, and coupling the upper wall portion and the lower wall portion.

29. The air duct for vehicle air conditioning according to claim 23, further comprising
lining materials attached to inner wall surfaces of the upstream-side duct section, inner wall surfaces of the downstream-side duct section, an inner-periphery-side inner wall surface of the bending section, and surfaces of the passage dividing wall, respectively.

30. The air duct for vehicle air conditioning according to claim 23, further comprising
sound absorbing materials attached to inner wall surfaces of the upstream-side duct section, inner wall surfaces of the downstream-side duct section, an inner-periphery-side inner wall surface of the bending section, and surfaces of the passage dividing wall, respectively.

31. The air duct for vehicle air conditioning according to claim 23, wherein surfaces of the passage dividing wall have convex or concave structures, and concave or convex structures corresponding to the convex or concave structures on the surfaces of the passage dividing wall are provided at outer-periphery-side and inner-periphery-side inner wall surfaces of the bending section.

32. The air duct for vehicle air conditioning according to claim 23, wherein the first passage of the bending section is divided into a plurality of passages, and the second passage of the bending section is partially divided into a plurality of passages.

33. The air duct for vehicle air conditioning according to claim 22, wherein the outer-periphery-side inner wall surface has a first portion adjacent the upstream-side duct section convex toward the inside of the duct, a second portion adjacent the downstream-side duct convex toward the inside of the duct and a third section between said first and second sections concave toward the inside of the duct.

34. An air duct for vehicle air conditioning, for guiding conditioned air to a vehicle compartment outlet port, wherein the conditioned air is generated as air is blown into an air conditioning case by a blower, and is heat-exchanged by a heat exchanger in the air conditioning case, the air duct comprising:
an upstream-side duct section extending in a substantially-straight shape, into which the conditioned air from the air conditioning case flows;
a downstream-side duct section extending in a substantially-straight shape, the downstream-side duct section blowing out the conditioned air in a direction different from a flow direction of the conditioned air passing through the upstream-side duct section;
a bending section connecting the upstream-side duct section and the downstream-side duct section; and
a dividing member arranged in the bending section for dividing an interior of the bending section into a first passage arranged at a bending inner periphery side and a second passage arranged at a bending outer periphery side,
wherein the bending section has at least one of a shape in which an outer intersection line extends outside an outer reference line, and a shape in which an inner intersection line extends inside an inner reference line, on a reference cross-section including an upstream air flow direction of the conditioned air flowing in the upstream-side duct section and a downstream air flow direction of the conditioned air flowing in the downstream-side duct section,
wherein the outer reference line is a line connecting an outer-periphery-side inner wall surface of the upstream-side duct section and an outer-periphery-side inner wall surface of the downstream-side duct section via an arc to which the upstream air flow direction and the downstream air flow direction are tangent,
wherein the inner reference line is a line connecting an inner-periphery-side inner wall surface of the upstream-side duct section and an inner-periphery-side inner wall surface of the downstream-side duct section via an arc to which the upstream air flow direction and the downstream-side duct section via an arc to which the upstream air flow direction and the downstream air flow direction are tangent,
wherein the outer intersection line is a line of intersection between an outer-periphery-side inner wall surface of the bending section and the reference cross-section,
wherein the inner intersection line is a line of intersection between an inner-periphery-side inner wall surface of the bending section and the reference cross-section, and
wherein the dividing member includes a wall surface arranged at a side of the first passage to conform to the outer-periphery-side inner wall surface of the bending section, and a wall surface arranged at a side of the second passage to conform to the inner-periphery-side inner wall surface of the bending section;
wherein the bending section includes an inner-periphery-side inner wall surface extending between the upstream-side duct section and the downstream-side duct section, the entire outer-periphery-side inner wall surface being enlarged toward a bending inner periphery beyond an inner reference line, on cross-sections of the upstream-side duct section, the downstream-side duct section and the bending section parallel to the flow direction of the conditioned air;
wherein the outer-periphery-side inner wall surface of the bending section extends in a direction defined by an extension of a line extending from an inner-periphery-side inner wall surface of the upstream-side duct section to an outer-periphery-side inner wall surface of the upstream-side duct section, the direction being perpendicular to the flow direction of the conditioned air in the upstream-side duct section;
passage cross-sectional areas of the first passage and the second passage are substantially uniform in the air flow direction;
wherein an upstream end of the dividing member is positioned downstream of an upstream end of the outer-peripheral-side inner wall surface within the bending section in the air flow direction, and a downstream end of the dividing member is positioned upstream of the downstream end of the outer-peripheral-side inner wall surface within the bending section in the air flow direction.

35. The air duct for vehicle air conditioning according to claim 34, wherein the outer-periphery-side inner wall surface has a first portion adjacent the upstream-side duct section convex toward the inside of the duct, a second portion adjacent the downstream-side duct convex toward the inside of the duct and a third section between said first and second sections concave toward the inside of the duct.

* * * * *